United States Patent [19]
Owashi et al.

[11] Patent Number: 5,243,422
[45] Date of Patent: Sep. 7, 1993

[54] FIELD CONVERTING METHOD FOR TELEVISION SIGNALS AND DEVICE FOR REALIZING SAME

[75] Inventors: Hitoaki Owashi; Kyoichi Hosokawa; Kazuhiko Yoshizawa; Miyoko Yoshikoshi, all of Yokohama, Japan

[73] Assignee: Hitachi, Ltd., Tokyo, Japan

[21] Appl. No.: 791,209

[22] Filed: Nov. 13, 1991

[30] Foreign Application Priority Data

| Nov. 13, 1990 [JP] | Japan | 2-304128 |
| Jan. 31, 1991 [JP] | Japan | 3-011136 |
| Feb. 15, 1991 [JP] | Japan | 3-021802 |

[51] Int. Cl.$^5$ .......................... H04N 7/01
[52] U.S. Cl. .......................... 358/140; 358/11
[58] Field of Search ............ 358/11, 140, 105, 313, 358/335, 312

[56] References Cited

U.S. PATENT DOCUMENTS

| 4,603,351 | 7/1986 | Vreeswijk et al. | 358/140 |
| 4,641,202 | 3/1987 | Nakamura et al. | 358/313 |
| 4,731,651 | 3/1988 | Matsumoto et al. | 358/136 X |
| 4,987,489 | 1/1991 | Hurley et al. | 358/140 X |
| 5,055,925 | 10/1991 | Lamnabhi | 358/140 |

FOREIGN PATENT DOCUMENTS 60-54580 3/1985 Japan.
2-132984 5/1990 Japan.

OTHER PUBLICATIONS

"Flicker-Free Non-Interlaced Receiving System for Standard Color TV Signals"; Okada et al; IEE Xactions, vol. CE-31 #3, Aug. 1985.
"Reproduced Video Signal Processing for Composite Digital VTR"; Morimoto et al; ITEJ Technical Report, vol. 14 #47 pp. 13-18; Sep. 1990.

*Primary Examiner*—Victor R. Kostak
*Attorney, Agent, or Firm*—Antonelli, Terry, Stout & Kraus

[57] ABSTRACT

A field conversion device for forming data of a new field, comprising luminance and chrominance signals, respectively, by combining data of an arbitrary field of an interlaced television signal and field data of a television signal in an interlaced relationship therewith, and method thereof. Field signal data extracted from the arbitrary field is combined with data from the field in an interlaced relationship therewith. Furthermore, a second new field data is obtained using field data of a plurality of lines in the arbitrary field. Field data, comprising luminance and chrominance signals, respectively, are selectively chosen and output from the new first and second field data according to movement detected within an input signal, to comprise the new field data.

32 Claims, 28 Drawing Sheets

FIG. 5

| REPRODUCED FIELD No. | OUTPUT FIELD No. | CHROMINANCE SIGNAL SCANNING LINE CONVERSION (SWITCH 193) | PHASE INVERSION CONTROL (SWITCH 192) |
|---|---|---|---|
| 1 | 1 | 177 | ABSENT |
| 1 | 2 | 178 | PRESENT |
| 1 | 3 | 177 | PRESENT |
| 1 | 4 | 178 | ABSENT |
| 2 | 1 | 178 | ABSENT |
| 2 | 2 | 177 | ABSENT |
| 2 | 3 | 178 | PRESENT |
| 2 | 4 | 177 | PRESENT |
| 3 | 1 | 177 | PRESENT |
| 3 | 2 | 178 | ABSENT |
| 3 | 3 | 177 | ABSENT |
| 3 | 4 | 178 | PRESENT |
| 4 | 1 | 178 | PRESENT |
| 4 | 2 | 177 | PRESENT |
| 4 | 3 | 178 | ABSENT |
| 4 | 4 | 177 | ABSENT |

177: SELECTION OF OUTPUT SIGNAL OF DELAY LINE 177
PRESENT: SELECTION OF OUTPUT SIGNAL OF PHASE INVERTION CIRCUIT 191
178: SELECTION OF OUTPUT SIGNAL OF DELAY LINE 178
ABSENT: SELECTION OF OUTPUT SIGNAL OF SWITCHING CIRCUIT 193

FIG. 14

| FIELD No. | START LINE |
|---|---|
| 1 | 10 |
| 2 | 9 |
| 3 | 9 |
| 4 | 8 |

FIG. 15

| REPRODUCED FIELD No. | OUTPUT FIELD No. | START LINE |
|---|---|---|
| 1 | 1 | 10 |
| | 2 | 9 |
| | 3 | 10 |
| | 4 | 9 |
| 2 | 1 | 9 |
| | 2 | 9 |
| | 3 | 9 |
| | 4 | 9 |
| 3 | 1 | 9 |
| | 2 | 8 |
| | 3 | 9 |
| | 4 | 8 |
| 4 | 1 | 8 |
| | 2 | 8 |
| | 3 | 8 |
| | 4 | 8 |

FIG. 26

| FIELD NO. OF REPRODUCED IMAGE SIGNAL | FIELD NO. OF OUTPUTTED IMAGE SIGNAL | POSITION OF CENTER OF GRAVITY OF CONVERTED SIGNAL | PRESENCE OR ABSENCE OF PHASE INVERSION OF CARRIER CHROMINANCE SIGNAL |
|---|---|---|---|
| 1 | 1 | 1/4 | ABSENT |
|   | 2 | 3/4 | ABSENT |
|   | 3 | 1/4 | PRESENT |
|   | 4 | 3/4 | PRESENT |
| 2 | 1 | 3/4 | PRESENT |
|   | 2 | 1/4 | ABSENT |
|   | 3 | 3/4 | ABSENT |
|   | 4 | 1/4 | PRESENT |
| 3 | 1 | 1/4 | PRESENT |
|   | 2 | 3/4 | PRESENT |
|   | 3 | 1/4 | ABSENT |
|   | 4 | 3/4 | ABSENT |
| 4 | 1 | 3/4 | ABSENT |
|   | 2 | 1/4 | PRESENT |
|   | 3 | 3/4 | PRESENT |
|   | 4 | 1/4 | ABSENT |

FIG. 31

|  | PRESENT FIELD Y/C SEPARATION (2010,2030) | INTER-FRAME MOVEMENT DETECTION (2030) | INTER-FIELD Y/C SEPARATION (2011,2031) | INTER-FRAME Y/C SEPARATION (2032) |
|---|---|---|---|---|
| USUAL SIGNAL PROCESSING (CORRESPONDING TO FIG.25) | MOVEMENT ADAPTIVE | DIFFERENCE SIGNAL BETWEEN PRESENT AND PREVIOUS FRAMES (1 FRAME BEFORE) | MOVEMENT ADAPTIVE | DIFFERENCE SIGNAL BETWEEN PRESENT AND PREVIOUS FRAMES (2 FRAME BEFORE) |
| IMMEDIATELY AFTER FIELD JUMP (CORRESPONDING TO FIG.27) | MOVEMENT ADAPTIVE | DIFFERENCE SIGNAL BETWEEN PRESENT AND PREVIOUS FRAMES (1 FRAME BEFORE) | FIELD 4 FORCED INTERLINE PROCESSING | DIFFERENCE SIGNAL BETWEEN PRESENT AND PREVIOUS FRAMES (2 FRAME BEFORE) |
| 1 FIELD AFTER JUMP (CORRESPONDING TO FIG.28) | PRESENT FIELD FORCED INTERLINE PROCESSING | NOT DETECTED | MOVEMENT ADAPTIVE | DIFFERENCE SIGNAL BETWEEN PRESENT AND PREVIOUS FRAMES (2 FRAME BEFORE) |
| 2 FIELDS AFTER JUMP (CORRESPONDING TO FIG.29) | MOVEMENT ADAPTIVE | DIFFERENCE SIGNAL BETWEEN PRESENT AND PREVIOUS FRAMES (1 FRAME BEFORE) | FIELD 2 FORCED INTERLINE PROCESSING | DIFFERENCE SIGNAL BETWEEN PRESENT AND PREVIOUS FRAMES (2 FRAME BEFORE) |
| 3 FIELDS AFTER JUMP (CORRESPONDING TO FIG.30) | MOVEMENT ADAPTIVE | DIFFERENCE SIGNAL BETWEEN PRESENT AND PREVIOUS FRAMES (1 FRAME BEFORE) | MOVEMENT ADAPTIVE | NOT DETECTED |

FIG. 32

|  | DELAY LINE INPUT SIGNAL | FIRST TAP OUTPUT SIGNAL | SECOND TAP OUTPUT SIGNAL | THIRD TAP OUTPUT SIGNAL | FOURTH TAP OUTPUT SIGNAL |
|---|---|---|---|---|---|
| USUAL SIGNAL PROCESSING (CORRESPONDING TO FIG. 25) | C1V | B2V | C3V | D4V | C5V |
| IMMEDIATELY AFTER FIELD JUMP (CORRESPONDING TO FIG. 27) | C1V | B4V | C3V | — | C5V |
| 1 FIELD AFTER JUMP (CORRESPONDING TO FIG. 28) | C1V | B2V | — | D4V | C5V |
| 2 FIELD AFTER JUMP (CORRESPONDING TO FIG. 29) | C1V | B2V | C3V | — | C5V |
| 3 FIELD AFTER JUMP (CORRESPONDING TO FIG. 30) | C1V | B2V | C3V | D4V | — |

FIELD CONVERTING METHOD FOR TELEVISION SIGNALS AND DEVICE FOR REALIZING SAME

BACKGROUND OF THE INVENTION

The present invention relates to a field converting method for generating new field data from arbitrary field data of television signals at a special playback (variable speed playback) by a magnetic recording reproducing device, e.g., a video tape recorder (hereinbelow abbreviated to VTR), a laser disk player, etc. and device for realizing same.

When image signals recorded in a VTR, etc. are reproduced, in order to regulate playback time or to achieve special effects such as slow playback, still picture playback, fast playback, the special playback is effected, by which images are skipped (jumped) or same images are reproduced repeatedly. At this time, in order to satisfy an interlace condition of image signals or a continuity condition for subcarrier, i.e., in order to keep the continuity of field numbers, an interpolation filter technique is adopted for the purpose of preventing displacements of the center of gravity of images, i.e., the position of images, at the variable speed playback, by which image signals of a field having a different field number are generated, starting from reproduced image signals, and reducing lowering of the vertical resolution. An example of such an interpolation filter device is disclosed in JP-A-2-132984.

Further, a processing technique, in the case where the processing described above is effected by means of a digital VTR, is indicated in an article entitled "Reproduced Video Signal Processing For Composite Digital VTR", ITEJ Technical Report, Vol. 14, No. 47, pp. 13-18, Sep. 1990.

FIG. 1 indicates the interpolation filter device indicated in JP-A-2-132984.

In FIG. 1, reference numerals 401 and 402 are input and output terminals for reproduced image signals; 411 is a delay line having a delay time corresponding to a horizontal scanning period (hereinbelow called simply 1 H); 412 and 413 are delay lines having delay times of 2 H and 3 H, respectively; 421 and 428 are coefficient multipliers having a coefficient of $(-\alpha/4)$; 422 and 427 are coefficient multipliers having a coefficient of $(\frac{1}{2}-\alpha/4)$; 423 and 426 are coefficient multipliers having a coefficient of $(\frac{1}{2}+5\alpha/4)$; 424 and 425 are coefficient multipliers having a coefficient of $(-3\alpha/4)$; 431 and 432 are adders; and 441 is a switch. In this device a composite signal is separated into a luminance signal and a chrominance signal by a Y/C separating circuit and the luminance signal thus separated is inputted in the delay lines 411, 412, 413, etc. through the input terminal 401. The input signal from the input terminal 401 and the output signals of the delay lines 411, 412, 413 are inputted in the coefficient multipliers 421 and 422, 423, 424 as well as 425 and 426, 427, 428, respectively. The outputs of the coefficient multipliers 421, 422, 423 and 424 are inputted in the adder 431, while the outputs of the coefficient multipliers 425, 426, 427 and 428 are inputted in the adder 432. The outputs of the adders 431 and 432 are inputted in the switch 441. The switch 441 selects the output of the adder 432 on the H side, in the case where both the field number of the reproduced image, which is to be field-converted, and the field number of the field converted output image signal are odd or even (hereinbelow called odd or even number accordance) and the output of the adder 431 on the L side, in the case where one of them is odd and the other is even (hereinbelow called odd or even number disaccordance). Since the signal outputted by the adder 431 and the signal outputted by the adder 432 have same frequency-amplitude characteristics, there is no difference in the vertical resolution.

Therefore, even in the case where the switch is turned-over in field unit at the variable speed playback, good images can be obtained. The odd or even number accordance for the field number corresponds to a case where one of them is 1 (2) and the other is 1 or 3 (2 or 4).

Further, U.S. Pat. No. 4,641,202 corresponding to JP-A-60-545580 discloses a field converting method, by which arbitrary field data are converted into new field data, and a device for realizing same.

SUMMARY OF THE INVENTION

The device disclosed in JP-A-2-132984 has a problem in that displacements are produced in images at so-called vertical transistions of the luminance signal, where the level of the luminance signal varies rapidly in the vertical direction. This will be explained, referring to FIGS. 2A to 2C, (z) and (a) to (e) in FIG. 2A indicate data of vertical rows of pixels in fields, which are consecutive in time. 501 to 503, 511 to 513, 521 to 523, 531 to 533, 541 to 543, and 551 to 553 represent pixels having high luminances, while 515, 524, 525, 534, 535, 544, 545, 554 and 555 represent pixels having low luminances. FIG. 2B shows an image signal, in the case where data, from which the field (c) in FIG. 2A is skipped, are projected on a screen without being subjected to the interpolation filter processing. Since particularly for the fields (d) and (e) not only the start line of effective data but also all the data appear, displaced upward by a distance corresponding to 0.5 H (H being one horizontal scanning period) from the original position indicated in FIG. 2A, the center of gravity of the whole image is displaced. In order to prevent this displacement of the center of gravity, the data of the different fields in FIG. 2B are input to the image input terminal 401 of the interpolation filter device indicated in FIG. 1 to be subjected to the interpolation filter processing. FIG. 2C shows data after the conversion, in the case where the field conversion is effected by means of the interpolation filter device indicated in FIG. 1. In particular, the fields (a) and (b) show cases where both the field number of the reproduced image signal and the field number of the output image signal are odd or even, which are data outputted by the adder 432 in FIG. 1. Data 563 in FIG. 2C are obtained by calculations from data 511, 512, 513 and 514. On the other hand, the fields (d) and (e) in FIG. 2C represent cases where either one of the field number of the reproduced image signal and the field number of the output image signal is odd and the other is even, which are data outputted by the adder 431. In this case, the data 583 in FIG. 2C are obtained, starting from the data 541, 542, 543 and 544 in FIG. 2A, by calculations different from those described previously. At the usual playback, a part where the luminance level varies strongly (transition of the luminance signal) exists between the data 523, 543 and the data 514, 534, 554 indicated in FIG. 2A. On the contrary, at the variable speed playback (special playback), when the field conversion is effected by means of a prior art interpolation filter, in the case indicated by the fields (a) and (b) in FIG. 2C, where the field number of the reproduced image signal and the field number of the output image signal are in odd or even number accordance, the transition of the luminance signal exists between the data 564 and the data 573, and in the case indicated by the fields (d) and (e) in FIG. 2C, where they are in odd or even number disaccordance, it exists between the data 584 and the data 593. Consequently, in the case where variable speed reproduction data (FIG. 2B) of the image signal as indicated in FIG. 2A are inputted in the image input terminal 401 in FIG. 1 and the field number of the reproduced image signal and the field number of the output image signal are in odd or even number accordance, the switch 441 in FIG. 1 selects the H side, then image signals such as the fields (a) and (b) in FIG. 2C are outputted. On the contrary, in the case where the field number of the reproduced image signal and the field number of the output image signal are in odd or even number disaccordance and the switch 441 in FIG. 1 selects the L side, image signals such as the fields (d) and (e) in FIG. 2C are outputted. For this reason, in the case where a still picture or an image where there are almost no movements is reproduced in the variable speed playback, when this switch is turned over, transitions of the luminance signal are displaced in the vertical direction. In particular, in the case where the playback speed is slightly regulated, when the switch is turned-over for every several fields, displacements in the vertical direction are easily observed by sight, which causes significant worsening in the image quality.

That is, as indicated by the literatures described above, by these methods displacements of the center of gravity in the image are produced, accompanied by the field conversion. The displacements of the center of gravity in the image give feeling of instability by sight, which gives rise to significant worsening in the image quality. Further, as described in the literature described above, if the band of a comb-shaped filter for separating the luminance signal from the carrier chrominance signal is narrow, the carrier chrominance signal remains in the luminance signal. In this way, the band of the carrier chrominance signal is varied by the phase inversion processing of the carrier chrominance signal accompanied by the field conversion, which gives rise to color flicker and significant worsening in the image quality. In order to prevent this, if the band of the comb-shaped filter is widened, resolution in the diagonal direction of the luminance signal is lowered, which gives rise to so-called foggy images. As described above, prevention of occurrence of the color flicker and reduction in the lowering in the resolution in the diagonal direction can be effected under two contractory conditions. Therefore, these methods have a problem that the image quality is worsened, because these two conditions cannot be satisfied simultaneously.

On the other hand, according to U.S. Pat. No. 4,641,202 stated above, at a variable speed playback, which was a still picture playback, the field conversion was effected by using either one of field signals delayed by one field and two fields, while at a variable speed playback, which was a moving picture (moving image or time-varying image) playback (in which images moved), the field conversion was effected by using signals on a plurality of lines within a same field. Since control was effected so as to forcibly select the interline signal processing particularly at portions, where field jump (field skip) or field repetition was effected, it was difficult to satisfactorily prevent displacements of the images in the vertical direction. Further, in the case where the field conversion was effected by using signals within a same field at moving picture portions, it was difficult to make the position thereof be in accordance with the position of images in still picture portions without significantly worsening the vertical resolution.

Therefore, an object of the present invention is to provide a field converting method for television signals and a device for realizing same capable of removing the drawbacks of the prior art techniques described previously.

Another object of the present invention is to provide a field converting method for television signals and a device for realizing same capable of removing displacements of transitions of the luminance signal, having almost no variations in the resolution even at a variable speed playback.

Still another object of the present invention is to provide a field converting method for television signals and a device for realizing same, which can eliminate displacements of the center of gravity of the images accompanied by the signal processing at the variable speed playback described above, has no color flicker, and further can improve the image quality at the variable speed playback by removing worsening in the resolution in the diagonal direction of the luminance signal and eliminating lowering in the resolution of the chrominance signal.

According to an aspect of the present invention, a field converting device for generating data of new fields from data of an arbitrary field in an interlaced television signal, is comprised of a portion for generating data of a first field by using data of a field to be field-converted and data of a field, which is in an interlaced relation therewith a portion for generating data of a second field by using data of a plurality of lines in the field to be field-converted described above; a movement detection portion for detecting movements of images represented by the data of the field to be field-converted described above; and a portion for outputting selectively the data of the first field and the data of the second field as the data of the new field described above, according to a detection result by the movement detection portion.

According to another aspect of the present invention, a field conversion device for generating data of new fields from data of an arbitrary field in an interlaced composite television signal is comprised of a portion for separating an inputted composite signal of the field at that time; a portion for obtaining a luminance signal of a field, which is in an interlaced relation with the signal of the field at that time, from the inputted composite signal; a portion for obtaining a first luminance signal of the new field by using the luminance signal of the field at that time separated by the separating portion described above and the luminance signal thus obtained of the field, which is in the interlaced relation therewith; a portion for obtaining a second luminance signal of a new field by using the luminance signal of a plurality of lines of the field at that time; a movement detection portion for detecting movements of images represented by the inputted composite signal; a portion for outputting selectively the first luminance signal and the second luminance signal described above according to a detection result by the movement detecting portion; a portion for obtaining a chrominance signal of a new field by using the chrominance signal of the field at that time separated by the separating portion; and an adding portion for adding the luminance signal selectively outputted by the movement detecting portion and the chrominance signal of the new field thus obtained to output a signal obtained by the addition as a signal of the new field described above.

In an example of the present invention, an interpolation filter portion is used, which portion utilizes interfield signals, i.e. data of a field to be converted and data of a field, which is in an interlaced relation with the data of that field.

A reproduced image signal is inputted in a Y/C separation circuit, which Y/C-separates it into a luminance signal C. Y and a carrier chrominance signal. The separated luminance signal Y is stored in a line memory portion, which delays it appropriately, and a field memory portion, while the chrominance signal C is stored in the line memory portion. By means of the movement detection portion, which distinguishes whether the image is a moving picture or a still picture, starting from the field memory, in which the luminance signal is stored, and the separated luminance signal, in the case where the reproduced image signal is a still picture, the output of the interpolation filter signal using the inter-field signal is selected and to the contrary, in the case where it is recognized that it is a moving picture, the output is switched-over so as to select the output of the interpolation filter signal using the interline signal. The signal used for the movement detection, and the portion and signal used for the interpolation filter using the inter-field signal are switched-over, depending on the field continuity in the neighborhood of the reproduced image signal, which is to be converted. On the other hand, the separated chrominance signal C controls the presence or absence of inversion of the sign of the chrominance signal after having been delayed by a predetermined time so as to satisfy the continuity of the carrier chrominance signal of the outputted field and adds the chrominance signal, which has been subjected to the processing, to the luminance signal, which has been subjected to the interpolation filter processing to output them.

The reproduced composite signal is separated into the luminance signal Y and the carrier chrominance signal C, and the luminance signal Y is stored in the line memory portion and the field memory portion. Since the data to be field-converted and the data, which are in the interlaced relation with that field, are inputted in the interpolation filter using the inter-field signal, the field conversion without displacements at the vertical transitions of the luminance signal is effected. On the other hand, the data, which are to be field-converted, and data corresponding to several lines before and after them are inputted in the interpolation filter using the interline signal and the field conversion is effected so that no residual images remain when the reproduced image data represent a moving picture.

Taking into account that the sign of the chrominance signal is inverted for every frame, the movement detection portion compares preceding and succeeding luminance signal data by one frame or preceding and succeeding composite signal or luminance signal data by two frames. If there are no differences between these data sets or the differences are small, the movement detection portion regards the reproduced image as a still picture and selects the interpolation filter using the inter-field signal. On the contrary, if the differences are great, it regards the reproduced image as a moving picture and selects the interpolation filter using the interline signal to effect the field conversion. In this way it is possible to eliminate residual images in the moving picture portion and displacements at the vertical transitions of the luminance signal in the still picture portion.

Further, in the case where some disorder is produced in the continuity of the reproduced image data by skipping or repeating some field data, the movement detection portion detects movements by using preceding and succeeding data by 1 field (corresponding to preceding and succeeding data by 1 frame, taking the skipping processing into account) or preceding and succeeding data by 3 fields (likewise, corresponding to preceding and succeeding data by 2 frames), etc., when the reproduced image is skipped, and preceding and succeeding data sets by 3 fields (corresponding to preceding and succeeding data by 1 frame, taking the repetition processing into account), etc. Similarly, in the interpolation using the interfield data, in the case where the reproduced image is skipped or repeated, the interpolation filter processing is effected by using preceding and succeeding data by 2 fields (corresponding to preceding and succeeding data by 3 fields, taking the skipping processing into account, and to preceding and succeeding data by 1 field, taking the repetition processing into account, which are the data of the field, which is to be converted, and the data of the field, which is in the interlaced relation with that field, which fields are necessary for the inter-field conversion). In this way the processing can be effected, independently from presence or absence of the skipping or the repetition of the field data at the variable speed playback by using data necessary for the respective processing in the movement detection and the conversion using the inter-field data, i.e. the data, which are to be subjected to the field conversion, and the data preceding them by 525 H in the movement detection and the data, which are to be subjected to the field conversion, and the data of the field, which is in the interlaced relation with that field, in the inter-field conversion. Therefore it is possible to prevent worsening in the image quality both in the case where the reproduced image is a moving picture and in the case where it is a still picture.

Further, the center of gravity of the separated chrominance signal C can be made in accordance with the center of gravity of the luminance signal subjected to the interpolation processing by delaying it by means of a line memory or by subjecting it to an interpolation signal. Still further it is possible to maintain the continuity the subcarrier, depending on the presence or absence of the sign inverting processing.

Not only residual images but also displacements at the vertical transitions of the luminance signal can be eliminated by adding the luminance signal and the chrominance signal which have been subjected to these signal processings. Furthermore it is possible to realize the field conversion, by which the continuity of the subcarrier is maintained.

In another example of the present invention, the luminance signal Y and the carrier chrominance signal C are separated (Y/C separation) by using the correlation of signals between different frames for the still picture portion and the correlation of signals between different lines for the moving picture portion. Further, an interpolation filter portion is used, by which the inter-field signal is used for the still picture portion and the inter-field signal is used for the moving picture portion. Further movements in the image are detected by the movement detection portion and the inter-field signal processing and the interline signal processing by the interpolation filter are added while varying the mixing ratio, on the basis of the output signal of this detection portion. Furthermore the luminance signal and the chrominance signal are added to be outputted.

In addition, in the case where a field is repeated by the variable speed playback (special playback), the repeated field is not written in the memory. When a field is skipped and the Y/C separation using the inter-field correlation cannot be effected, the Y/C separation using the interline correlation is forcibly effected. Similarly, in the case where the movement detection using the inter-field correlation cannot be effected, it is supposed that that movement does not exist and movements are detected by using the correlation between other frames.

The reproduced composite image signal is separated into a luminance signal Y and a carrier chrominance signal C by a frame Y/C separation circuit and a line Y/C separation circuit. Further also, a composite image signal delayed by 1 field is separated into a luminance signal and a chrominance signal by the frame Y/C separation circuit. In a scanning line conversion filter using an inter-field signal, since data, which is to be interlaced, are inputted therein, the field conversion is effected without displacements at the vertical transitions of the luminance signal. In addition, the data, which are to be field-converted, and the data of the lines preceding and succeeding the relevant line are inputted appropriately in a scanning line conversion filter using an interline signal and such a field conversion that no residual images remain, when the reproduced image data represent a moving picture.

The movement detection portion compares data preceding and succeeding by 1 frame and data preceding and succeeding by 2 frames. If there are no differences therebetween, the reproduced image can be regarded as a still picture and the field conversion is effected by selecting the scanning line conversion filter using an inter-field signal. If not, the field conversion is effected by selecting the scanning line conversion filter using an interline signal. In this way it is possible to eliminate residual images and displacements at the vertical transitions of the luminance signal for still picture portions.

Further, the separated carrier chrominance signal C can maintain the continuity of the color sub-carrier by controlling the presence or absence of the phase inversion.

By adding the luminance signal and the chrominance signal subjected to these signal processings, it is possible to eliminate both residual images and displacements at the vertical transitions of the luminance signal and to realize the field conversion, keeping the continuity of the color subcarrier. Further, since in the frame Y/C separation circuit, it is possible to construct comb-shaped filters over the whole region of the image signal without lowering the resolution, it is possible to remove lowering in the resolution of the chrominance signal, residual carrier chrominance signal in the luminance signal and color flicker.

Further, for portions where fields are repeated, a same signal processing can be effected repeatedly by interrupting to write the signals in the memories.

In the case where fields are skipped, when the inter-frame comb-shaped signal processing cannot be effected, the separation of the luminance signal from the carrier chrominance signal is made possible by forcibly selecting the interline Y/C separation. Furthermore, in the case where no difference between the signals preceding and succeeding by 1 frame can be formed, they are treated, supposing that there are no differences between the signals, and movements are detected by differences between the signals preceding and succeeding by 2 frames. Similarly, in the case where no difference between the signals preceding and succeeding by 2 frames can be formed, they are treated, supposing that there are no differences between the signals, and movements are detected by differences between the signals preceding and succeeding by 1 frame. In this way, also in the case where the fields are skipped, the inter-field scanning line interpolation can be effected similarly to a usual case.

BRIEF DESCRIPTION OF THE DRAWINGS

FIG. 5 is a scheme for explaining the control operation of switch control circuits in FIG. 4;

FIG. 14 is a scheme indicating a norm for the effective start line of different fields for a D2-type digital VTR;

FIG. 15 is a scheme indicating a conversion rule for the effective start line, depending on the field number of the reproduced image signal and the output image signal at the variable speed playback;

FIG. 26 is a scheme for explaining the converting operation of the field conversion device indicated in FIG. 24;

FIGS. 31 and 32 are schemes for explaining the converting operation of the field conversion device indicated in FIG. 24;

DESCRIPTION OF THE PREFERRED EMBODIMENTS

Several embodiments of the field conversion device for television signals according to the present invention will be explained, referring to the attached drawings.

Figure 3:
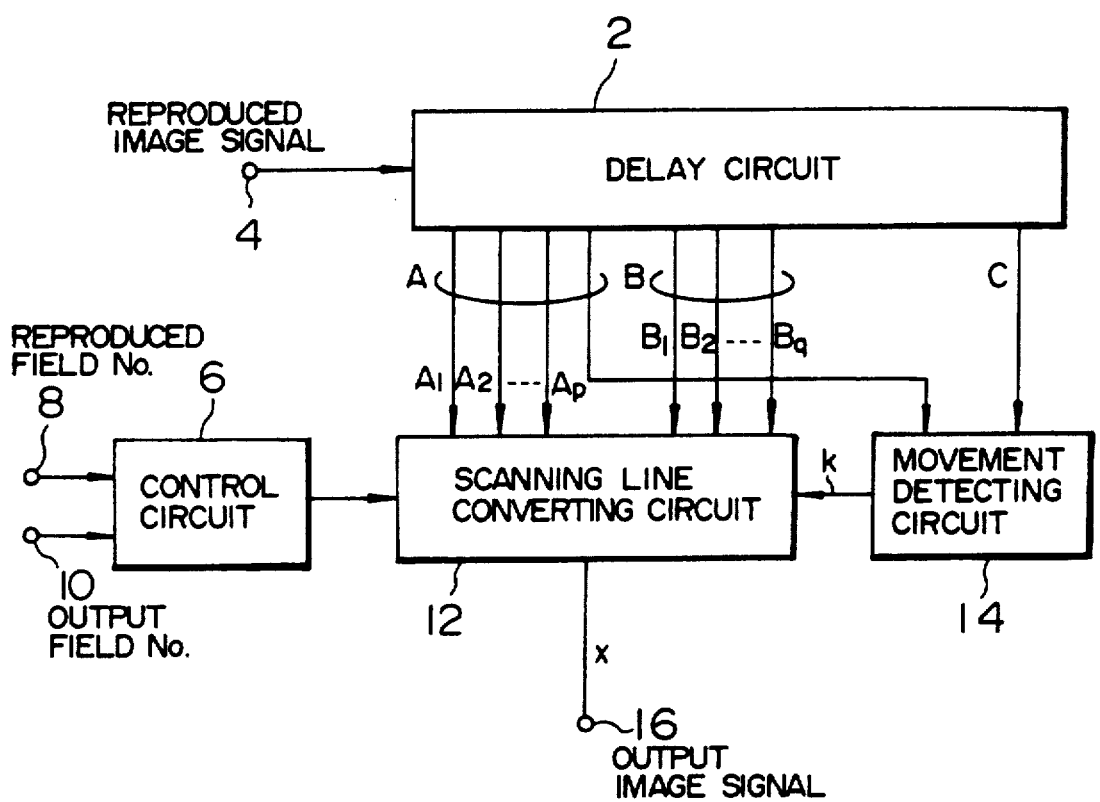
FIG. 3 is a scheme showing the construction indicating the conception of the field conversion device according to the present invention.

Before the explanation of the embodiments, the conception of the field conversion device according to the present invention will be explained, referring to a conceptual construction scheme indicated in FIG. 3. In the figure, a reproduced image signal for television signal given to an input terminal 4 is sent to a delay circuit 2. The delay circuit 2 outputs an image signal C, which is displaced by 1 or 2 frames with respect to image signals A of the field at that time, i.e. $A_1$ to $A_p$, and image signals B, which are in an interlaced relation with the signals A, i.e. signals $B_1$ to $B_q$ for scanning lines different from those of the signals A. The image signals $A_2$ to $A_q$ are signals, which are delayed by predetermined different amounts with respect to the signal $A_1$ of the field at that time, while the image signals $B_2$ to $B_1$ are signals, which are delayed by predetermined different amounts with respect to the signal $B_1$.

A movement detection circuit 14 detects movements in the image on the basis of the image signals A and C. Results of this detection are given to a scanning line conversion circuit 12 as a signal k. Here k is a value indicating the degree of the movements. For example, $0 \leq k \leq 1$ and it is supposed that $k=1$ represents a moving picture, in which movements in the image are great, and $k=0$ represents a still picture, the movements in the image being greater with k closer to 1.

A signal indicating the field No. of the reproduced image signal (reproduced field No.) inputted in the input terminal 8 and a signal indicating the field No. of the output image signal (output field No.) inputted in the input terminal 10 are given in a control circuit 6. This control circuit selects values from groups of coefficients $l_1$ to $l_p$, $m_{11}$ to $m_{1p}$ and $m_{21}$ to $m_{2q}$ indicated below of the scanning line conversion circuit 12, depending on e.g. whether both the field Nos. are odd or even (odd or even number accordance) or one of the field Nos. is odd and the other of them is even (odd or even number disaccordance).

The scanning line conversion circuit 12 includes an intra-field interpolation circuit and an inter-field interpolation circuit, which output signals L and F, respectively, indicated below;

$$L = l_1 A_1 + l_2 A_2 + \ldots + l_p A_p$$

$$F = m_{11}A_1 + m_{12}A_2 + \ldots + m_{1p}A_p + m_{21}B_1 + m_{22}B_2 + \ldots + m_{2q}B_q$$

$$l_1 + l_2 + \ldots + l_p = 1$$

$$m_{11} + m_{12} + \ldots + m_{1p} + m_{21} + m_{22} + \ldots + m_{2q} = 1$$

The output signal X of the scanning line convertion circuit 12 is expressed by $X = kL + (1-k)F$. Consequently $$X = kL + (1-k)F$$
$$= h_{11}A_1 + h_{12}A_2 + \ldots + h_{1p}A_p + h_{21}B_1 + h_{22}B_2 + \ldots + h_{2q}B_q$$
$$h_{11} + h_{12} + \ldots + h_{1p} + h_{21} + h_{22} + \ldots + h_{2q} = 1$$

is valid, where hs are functions of k.

Figure 4:
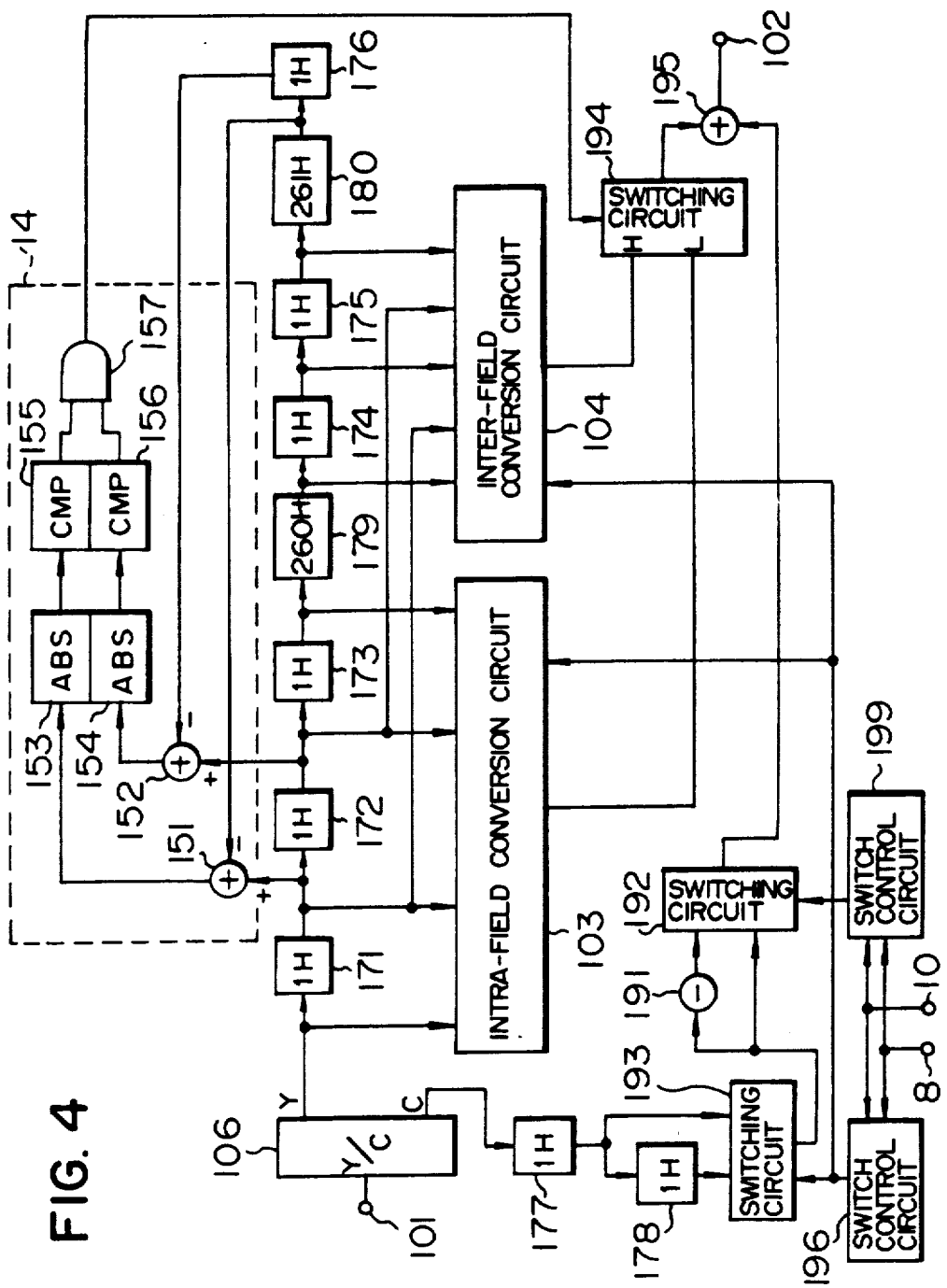
FIG. 4 is a scheme showing the construction indicating a first embodiment of the field conversion device according to the present invention.

Now several embodiments of the present invention will be explained, referring to the attached drawings. In the following description items having a same reference numeral have a same function and explanation thereof will be omitted. FIG. 4 is a block diagram indicating the construction of the first embodiment of the present invention. In FIG. 4, reference numeral 101 is an input terminal for a reduced image signal (composite signal); 102 is an output terminal for an image signal (output image signal), which has been subjected to the field conversion; 171 to 178 are delay lines, each of which effects a delay of one horizontal scanning period (hereinbelow denoted by 1 H); 179 and 180 are delay lines effecting delays of 260 H and 261 H, respectively; 103 is a field conversion circuit, which effects a field conversion, producing no flickers due to variations in the resolution by using data within only one field (intra-field conversion circuit); 104 is an inter-field conversion circuit, which effects a field conversion, in which displacements at the transitions of the luminance signal are eliminated, by using data in a plurality of fields; 14 is a movement detection circuit, which detects movements in the image; 151 and 152 are adders; 153 and 154 are absolute circuits, which output absolute values of inputted numerical values having plus or minus signs; 155 and 156 are comparators, which compare inputted values with predetermined values in the magnitude; 157 is an AND gate; 106 is a Y/C separation circuit, which separates a composite signal into a luminance signal Y and a chrominance signal C, i.e. effecting the Y/C separation; 191 is a sign inversion circuit, which inverts a plus or minus sign of an inputted chrominance signal; 192 is a switching circuit, which selects a sign inverted chrominance signal and a sign not-inverted chrominance signal; 193 is a switching circuit, which selects a signal obtained by delaying the separated chrominance signal by 1 H and a signal obtained by delaying further the signal thus obtained by 1 H; 194 is a switching circuit, which switches-over an output signal of the intra-field conversion circuit 103 and an output signal of the inter-field conversion circuit 104 according to an output of the movement detection circuit 14; and 195 is an adder, which adds the luminance signal and the chrominance signal, which have been subjected to the field converting processing. A switch control circuit 196 detects the odd and even number accordance or disaccordance of the reproduced field No. and the output field No. inputted in the terminals 8 and 10, respectively, to control the switching circuit 193 according to the control operation indicated in FIG. 5, on the basis of a result of detection, and further to control the intrafield conversion circuit 103 and the inter-field conversion circuit 104.

Further, a switch control circuit 199 controls the switching circuit 192 according to the reproduced field No. and the output field No., as indicated in FIG. 5. The delay lines 171-176, 179 and 180 in FIG. 4 correspond to the delay circuit 2 in FIG. 3; the switch control circuits 196 and 199 to the control circuit 6; and the conversion circuit 103 and 104 to the scanning line conversion circuit 12.

Figure 6:
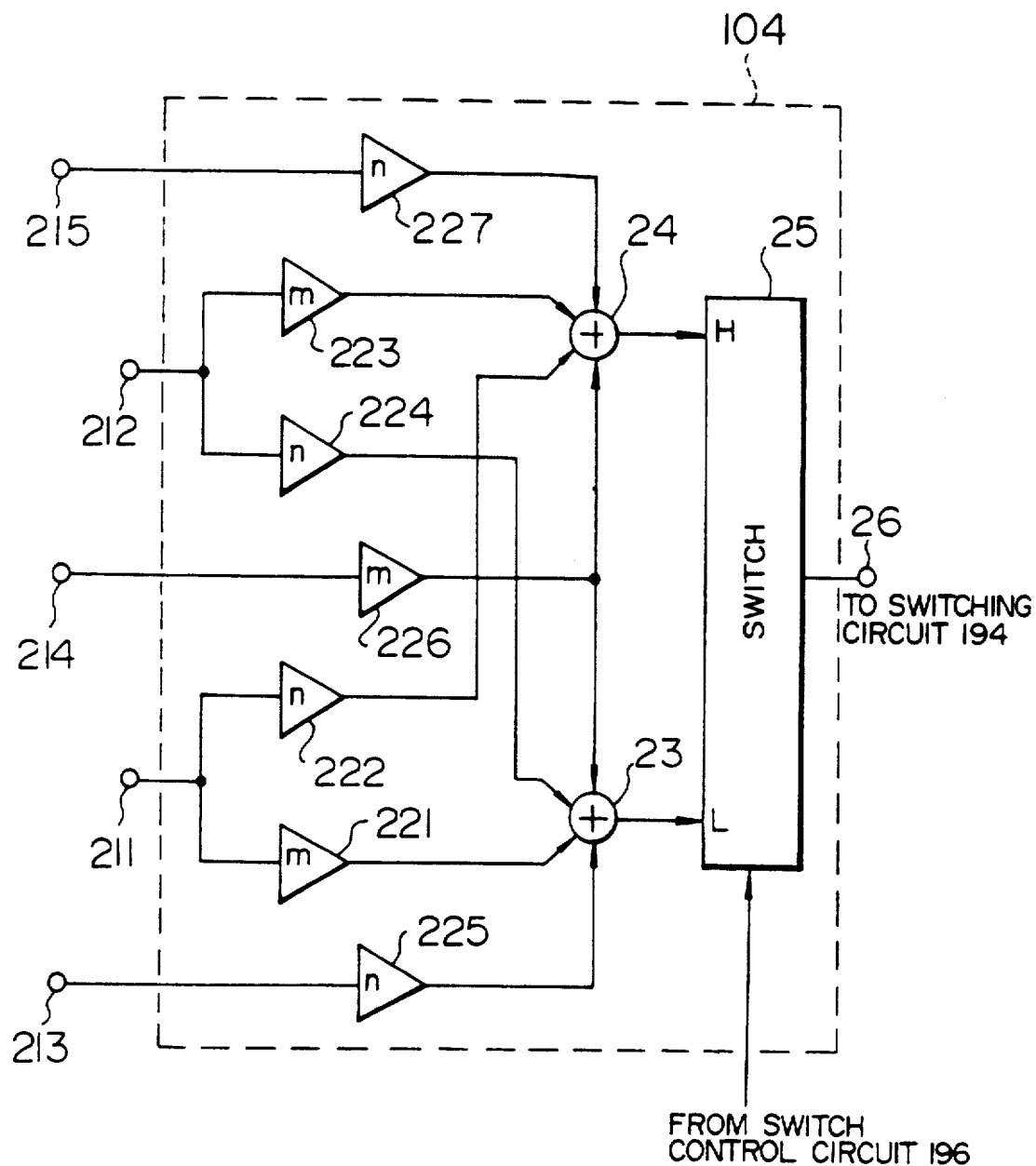
FIG. 6 is a scheme showing the construction indicating an example of the inter-field conversion circuit indicated in FIG. 4.

FIG. 6 is a block diagram showing the construction of an example of the inter-field conversion circuit indicated in FIG. 4.

Figure 1:
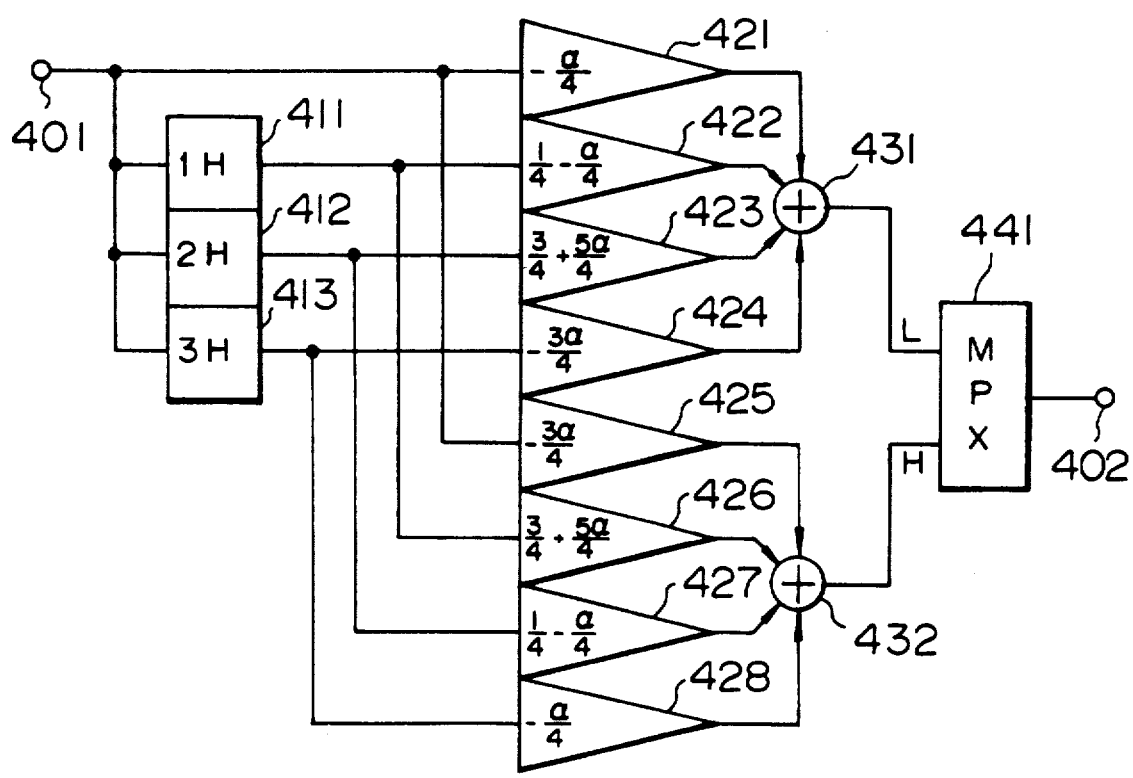
FIG. 1 is a scheme showing the construction of an example of the interpolation filter in a prior art field conversion device.

In this figure, reference numerals 211 to 215 are input terminals, through which the luminance signal after the Y/C separation of the reproduced image signal is inputted, among which data obtained by delaying the output signal of the Y/C separation circuit 106 indicated in FIG. 1 by 1 H are inputted in the terminal 211; data obtained by delaying same by 2 H are inputted in the terminal 212; data obtained by delaying same by 263 H are inputted in the terminal 213; data obtained by delaying same by 264 H are inputted in the terminal 211; and data obtained by delaying same by 265 H are inputted in the terminal 215.

221, 223 and 226 are coefficient multipliers having a coefficient m while 222, 224, 225 and 227 are coefficient multipliers having a coefficient n. The coefficients m and n have a relationship of $2(m+n)=1$. Further, 23 and 24 are adders; 25 is a switch, which switches-over the outputs of the adders 23 and 24; and 26 is an output terminal of the data, which has been subjected to the inter-field conversion, the output thereof being inputted in the H input of the switch 194 in FIG. 4.

Figure 2A:
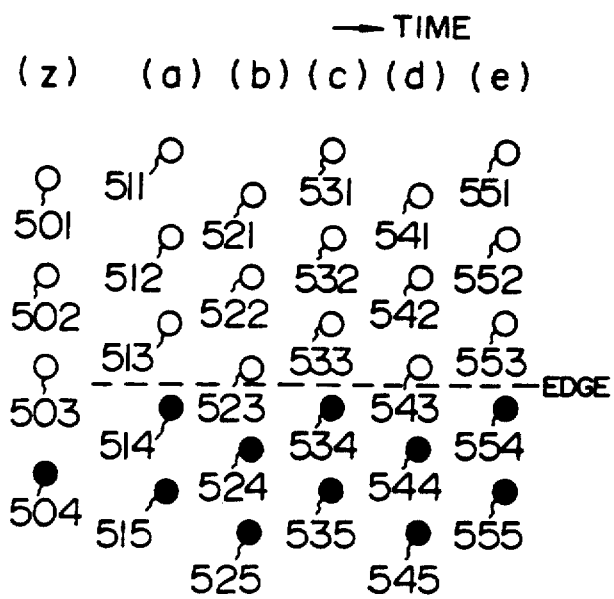
FIGS. 2A to 2C are schemes representing images for explaining field converting characteristics at the variable speed playback of the prior art field conversion device at the variable speed playback.
Figure 2B:
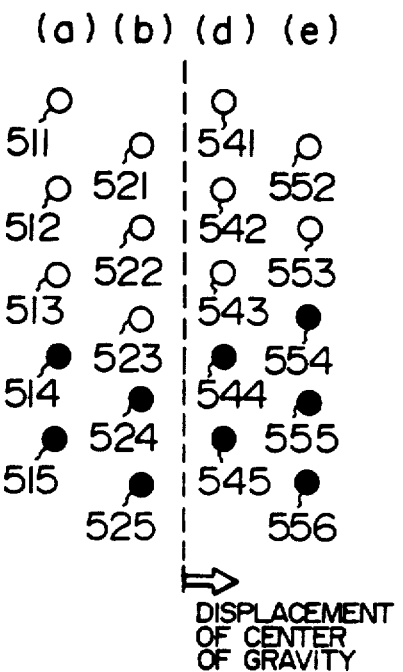
Figure 2C:
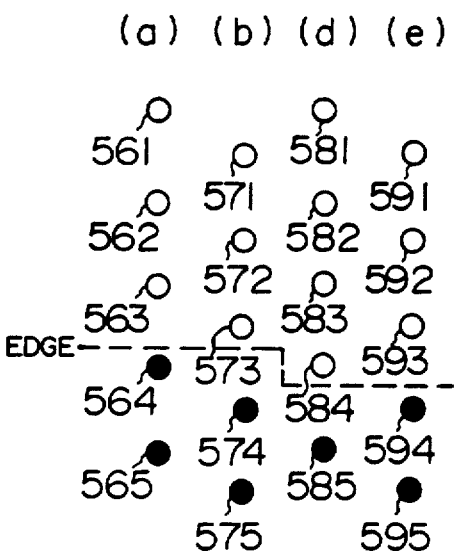
Figure 2D:
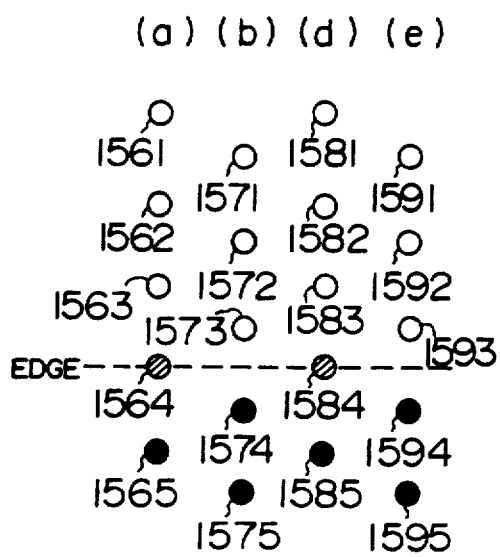
FIG. 2D is a scheme representing an image for explaining field converting characteristics at the variable speed playback by the field converting method according to the present invention.

A reproduced composite signal inputted through the reproduced signal input terminal 101 in FIG. 4 is inputted at first in the Y/C separation circuit 106 and separated into a luminance signal and a chrominance signal. The luminance signal is delayed successively by delay lines 171 to 176, 179 and 180. The output luminance signal of the Y/C separation circuit 106, the 1 H delayed data; the 2 H delayed data; and the 3 H delayed data; the 2 H delayed data; and the 3 H delayed data of the luminance signal outputted by the Y/C separation circuit 106 are inputted in an intra-field conversion circuit 103. From these four kinds of the inputted luminance signal data, lines necessary for the fields, which are converted by the interpolation filter device as indicated in FIG. 1, described e.g. in JP-A-2-132984, are formed and the output data thus formed are inputted in the L input of the switch 194. A switch 441 in the intra-field conversion circuit 103 is controlled by an output of the switch control circuit 196 so as to select an output of an adder 432 by the odd or even number accordance and an output of an adder 431, if they are in odd or even number disaccordance. Further outputs of the delay lines 171, 172, 179, 174 and 175, i.e., the 1 H delayed data, the 2 H delayed data, the 263 H delayed data, the 264 H delayed data and the 265 H delayed data are inputted in the inter-field conversion circuit 104 through the input terminals 211, 212, 213, 214 and 215, respectively. The data inputted through the input terminals 213, 214 and 215 are data preceding the data inputted through the input terminals 211 and 212 by 1 field. The luminance signal inputted through the input terminal 211 is inputted in the coefficient multipliers 221 and 222; the signal inputted through the input terminal 212 is inputted in the coefficient multipliers 223 and 224; the signal inputted through the input terminal 213 is inputted in the coefficient multiplier 225; the signal inputted through the input terminal 214 is inputted in the coefficient multiplier 226; and the signal inputted through the input terminal 215 is inputted in the coefficient multiplier 227. As described previously, the values of the different coefficient multipliers m and n are in a relationship of $2(m+n)=1$ and it is possible to vary frequency characteristics of the filters in the inter-field conversion circuit by varying the values of these m and n. In the present embodiment, e.g. $m=\frac{3}{8}$ and $n=-\frac{1}{8}$, and it is a matter of course that the frequency characteristics of the filter selected, if the field Nos. of the reproduced image signal and the output image signal are in odd or even number accordance, i.e. filter consisting of the coefficient multipliers 221, 224, 225 and 226 are identical to the frequency characteristics of the filter selected, if they are in odd or even number disaccordance, i.e. filter consisting of the coefficient multipliers 222, 223, 226 and 227. The outputs of the coefficient multipliers 221, 224, 225 and 226 are inputted in the adder 23 to form the field conversion data, when the field numbers of the reproduced image signal and the output image signal are in odd or even number accordance, while the outputs of the coefficient multipliers 222, 223, 226 and 227 are inputted in the adder 24 to form the field conversion data, when the field numbers of the reproduced image signal and the output image signal are in odd or even number disaccordance. The switch 25 selects the L input, i.e. the output of the adder 23, responding to a signal from the switch control circuit 196 indicating the odd or even number accordance, and the H input, i.e. the output of the adder 24, responding to a signal therefrom, responding to a signal indicating the odd or even number disaccordance. In FIG. 2A, the reproduced image signal and the luminance signal reproduced in the order of (z), (a) to (e) are outputted as the luminance signal Y of the Y/C separation circuit 106 in FIG. 4. (a) and (b) in FIG. 2D are field conversion data in the case where the field Nos. of the reproduced signal and the output signal are in odd or even number accordance. For example, data 1564 are data outputted, when data 513, 503, 514 and 504 in FIG. 2A are inputted in the input terminals 212, 214, 211 and 213 in FIG. 6, respectively, and the switch 25 selects the L input. (c) and (d) in FIG. 2D are field conversion data in the case where the field Nos. of the reproduced signal and the output signal are in odd or even number disaccordance. For example, data 1593 are data outputted, when data 542, 553, 543 and 554 are inputted in the input terminals 215, 212, 214 and 211 in FIG. 6, respectively, and the switch 25 selects the H input. In these data formed by the inter-field conversion circuit, not only the frequency characteristics but also the transitions of the luminance signal remain identical, both in the case of the odd or even number accordance and in the case of the odd or even number disaccordance and therefore it is possible to eliminate displacements of the vertical transitions of the luminance signal due to the field converting processing. The outputs of the adders in FIG. 6 are inputted in the switch 25, which selects the output of the adder connected with the L input, in the case where the field Nos. of the reproduced image signal and the output image signal are in odd or even number accordance, and the output of the adder connected with the H input, in the case where they are in odd or even number disaccordance. The output of this switch 25 is inputted in the H input terminal of the switching circuit 194 in FIG. 4.

Further, the data, which are to be field-converted, and the data obtained by delaying them by 525 H, i.e. the output signal of the 1 H delay line 171 and the output signal of the 261 H delay line 180 in FIG. 4 are given to adder 151 in FIG. 4 to be subjected to an adding processing. On the other hand, the data preceding the data, which are to be field-converted, by 1 H and the data obtained by delaying them by 525 H, i.e. the output signal of the 1 H delay line and the output signal of the 1 H delay line 176 are inputted in an adder 152 to be subjected to an adding processing. The outputs of the different adders 151 and 152 are compared with predetermined values by comparators 155 and 156 after having formed absolute values by means of absolute circuits 153 and 154, respectively. In the case where the outputs of both the absolute circuits 153 and 154 are smaller than the predetermined values, it is supposed that there are no movements in the image in the neighborhood of the data, which are to be field-converted, and the switching circuit 194 is controlled so as to select the output signal of the inter-field conversion circuit 104 at the H input thereof and if not, it is judged that the image is a moving picture and it is controlled so as to select the output signal of the intra-field conversion circuit 103 at the L input.

On the other hand, the chrominance signal C separated by the Y/C separation circuit 106 is delayed by a delay line 177 by 1 H and is inputted in the switching circuit 193 together with the signal delayed further by a delay line 178 by 1 H and and either one of them is selected. The luminance signal Y is subjected to an interpolation processing in the intra-field conversion circuit 103 and the inter-field conversion circuit 104, which gives rise to a delay, accompanied by this interpolation processing. The delay lines 177 and 178 are disposed for compensating this delay. In the case where the field No. of the reproduced image signal inputted through the input terminal 101 and the field No. of the output image signal outputted through the output terminal 102, delayed by the interpolation processing, are in odd or even number accordance, since the delay of the luminance signal after the interpolation processing with respect to the inputted image signal is 1.25 H, the switching circuit 193 selects the signal delayed by 1 H by the delay 177 as the chrominance signal to output it. In the case where the two field Nos. are in odd or even number disaccordance, the delay of the luminance signal after the interpolation processing is 175 H with respect to the image signal inputted through the terminal 101, the switching circuit 193 selects the signal delayed by 2 H in total by the delay lines 177 and 178 to output it. The chrominance signal obtained by inverting the sign of the output signal of the switching circuit 193 by the sign inversion circuit 191 and the output chrominance signal of the switching circuit 193 are inputted in the switching circuit 192. Thus, a chrominance signal having a sign, which is in accordance with the field No. of the output image signal according to FIG. 5, is selected and outputted. In other words, in the case where the conversion is effected from the first field into the second field on the third field, the chrominance signal, whose sign is inverted by the sign inversion circuit 191, is selected. To the contrary, in the case where the conversion is effected from the first field into the fourth field or the first field, the output of the switching circuit 193 is selected without inverting the sign to be outputted.

The chrominance signal processing circuit described above is simplified one and although it has an advantage that the circuit scale is small, the delay times of the luminance signal and the chrominance signal are not completely in accordance. Consequently, if the chrominance signal is not subjected to the signal processing as described above, but the same field converting processing as that effected for the luminance signal is effected therefor and thereafter the control of the presence or absence of the chrominance signal inverting processing is effected so as to satisfy the continuity of the subcarrier of the output image signal, a processing of the chrominance signal producing no difference in the delay amount thereof from the luminance signal at all is made possible.

An adder 195 adds the chrominance signal outputted from the switching circuit 194, which has been subjected to the field conversion, and the chrominance signal, for which the control of the presence or absence of the sign inverting processing is effected so as to satisfy the continuity of the subcarrier outputted from the switching circuit 192, to output the sum of them as a composite signal. As the result, whatever image is inputted in the input terminal 101 as the reproduced image signal, the field conversion is effected by using the intra-field conversion circuit using interline data for an image, in which there are many movements, and the inter-field conversion circuit using data of a plurality of field, from which an output image, where displacements of the transitions of the luminance signal are removed, is outputted, for an image, in which there are few movements, and in this way it is possible to output image data having a target field No. in a good state.

Figure 7:
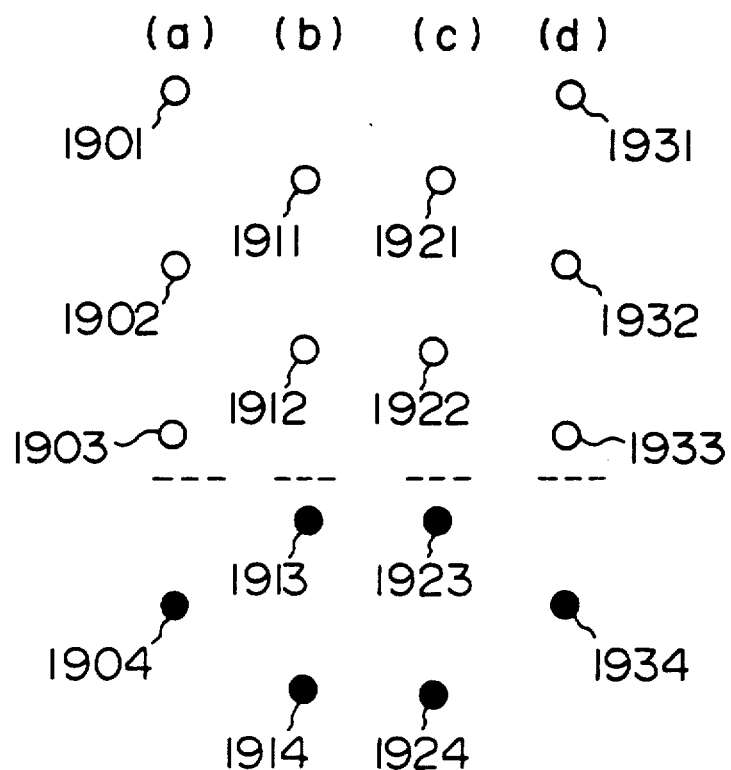
FIG. 7 is a scheme representing an image for explaining the processing in the present embodiment, when field data are skipped at the variable speed playback.

A case where deviations are produced in the correlation between different fields by the fact that skipping or repetition of data is effected in field unit at the variable speed playback, will be explained, referring to FIG. 7. FIG. 7 indicates a state, where one field between (b) and (c) is skipped and (a), (b), (c) and (d) are outputted in this order as luminance signals Y of the Y/C separation circuit in FIG. 4. In FIG. 7, 1901 to 1903, 1911, 1912, 1922 and 1931 to 1933 are pixels having high luminances, while 1904, 1913, 1914, 1923, 1924 and 1934 are pixels having low luminances. In this case, when field conversion data of the data 1923 indicated at (c) in FIG. 7 are formed, the data 1923 and the data 1903 at (c) in FIG. 7 are inputted in the adder 151 in the movement detection circuit 14 indicated in FIG. 4 and further the data 1922 and the data 1902 indicated at (c) in FIG. 7 are inputted in the adder 152 indicated in FIG. 4. The movement detection circuit 14 indicated in FIG. 4 regards the part, where field data have been skipped, at this variable speed playback as a moving picture and the switching circuit 194 selects the intra-field conversion circuit 103 for the field conversion circuit. Consequently, in the case where the variable speed playback image is a moving picture, there are no problems at all, and even for a still picture, since the field conversion circuit using no inter-field data is selected only for the part, where field data have been skipped, no significant worsening in the image quality takes place. This is true also in the case where field data are repeatedly inputted.

The performance of the field conversion device indicated in FIG. 4, which is the embodiment of the present invention described above, depends on the performance of the Y/C separation circuit indicated in FIG. 4.

Figure 8:
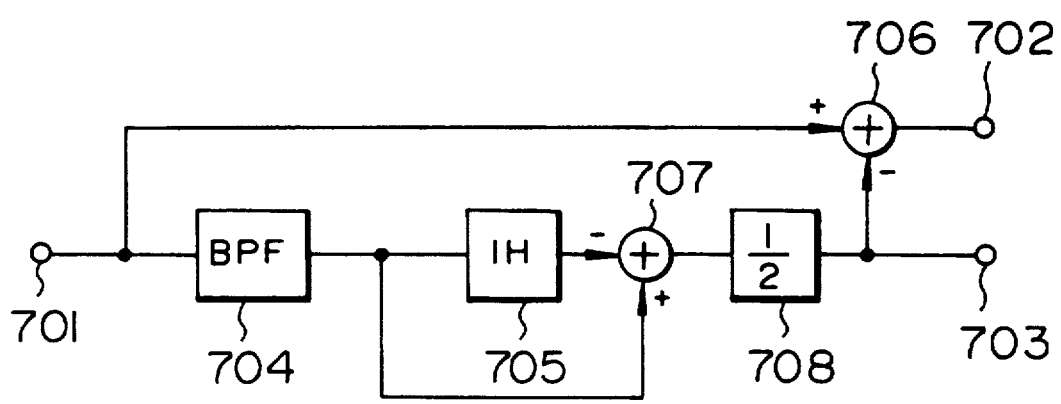
FIG. 8 is a block diagram showing an example of the Y/C separation circuit indicated in FIG. 4.

FIG. 8 shows an example of the Y/C separation circuit, in which 701 is an input terminal for the composite signal; 702 is an output terminal of the separated luminance signal Y; 703 is similarly an output terminal for the carrier chrominance signal C; 704 is a band path filter (BPF); 705 is a 1 H delay line, 706 and 707 are subtracters; and 708 an attenuation circuit attenuating the amplitude to ½. A composite signal inputted through the input terminal 701 is inputted in the band pass filter 704. An output of the band pass filter 704 and a signal obtained by delaying that signal by 1 H by the delay line 705 are inputted in the subtracter 707 to be subjected there to a subtracting processing. The attenuation circuit 708 decreases the amplitude to ½ and thus a C-type comb filter for separating the C signal is formed. On the other hand, the input composite signal from the input terminal 701 and the C signal outputted by the subtracter 707 are inputted in the subtracter 706 to be subjected there to a subtracting processing so that the Y signal is separated.

Figure 9:
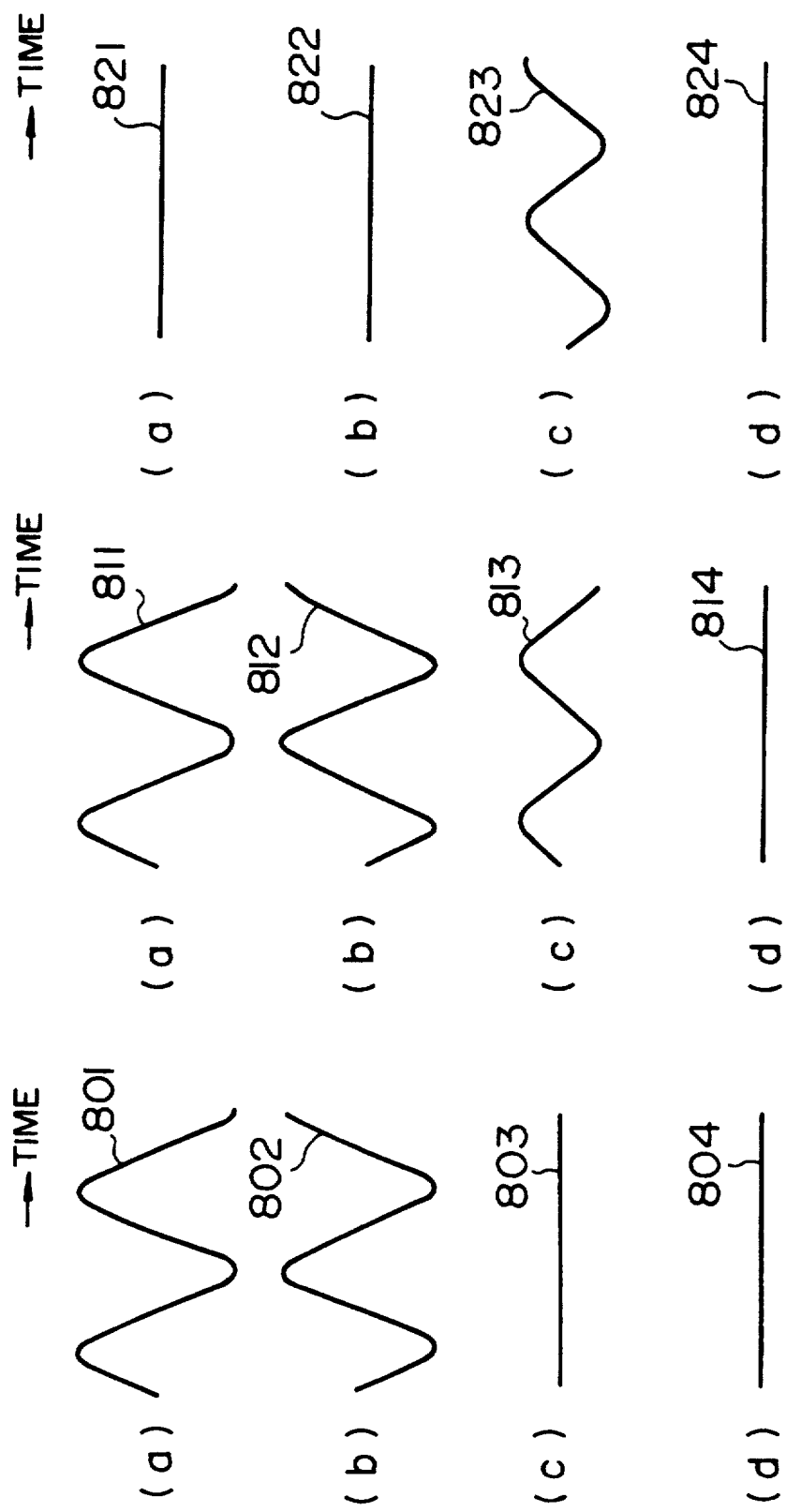
FIGS. 9A to 9C shows waveforms for explaining leakage of the chrominance signal to the luminance signal in the Y/C separation circuit indicated in FIG. 8.

FIGS. 9A to 9C show an example of the waveform of the reproduced image signal. FIG. 9A indicates the waveform of the composite signal inputted in the Y/C separation circuit indicated in FIG. 8, in which 801 and 802 are colored signals are 803 and 804 are not-colored signals. On the other hand, FIGS. 9A and 9B and 9C show chrominance signals C and luminance signals Y separated by the Y/C separation circuit indicated in FIG. 8. For example, the composite signal 801 is separated into a chrominance signal 811 and a luminance signal 821. In the case where a fixed type Y/C separation circuit as indicated in FIG. 8 is used, at a part, where color disappears in the vertical direction, an erroneous operation in the Y/C separation as a chrominance signal 813 and a luminance signal 823 takes place.

In the movement detection circuit in the field conversion device according to the present embodiment, since it is driven by the luminance signal of the data of the field, which are to be field-converted, and the luminance signal of the data preceding them by 1 frame, leakage of the chrominance signal to the luminance signal as described previously gives rise to erroneous operations in the field converting processing and the movement detection. Therefore, it is necessary to dispose an adaptive Y/C separation circuit, in which the separating processing is adaptively varied, depending on a pattern (image), differently from the Y/C separation circuit indicated in FIG. 8. If a Y/C separation circuit described e.g. in IEEE transactions on Consumer Electronics, Vol. CE-31, No. 3, August 1985, pp. 240-254, "FLICKER-FREE NON INTERLACED RECEIVING SYSTEM FOR STANDARD COLOR TV SIGNALS" is used, no erroneous separation takes place even at the vertical transitions of the chrominance signal as described previously, and consequently no erroneous operation in the movement detection is produced. The Y/C separation circuit described in the literature stated above is constructed by using a line delay line. The Y/C separation circuit constructed by using a line delay line cannot distinguish essentially the chrominance signal from an inclined line of the luminance signal, but it regards all inclined lines as chrominance signals. In order to avoid this, it is necessary to use a three-dimensional comb-shaped filter utilizing a frame memory.

Therefore, it is preferable to use a so-called three-dimensional Y/C separation circuit for the Y/C separation circuit 106 in FIG. 4, which works according to a system, which switches-over the line Y/C separation, the frame Y/C separation, etc., depending on whether the reproduced image is a moving or still picture. In this case, a movement detection circuit for determining, which should be selected, the frame Y/C separation or the line Y/C separation, in necessary. A circuit used for selecting the intra-field conversion circuit and the inter-field conversion circuit in the field conversion circuit can be used in common for this purpose. Further, since the continuity of the field number can become discontinuous by skipping or repetition of some fields at the variable speed playback in a VTR, a circuit, which detects the discontinuity of the field number and varies the processing, depending thereon, i.e. a circuit, which varies the processing in such a manner that, at a usual playback, if the Y/C separation is effected by using the data of the field, which are to be Y/C-separated, and the data preceding them by 2 fields (corresponding to the data preceding them by 1 frame, if skipping processing is taken into account), the data of the field, which are to be Y/C-separated, and the data preceding them by 1 field are used in the case where fields are skipped (e.g., 1.1 times faster playback, etc., (normally 1.0 to 1.2 times)) and the data of the field, which are to be Y/C-separated, and the data preceding them by 3 fields (corresponding to the data preceding them by 1 frame, if the case where data of 1 field are outputted repeatedly twice) are used in the case where fields are repeated (e.g. slow playback).

By using the adaptive Y/C separation circuit for the Y/C separation circuit 106 in FIG. 4, even at a place, where color disappears abruptly in a reproduced image, as indicated in FIG. 9A, it is possible to correctly separate the luminance signal from the chrominance signal and to detect movements correctly. As the result, the field conversion can be effected by selecting a circuit suitable for the reproduced image from the intra-field conversion circuit and the inter-field conversion circuit also in the field conversion circuit. Further, by using the three-dimensional Y/C separation circuit for the Y/C separating circuit 106, no erroneous separation takes place even at a part of an inclined line, and thus it is possible to remove worsening in the image quality by the inclined line.

Figure 10:
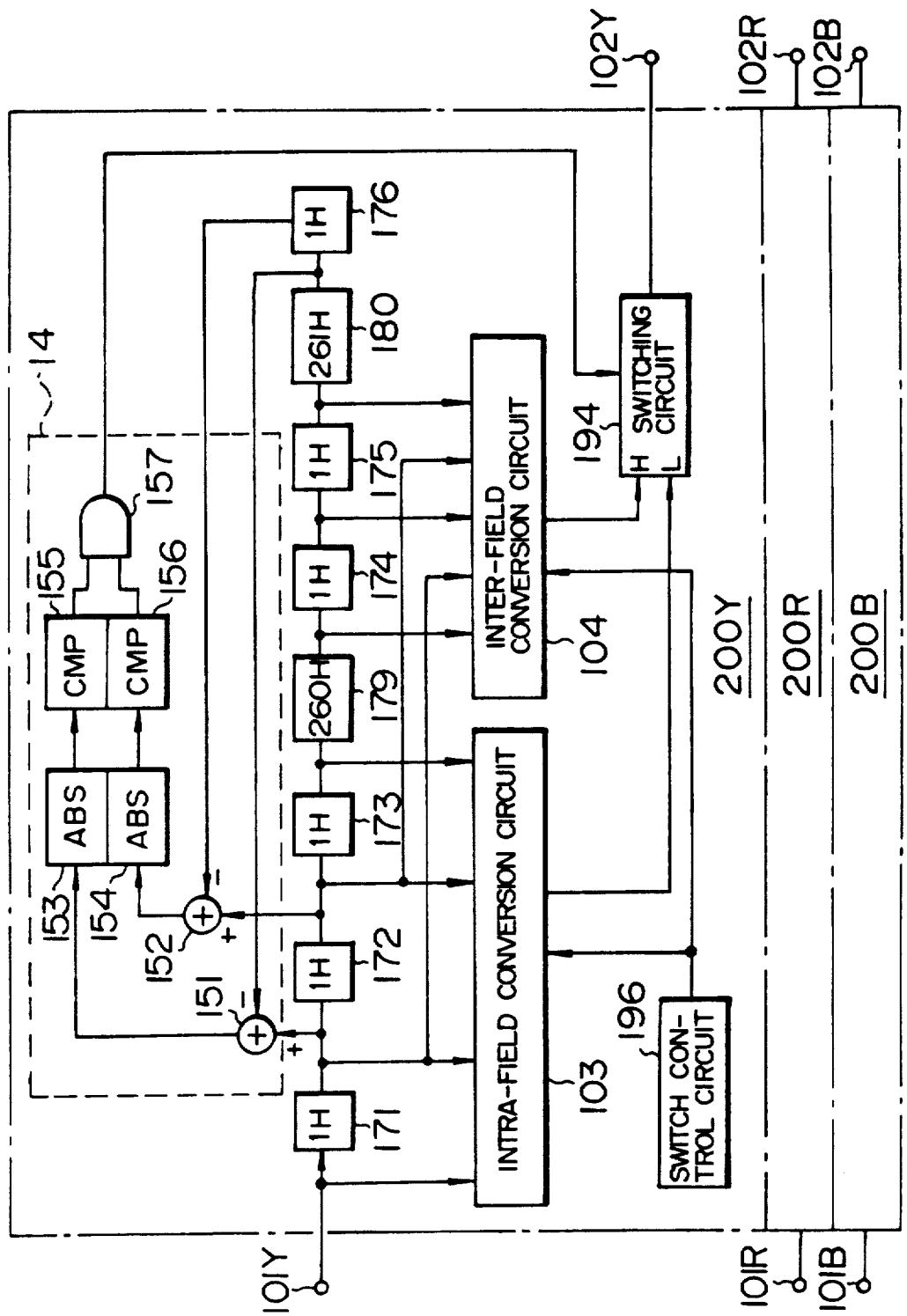
FIG. 10 is a block diagram showing a modified example of the embodiment indicated in FIG. 4.

FIG. 10 shows a modified example of the embodiment indicated in FIG. 4. Contrarily to the fact that the field conversion processing is effected by giving the composite signal to the input terminal 101, in the present embodiment, component signals, e.g. a luminance signal and color difference signals (R-Y) and (B-Y) of the reproduced image signal are inputted in input terminals 101Y, 101R and 101B in field conversion portions 200Y, 200R and 200B, respectively, and a luminance signal and color difference signals, which have been field-converted, are obtained from output terminals 102Y, 102R and 102B, respectively.

The field conversion portions 200Y, 200R and 200B for the luminance signal and the color difference signals have the same construction and the construction of each of the field conversion portions is identical to that of the field conversion device for the luminance signal indicated in FIG. 4. In the present embodiment, not only the luminance signals but also the color difference signals are subjected to the field converting processing and the effects similar to those obtained by the embodiment indicated in FIG. 4 can be obtained.

Figure 11:
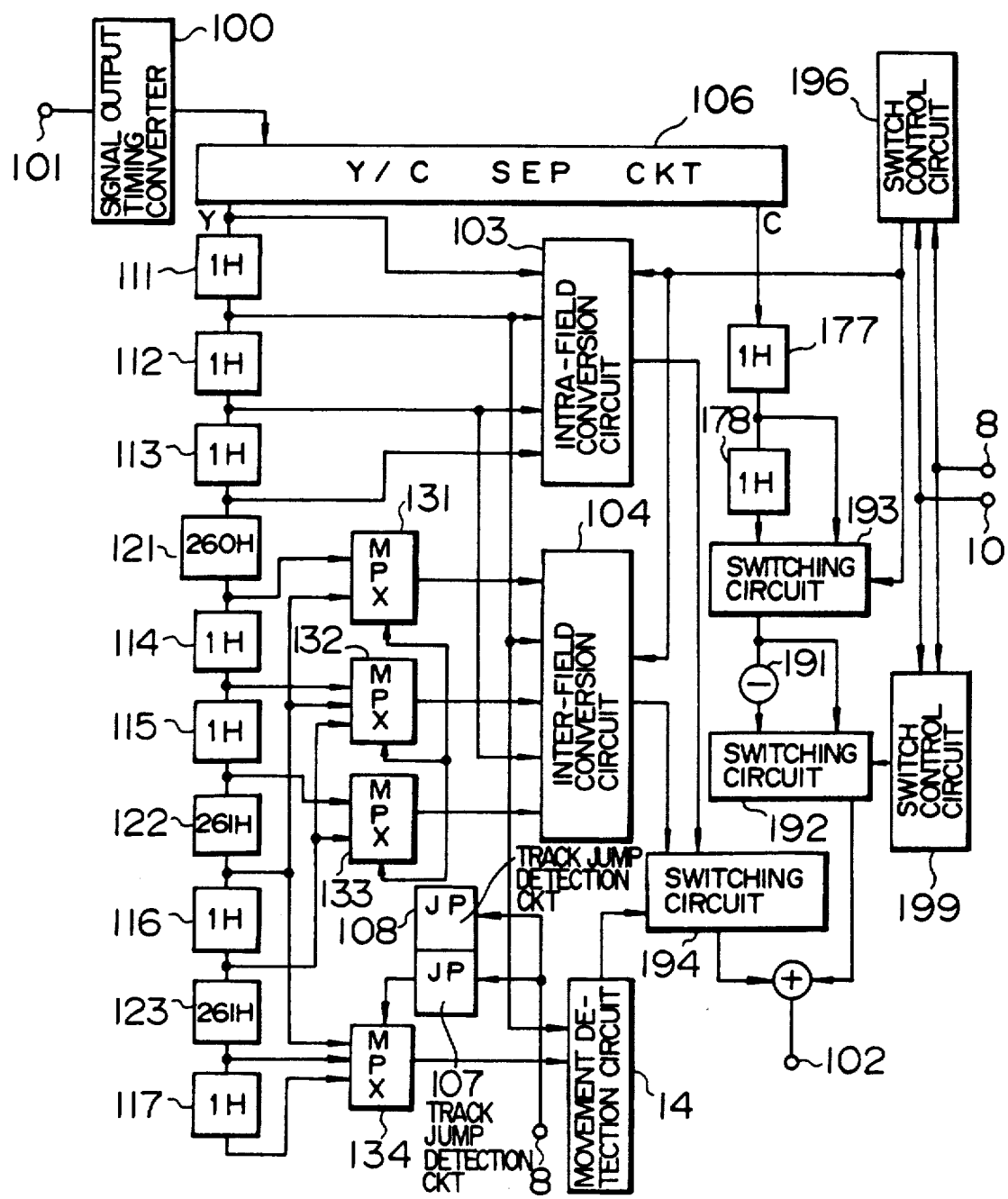
FIG. 11 is a scheme showing the construction indicating a second embodiment of the field conversion device according to the present invention.

FIG. 11 shows the construction of the second embodiment of the present invention. In FIG. 11, reference numeral 101 is an input terminal for the reproduced image signal (composite signal); 102 is an output terminal for an image signal, which has been subjected to the field conversion; 100 is a signal output timing converter, which varies the start line of effective data, depending of the field Nos. of the reproduced image signal and the output image signal at the variable speed playback; 8 is an input terminal for the field No. of the reproduced image signal; 111 to 117 are delay lines of one horizontal scanning period (1 H); 121 is a delay line of 260H; 122 and 123 are delay lines of 261 H; 108 and 107 are track jump detection circuits, which examine the presence or absence of the skipping or repetition of the reproduced image signal; 131, 132 and 133 are switches for selecting data used for the inter-field conversion according to an output of the track jump detection circuit 108, e.g. multiplexers (MPX); and 134 is a switch for selecting data used for the movement detection according to an output of the track jump detection circuit 107, e.g. an MPX.

Figure 12:
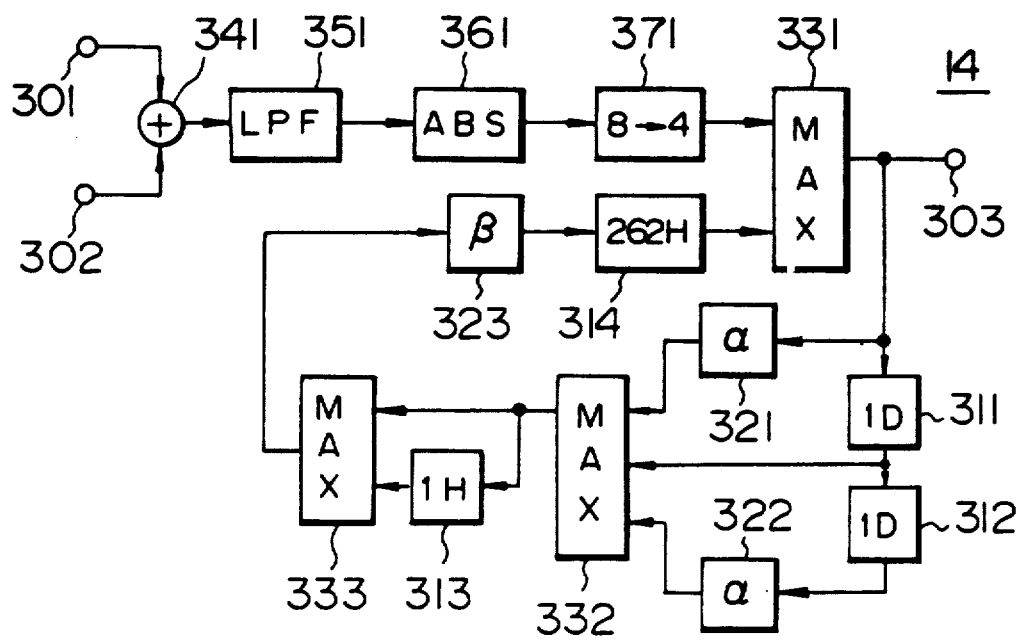
FIG. 12 is a block diagram showing the construction or an example of an image movement detection circuit indicated in FIG. 11.

FIG. 12 is a block diagram showing in detail an example of the movement detection circuit 14 in the present embodiment. In this figure, 301 and 302 are input terminals, through which luminance signals obtained by Y/C-separating the reproduced image signal. Data obtained by delaying the output signal of the Y/C separation circuit 106 indicated in FIG. 11 by 1 H are inputted through the terminal 301, while data similarly obtained by delaying it by 526 H or an output of the switch 134 corresponding thereto are inputted to the terminal 302. 303 is an output terminal, through which the magnitude of the movements detected by this movement detections circuit is outputted. 311 and 312 are delay lines corresponding to 1 clock, when the image signal is sampled with a frequency, which is 4 times as high as that of the subcarrier; 313 is a 1 H delay line; 314 is a 262 H delay line; 321 and 322 are coefficient multipliers having a coefficient $\alpha$; 323 is a coefficient multiplier having a coefficient $\beta$; 331, 332 and 333 are switches for outputting the greatest value in a plurality of inputted data sets; 341 is a subtracter; 351 is a low pass filter (hereinbelow abbreviated to LPF), which makes only signals in a frequency region lower than a predetermined frequency; 361 is an absolute circuit, which outputs the absolute value of the inputted data; and 371 is a converter for converting 8 bit data into 4 bit data.

Figure 13:
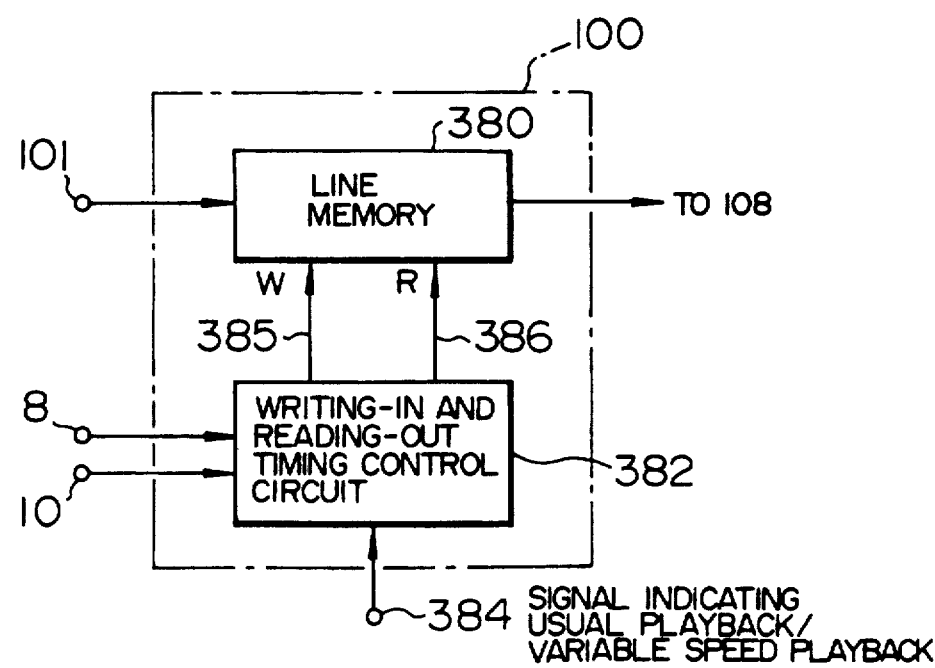
FIG. 13 is a scheme showing the construction indicating an example of a signal output timing converter indicated in FIG. 11.

The reproduced composite signal inputted through the reproduced signal input terminal 101 in FIG. 11 is inputted at first in the signal output timing converter 100, for which an example of the construction is indicated in FIG. 13. For example, for a D2-type digital VTR, the start line of effective data for each of the fields is determined, as indicated in FIG. 14, according to a norm. At the usual playback, this signal output timing converter 104 outputs signals according to FIG. 14. At the variable speed playback, this signal output timing converter 100 outputs effective data after having changed the start line thereof so as to satisfy the interlace condition for the output image signal, depending on the relation between the field Nos. of the reproduced image signal and the output image signal. FIG. 15 shows an example of the converting method therefor. For example, in the case where the reproduced signal of field No. 1 is converted into a signal of field No. 2 to be outputted, the start line for the effective data is the 9th line and the data representing originally the 10th line are outputted as the data of 9th line.

In FIG. 13, the signal output timing converter 100 includes a line memory 380 storing several lines of composite signals inputted through a terminal 101 one after another and a writing-in and reading-out timing control circuit 382 controlling the writing of the composite signals to the line memory and the reading-out of the same therefrom. The circuit 382 controls the line memory so as to read-out the start line of the effective data for every field on the basis of FIGS. 14 and 15, reproducing to a signal indicating the usual/variable speed playback inputted through a terminal 384 at the reading-out and the reproduced field No. and the outputted field No. inputted through the terminals 8 and 10.

The data outputted from the signal output timing converter 100 are inputted to the Y/C separation circuit 106 and separated into the luminance signal and the chrominance signal. Thereafter, the luminance signal is delayed by delay lines 111 to 117 and 121 to 123 one after another. The output luminance signal of the Y/C separation circuit 106 and the outputs of the delay lines 111, 112 and 113, i.e. the 1 H delayed data, the 2 H delayed data and the 3 H delayed data of the luminance signal outputted by the Y/C separation circuit 106, are inputted to the intra-field conversion circuit 103. Data necessary for the field, which is to be converted, are formed by means of an interpolation filter device described e.g. in JP-A-2-132984 stated previously, starting from 4 kinds of inputted luminance signal data and the output data are inputted to the switching circuit 194.

The outputs of the delay lines 121 and 122, i.e. the 263 H delayed data and the 526 H delayed data of the luminance signal outputted from the Y/C separation circuit 106, are inputted to the switch 131. In the case where the track jump detection circuit 108 judges that neither skipping nor repetition is effected just before the field including data, which are to be field-converted, this switch selects the output data of the delay line 121 to output them. To the contrary, in the case where the track jump detection circuit 108 judges that skipping or repetition is effected just before the field including data, which are to be field-converted, the switch selects the output data of the delay line 122 to output them.

Figure 16A:
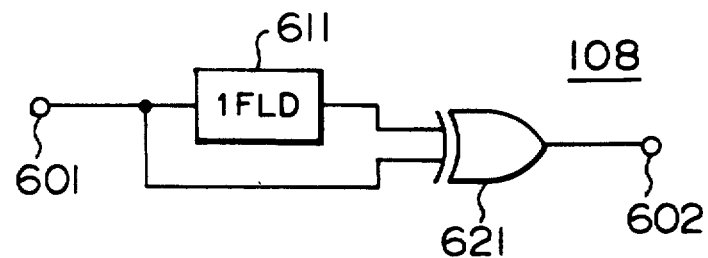
FIGS. 16A and 16B are block diagrams showing the construction of an example of different track jump detecting circuits indicated in FIG. 11.
Figure 16B:
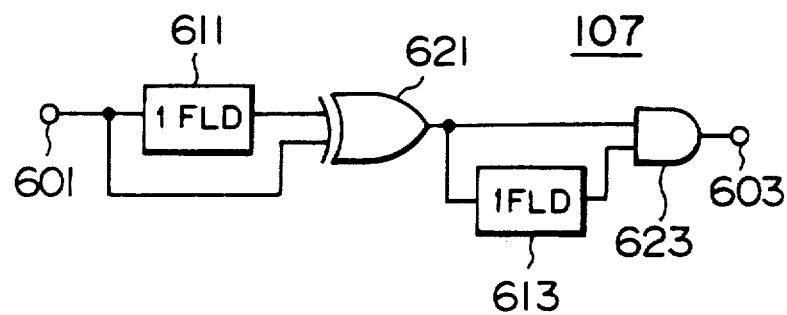

FIG. 16A shows an example of the track jump detection circuit 108. In FIG. 16A, 601 is a terminal, through which the least significant bit of the field No. of the reproduced image signal inputted through the reproduced image signal field No. input terminal 8 in FIG. 11 is inputted; 602 is a terminal, through which results of detection are outputted; 611 is a delay line of one vertical scanning period (hereinbelow abbreviated to 1 FLD); and 621 is an exclusive OR (EOR) gate. At the usual playback, e.g. for the NTSC system, the field Nos. of the image signal are reptitions of 1, 2, 3 and 4 (or 0, 1, 2 and 3). When these field Nos. are converted into binary codes, the lower bit is a repetition of the low (L) level and the high (H) level. Consequently, in this example, the lower bit of the field No. of the reproduced image signal, which is to be field-converted, inputted through the input terminal 601 is compared with the lower bit of the field No. of the field preceding by 1 field stored in the delay line 611 and it is judged that neither skipping nor repetition of fields has been effected just before the field, which is to be field-converted, if they are different, and that skipping or repetition has been effected, if they are identical. A result thus obtained is outputted through the output terminal 602. The track jump detection circuit 107 is also a similar circuit, as indicated in FIG. 16B, which detects the presence or absence of the skipping or repetition of field data. However, since the movement detection circuit 14 detects movements by using the data of the field, which are to be field-converted, and the data of the field preceding it by 2 fields, the used data should be switched-over not only in the case where the skipping or repetition is effected just before the field including the data, which are to be field-converted, but also in the case where the skipping or repetition is effected just before the field preceding the field including the data, which are to be field-converted, by 1 field. Consequently, in the track jump detection circuit 107, it is necessary to form a logical product of the output of the track jump detection circuit 108 and a signal obtained by delaying the output by one field by means of a delay line 613 in an AND gate 623 to output it through an output terminal 603.

Similar to the switch 131, outputs of the delay lines 114, 122 and 116, i.e. the 264 H delayed data, the 526H delayed data and the 527 H delayed data of the luminance signal outputted from the Y/C separation circuit 106, are inputted to the switch 132. In the case where the track jump detection circuit 108 judges that the skipping or repetition of field data has not been effected just before the field including the data which are to be field-converted, this switch 132 selects the output data of the delay line 114 to output them. The the contrary, in the case where the skipping or repetition of field data has been effected just before the field including the data which are to be field-converted, and in addition the field Nos. of the reproduced image signal and the output image signal are in odd or even number accordance before the track jump, but they are in odd or even disaccordance after the track jump, the switch 132 selects the output data of the delay line 122 and in the reverse case it selects the output data of the delay line 116 to output them. Further, outputs of the delay line 115 and 116, i.e. the 265 H delayed data and the 527 H delayed data of the luminance signal outputted from the Y/C separation circuit 106, are inputted to the switch 133. In the case where the track jump detection circuit 108 judges that the skipping or repetition of field data has not been effected just before the field including the data, which are to be field-converted, this switch 133 selects the output data of the delay line 115 to output them. Conversely, in the case where the track jump detection circuit 108 judges that the skipping or repetition of field data just before the field including the data, which are to be field-converted, this switch 133 selects the output data of the delay line 116.

Figure 17:
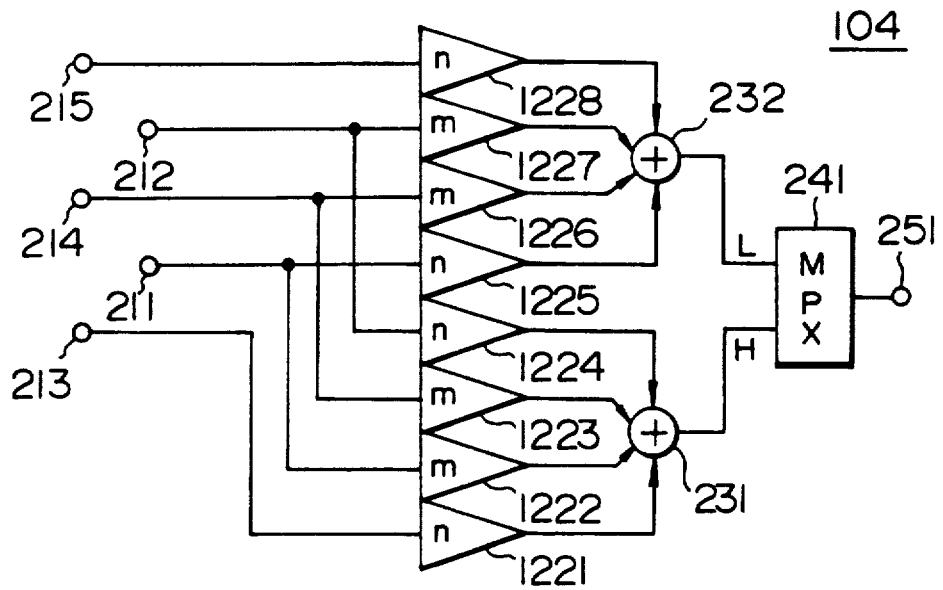
FIG. 17 is a block diagram showing the construction of an example of an inter-field conversion circuit indicated in FIG. 11.

The construction of the inter-field conversion circuit 104 indicated in FIG. 17 is identical to that indicated in FIG. 6. The outputs of the delay lines 111 and 112, i.e. the 1 H delayed data and the 2 H delayed data of the luminance signal outputted from the Y/C separation circuit 106; the output data of the switches 131, 132 and 133 corresponding to the 263 H delayed data, the 264 delayed data and the 265 H delayed data are inputted in input terminals 211, 212, 213, 214 and 215, respectively. Since the data sets inputted in the input terminals 213, 214 and 215 are selected, taking the presence or absence of the skipping or repetition of field data into account by the switches 131, 132 and 133 in FIG. 11, they are the data of the fields, which are in the interlaced relation with the fields including the data inputted through the input terminals 211 and 212. As described previously, for the fields, for which the field Nos. of the reproduced image signal and the output image are in odd or even number disaccordance, the data appears, displayed upward by 0.5 H with respect to the original position thereof. However, if the conversion rule of the effective data start line for each field at the variable speed playback is defined as indicated in FIG. 15, in the process, in which the data sets inputted in the input terminals 211 to 215 in FIG. 6 are subjected to the inter-field converting processing by selecting the data by means of the track jump detection circuit 106 and the switches 131 to 133 in FIG. 11, taking the skipping or repetition of field data into account, the field converting processing can be effected always by a same processing without taking the skipping or repetition of field data into account. A case where the conversion rule at the variable speed playback is so defined that the data are displaced by an amount smaller than 0.5 H for the fields, for which the field Nos. of the reproduced image signal and the output image signal are in odd or even number disaccordance, can be dealt with in a similar way.

In the inter-field conversion circuit 104 indicated in FIG. 17, the luminance signal inputted through the input terminal 211 is inputted in coefficient multipliers 1222 and 1225, the signal inputted through the input terminal 212 is inputted in coefficient multipliers 1224 and 1227; the signal inputted through the input terminal 213 is inputted in a coefficient multiplier 1221; the signal inputted through the input terminal 215 is inputted in a coefficient multiplier 1228. Here the values m and n of the different coefficient multipliers satisfy $2(m+n)=1$, as described previously, and it is possible to vary frequency characteristics of the filters in the inter-field conversion circuit by varying m and n. In the present embodiment, it is presumed that $m = \frac{1}{8}$ and $n = -\frac{1}{8}$ and it is a matter of course that the frequency characteristics of the filter selected when the field Nos. of the reproduced image signal and the output image signal are in odd or even number accordance, i.e. filter consisting of the coefficient multipliers 1221, 1222, 1223 and 1224 are identical to the frequency characteristics of the filter selected when they are in odd or even number disaccordance, i.e. filter consisting of the multipliers 1225, 1226, 1227 and 1228. Also in the case where the values of the different coefficient multipliers are varied, e.g. putting m=½ and n=0, the frequency characteristics of the filter selected when the field Nos. of the reproduced image signal and the output image signal are in odd or even number accordance are identical to the frequency characteristics of the filter selected when they are in odd or even number disaccordance. Furthermore, in this case, the input terminals 213 and 215, the coefficient multipliers 1221, 1224, 1225 and 1228, etc. are unnecessary, and the adders 231 and 232 can be simpler circuits. Therefore an advantage can be obtained that the circuit scale is smaller. The outputs of the coefficient multipliers 1221, 1222, 1223 and 1224 are inputted in the adder 231 to form the field conversion data, when the field Nos. of the reproduced image signal and the output image data are in odd or even number accordance. On the other hand, the outputs of the coefficient multipliers 1225, 1226, 1227 and 1228 are inputted in the adder 232 to form the field conversion data when the field Nos. of the reproduced image signal and the output image data are in odd or even number disaccordance.

FIG. 2D shows the data after having been subjected to the field conversion by means of the interfield conversion circuit 104 indicated in FIG. 11 described previously. In particular, the fields (a) and (b) are data after the field conversion, in the case where the field Nos. of the reproduced signal and the output signal are in odd or even number accordance. For example, the data 1573 in FIG. 2D are data outputted when the data sets 513, 514, 522 and 523 in FIG. 2B are inputted in the input terminals 214, 213, 212 and 211, respectively, (the data set inputted in the input terminal 215 being not used) and the switch 241 selects the H input. Further the fields (d) and (e) in FIG. 2D represent data after the field conversion, in the case where the field Nos. of the reproduced signal and the output signal are in odd or even number disaccordance. For example, the data 1593 in FIG. 2D are data outputted when the data sets 542, 543, 553 and 554 in FIG. 2B are inputted in the input terminals 215, 214, 212 and 211, respectively, (the data set inputted in the input terminal 213 not being used) and the switch 241 selects the L input. Further, just after field data have been skipped or repeated, e.g. in the case where the data 1584 of the field (d) in FIG. 2D just after the data of the field (c) have been skipped, and where the state, in which the field Nos. of the reproduced image signal and the output image signal is in odd or even number accordance, is changed into the state in which they are in odd or even number disaccordance, the data sets 543 and 544 in FIG. 2B are similarly inputted to the input terminals 212 and 211 in FIG. 17. On the other hand, if it is not taken into account that the field (c) has been skipped, the data sets 522, 523 and 524 of the field (b) are inputted in the input terminals 215, 214 and 213 in FIG. 17. However, since originally the data set of the field (b) are not data of the field necessary for field-converting the data of the field (d), i.e. data of the field, which is in the interlaced relation with the field (d), the outputs of the switches 133, 132 and 131, which have selected the data of the field (a), the field which is in the interlaced relation with the field (d) according to the output of the track jump detection circuit 108 in FIG. 11, are inputted in the input terminals 215, 214 and 213, respectively, in FIG. 17. The output of the adder 232, which has been field-converted by the coefficient multipliers 1225 to 1228 in FIG. 17, is outputted by the output terminal 251 and inputted in the switching circuit 194 in FIG. 11. Immediately after field data have been skipped and in the case where the state where the field Nos. of the reproduced image signal and the output image signal is in odd or even number disaccordance is changed into the state where they are in odd or even number accordance and also in the case where field data are repeated, this inter-field conversion circuit is driven similarly. Both in the case where the field Nos. of the reproduced signal and the output signal are in odd or even number accordance and in the case where they are in odd on even number disaccordance, the data formed by this inter-field conversion circuit have not only identical frequency characteristics but also transitions of the luminance signal at same places, as indicated in FIG. 2D, and therefore it is possible to remove displacements of the vertical transitions due to the field converting processing. The outputs of the adders 231 and 232 are inputted in the switch 241. This switch selects the output of the adder connected with the H input in the case where the field Nos. of the reproduced image signal and the output image signal are in odd or even number accordance and the output of the adder connected with the L input in the case where they are in odd or even number disaccordance. The output of this switch is inputted in the switching circuit 194 in FIG. 11.

Further the outputs of the delay lines 122, 123 and 117, i.e. the 526 H delayed data, the 788 H delayed data and the 789 H delayed data of the luminance signal outputted by the Y/C separation circuit 106, are inputted in the switch 134. In the case where the track jump detection circuit 107 judges that neither skipping nor repetition of the field data has been effected immediately before the field including the data, which are to be field-converted, or immediately before the field which immediately precedes data field, this switch 134 selects the output data of the delay line 122 to output them. To the contrary, in the case where the track jump detection circuit 107 judges that either skipping or repetition of the field data has been effected immediately before the field including the data, which are to be field-converted, or immediately before the field which immediately precedes the field including the data, and further in the case where the field Nos. of the reproduced image signal and the output image signal are in odd or even number accordance before the track jump and they are in odd or even number disaccordance after the track jump, the switch 134 selects the output data of the delay line 123 and, in the reverse case, the output data of the delay line 117 to output them. The output data of the delay line 111, i.e. the 1 H delayed data of the luminance signal outputted by the Y/C separation circuit 106, which are to be field-converted, and the output data of the switch 134, i.e. the 525 H delayed data of the data, which are to be field-converted, or the data corresponding to the 525 H delay, in the case where the skipping and the repetition of field data are taken into account, are inputted in the input terminals 301 and 302, respectively, which are the input terminals of the movement detection circuit 14. The data inputted through the input terminals 301 and 302 are subjected to a subtracting processing in the subtracter 341. The output of the adder 341 is inputted in the LPF 351 and in the case where the chrominance signal component cannot be separated completely by the Y/C separation circuit 106 in FIG. 11, but it remains in the luminance signal, it is removed therein. The absolute value thereof is formed in the absolute circuit 361 and converted into a 4-bit positive number by the converter 371 to be inputted in the switch 331. The data inputted into this switch 331 represent the magnitude of the image signal data, which are to be field-converted. The greatest data selected by the switch 332 from 3 kinds of data, which are the data obtained by multiplying the data outputted before about 1 FLD by this switch 331 by an arbitrary coefficient by means of the coefficient multiplier 321, the data obtained by delaying the data outputted by the switch 331 by means of the delay line 311, and the data obtained by delaying the data outputted by the switch 331 by means of the delay lines 311 and 312 and multiplying the value thus obtained by an arbitrary coefficient by means of the coefficient multiplier 322 and the data obtained by delaying them by 1 H by means of the delay line 313 are compared by the switch 333 so as to select the greater data. The output thereof is multiplied by an arbitrary coefficient by means of the coefficient multiplier 323 and delayed by 262 H by means of the delay line 314. Of the data thus obtained, the greatest data selected by the switches 332 and 333 from the data sets obtained by multiplying the magnitudes of movements of the data sets stored in the delay lines 311, 312, 313, 314, etc., which are in the environment in the image of the data to be field-converted by the coefficients of the coefficient multipliers 321, 322, 323, etc. to attenuate them in some degree, are inputted in the other input terminal of this switch. The switch 331 further compares these data with the output of the converter 371 to output the greater data thus obtained as the magnitude representing the movements in the data, which are to be field-converted. In this way it is possible to reduce detection omission and to further smooth in time and in space transitions between the still picture processing and the moving picture processing so that the transitions between the different processings are hardly recognized. Data outputted by the switch having a greater numerical value means greater movements in the image in the environment of the data, which are to be field-converted. These data are outputted by the output terminal 303 and inputted in the switching circuit 194 in FIG. 11.

Figure 18:
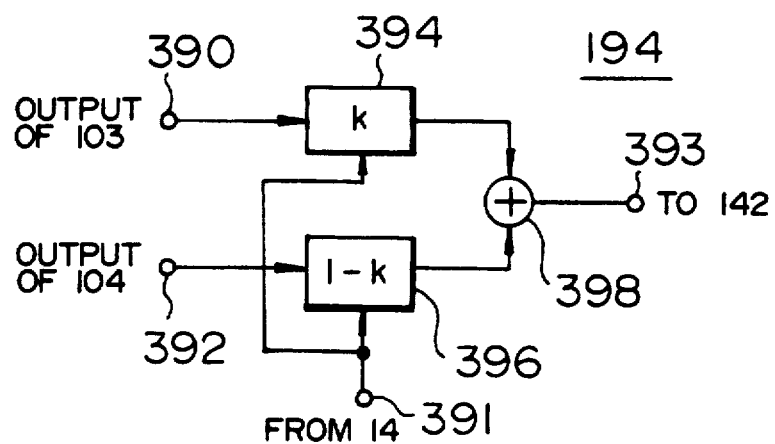
FIG. 18 is a block diagram showing the construction of an example of a switching circuit 194 indicated in FIG. 11.

The switching circuit 194 adds the output of the intrafield conversion circuit 103 and the output of the interfield conversion circuit 104 with a ratio, which is e.g. k:(1−k), according to the output of the movement detection circuit 14, to output it. Here k is a coefficient, which varies at arbitrary steps between 0 and 1, according to the magnitude of the movements detected by the movement detection circuit 14, and k=0 for a perfect still picture and k=1 for a perfect moving picture, taking a numerical value depending on the magnitude of the other movements. That is, as indicated in FIG. 18, the outputs from the conversion circuits 103 and 104, which are given to the input terminals 390 and 392, are given to the coefficient multiplier 394 having a coefficient of k and the coefficient multiplier 396 having a coefficient of (1−k), respectively. The outputs of the multipliers are added by the adder 398 to be outputted through the output terminal 393. The value of k is determined by a signal k depending on the magnitude of the movements given to the terminal 391, coming from the movement detection circuit 14. As described above, since by constituting the switch 135 by a soft switch, it is possible to vary the ratio used for the addition of the two signals described above, depending on the degree of movements, and influences of erroneous operations due to noise, etc. can be reduced. Further, it may be a coefficient taking only two values, which is 0, if the movement detected by the movement detection circuit 14 is smaller than an arbitrary numerical value previously determined, the image being regarded as a still picture, and 1, if the former is greater than the latter, the image being regarded as a moving picture. In this case, the device can be constructed by a simpler circuit than that required for the case where the switching circuit 194 is a soft switch.

Similarly to FIG. 4, the adder 195 adds the luminance signal outputted by the switching circuit 194, which has been subjected to the field conversion, and the chrominance signal outputted by the switching circuit 192, for sign inverting processing so as to satisfy the continuity of the subcarrier, to output them in the form of a composite signal.

Figure 19:
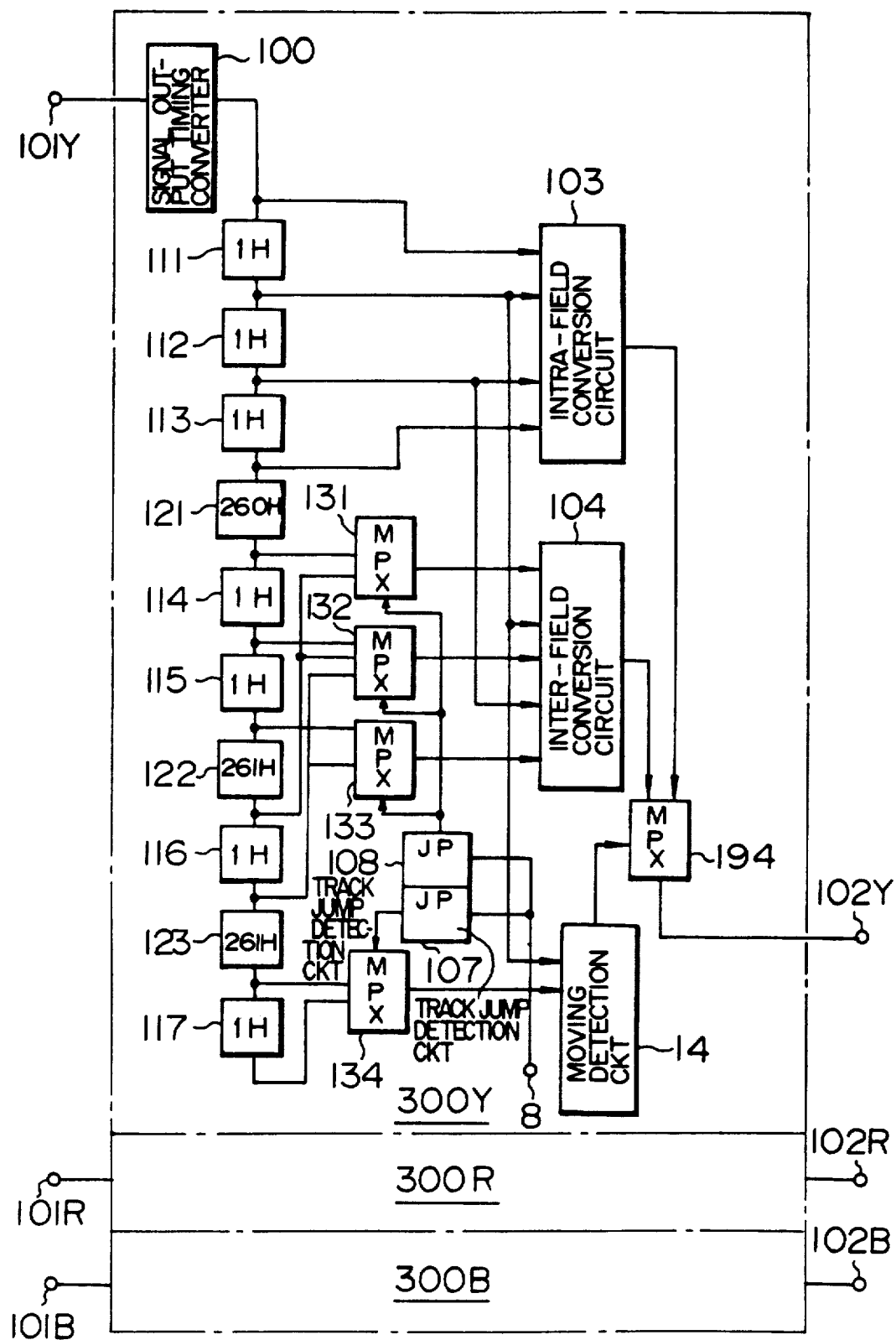
FIG. 19 is a block diagram showing a modified example of the embodiment indicated in FIG. 11.

FIG. 19 shows a modification of the embodiment indicated in FIG. 11. The field conversion portions 300Y, 300R and 300B process the component signals inputted in the input terminals 101Y, 101R and 101B, respectively, i.e. the luminance signal and the color difference signals (R-Y) and (B-Y) of the reproduced image signal so as to field-convert them and output them to the output terminals 102Y, 102R and 102B. The construction of the field conversion portions 300R and 300B is identical to the construction of the field conversion portion 300Y.

Figure 20:
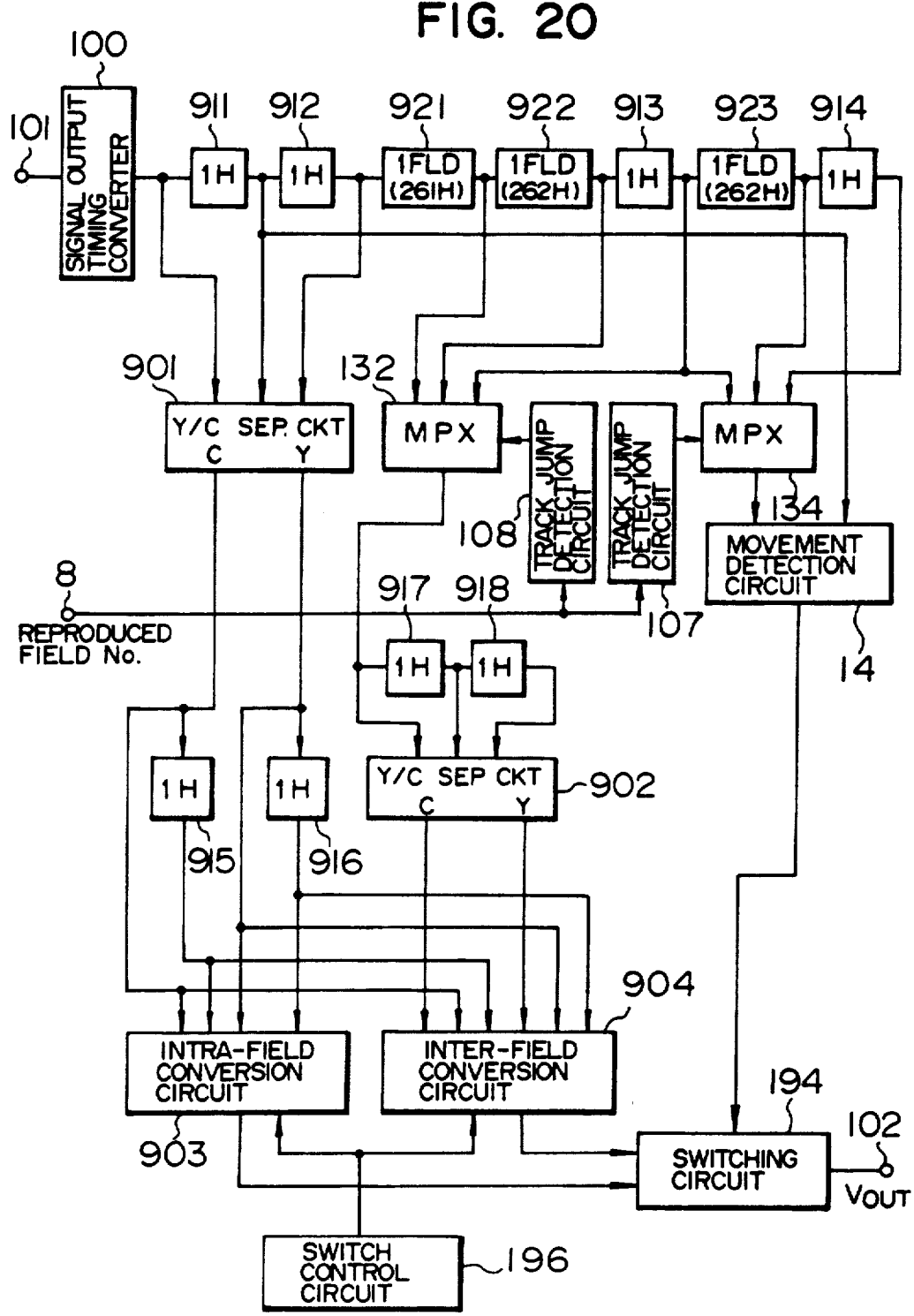
FIG. 20 is a block diagram showing the construction of a third embodiment of the field conversion device according to the present invention.

Next the third embodiment of the present invention is indicated in FIG. 20. In the figure, the parts identical to those used in the embodiment indicated in FIG. 11 are represented by identical reference numerals and explanation thereof in detail will be omitted. In addition, 901 and 902 are a first and a second adaptive Y/C separation circuit, in which data corresponding to 3 lines are inputted and which change the processing, depending on the state of the image signal; 903 is an inter-field conversion circuit similar to that used in the first embodiment; 909 is an intra-field conversion circuit similar to that used in the first embodiment; 911 to 918 are 1 H delay lines; 921 is a 261 H delay line; and 922 and 923 are 262 H delay lines.

A reproduced composite signal inputted through the reproduced image signal input terminal 101 and converted by a signal output timing converter 100 in FIG. 20 is inputted in the Y/C separation circuit 901 together with a signal delayed by 1 H by means of a delay line 911 and a signal delayed further by 1 H by means of a delay line 912 to be separated there into a luminance signal Y and a chrominance signal C. Y/C separation circuits 901 and 902 are adaptive Y/C separation circuits, which change the processing, depending on the inputted image signal. For example, if it is supposed that, in FIG. 9A, all the signals above the composite signal 802 are colored signal and all the signals under the signal 803 are not-colored signals, when a signal above the composite signal 801 or a signal under the composite signal 804 is Y/C-separated, a comb-shaped filter using 3 lines, which are signals to be separated, a signal higher than it by 1 and a signal lower by 1 than it, is selected. On the other hand, when the Y/C composite signal 803 is Y/C-separated, a comb-shaped filter using 2 lines which are signals to be separated. When the signal higher than it by 1 is selected. When the composite signal 803 is Y/C separated, a comb-shaped filter using 2 lines, which are signals to be separated, a signal lower than it by 1 is selected to effect the Y/C separating processing. Thus this is an adaptive Y/C separation circuit, by which no erroneous separations take place. The luminance signal Y and the chrominance signal C separated by the Y/C separation circuit are inputted in the intra-field conversion circuit 903 together with the luminance signal and the chrominance signal, which are delayed by 1 H by means of the delay circuits 915 and 916, respectively.

Figure 21:
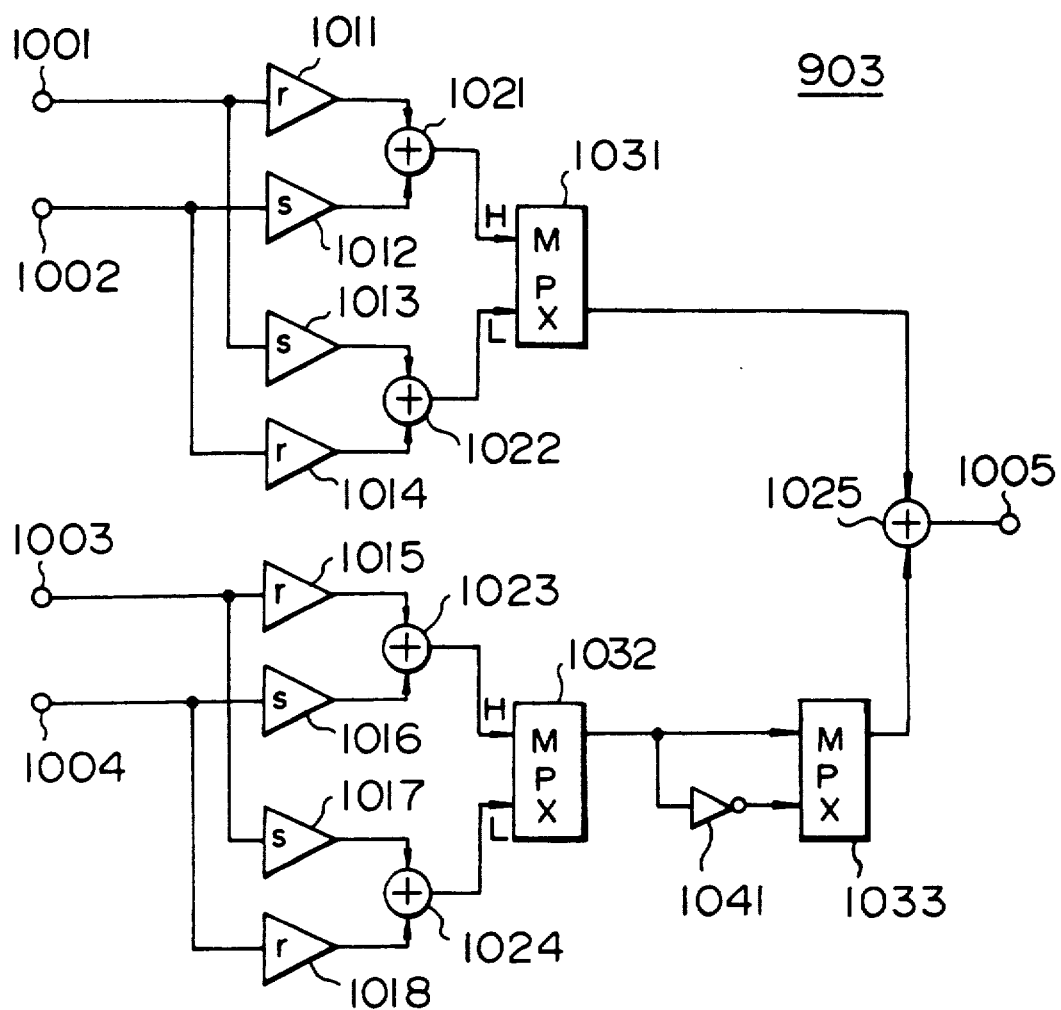
FIG. 21 is a block diagram showing the construction of an example of the inter-field conversion circuit indicated in FIG. 20.

FIG. 21 is a block diagram showing an example of the intra-field conversion circuit 903 used in this embodiment in detail, in which 1001 and 1003 are input terminals for the luminance signal Y and the chrominance signal C separated by the Y/C separation circuit 901; 1002 and 1004 are input terminals for signals obtained by delaying by 1 H the luminance signal Y and the chrominance signal C separated by the Y/C separation circuit 901 by means of the delay lines 916 and 915, respectively; 1011, 1014, 1015 and 1018 are coefficient multipliers having a coefficient r, 1012, 1013, 1016 and 1017 are coefficient multipliers having a coefficients;, 1021 to 1025 are adders; 1031 and 1032 are switches, which select the H input side, when the field Nos. of the reproduced image signal and the output image signal are in odd or even number accordance, and the L input side, when they are in odd or even number disaccordance; 1041 is a phase inversion circuit, which inverts the phase of the chrominance signal; 1033 is a switch for selecting the chrominance signal, which has been subjected to the phase inverting processing, and the chrominance signal, which has not been subjected to the phase inverting processing; and 1005 is an output terminal for the image signal. The luminance signal Y and the chrominance signal C separated by the Y/C separation circuit 901 are inputted in the input terminals 1001 and 1003, respectively. The luminance signal and the chrominance signal obtained by delaying the luminance signal Y and the chrominance signal C separated by the Y/C separation circuit 901 by the delay lines 916 and 915 are inputted in the input terminals 1002 and 1004, respectively. The signal inputted through the input terminal 1002 is inputted in the coefficient multipliers 1012 and 1014. The outputs of the coefficient multipliers 1011 and 1012 are added in the adder 1021, while the outputs of the coefficient multipliers 1013 and 1014 are added in the adder 1022. The outputs of the adders 1021 and 1022 are inputted in the switch 1031, which selects the output of the adder 1021 on the H side, when the field Nos. of the reproduced image signal and the output image signal are in odd or even number accordance and the output of the adder 1022 on the L side, when they are in odd or even number disaccordance. Here the values r and s of the different coefficient multipliers satisfy a relationship $r+s=1$ and in this embodiment $r=\frac{3}{4}$ and $s=\frac{1}{4}$. In this way, since the frequency characteristics of the filter consisting of the coefficient multipliers 1011 and 1012 are identical to the frequency characteristics of the filter consisting of the coefficient multipliers 1013 and 1014, even if the switch 1031 is switched-over in field unit, no flickers accompanied by variations in the vertical resolution are produced.

On the other hand, concerning the chrominance signal, the chrominance signals inputted through the input terminals 1003 and 1004 are subjected to a completely same processing as the chrominance signal up to the output of the switch 1032. That is, the switch 1032 selects the output of the filter on the H side consisting of the adder 1023, the coefficient multipliers 1015 and 1016, when the field Nos. of the reproduced image signal and the output image signal are in odd or even number accordance, and the output of the filter on the L side consisting of the adder 1024, the coefficient multipliers 1017 and 1018, when they are in odd or even number disaccordance, to output it. The output of the switch is inputted in the switch 1033 together with the signal, which has been subjected to the phase inverting processing by means of the phase invention circuit 1041 and the chrominance signal, for which the presence or absence of the phase inverting processing is controlled so that the continuity of the subcarrier is satisfied, is outputted by the switch 1033. The luminance signal outputted by the switch 1031, which has been subjected to the field converting processing, and the chrominance signal outputted by the switch 1033, which has been subjected to the field converting processing and for which the presence or absence of the phase inverting processing is controlled, are added in the adder 1025 and outputted through the output terminal 1005 to be inputted in the switching circuit 194 in FIG. 20.

Further, 3 kinds of signals including a signal obtained by delaying the signal inputted through the composite signal input terminal 101 and converted by the converter 109 by means of the delay lines 911, 912 and 921, a signal obtained by delaying further the signal thus obtained by means of the delay line 922 and a signal obtained by delaying further the signal thus obtained by means of the delay line 913, that is the 263 H delayed signal, the 525 H delayed signal and the 526 H delayed signal of the composite signal inputted through the input terminal 101 are inputted in the switch 132. In the case where the track jump detection circuit 108 judges that no skipping or repetition of field data has been effected just before the field including the data, which are to be field-converted, this switch 132 selects the output signal of the delay line 921. To the contrary, in the case where skipping or repetition of field data has been effected just before the field including the data, which are to be field-converted, it selects the output signal of the delay line 922, when the field Nos. of the reproduced image signal and the output image signal are in odd or even number accordance before the track jump and they are in odd or even number disaccordance after the track jump, and the output signal of the delay line 913 in the reverse case to output it. The composite signal outputted by the switch 132 is inputted in the adaptive Y/C separation circuit 902 together with the signal obtained by delaying it by 1 H by means of the delay line 917 and the signal obtained by delaying it further by 1 H by means of the delay line 918 to be separated into the luminance signal Y and the chrominance signal C. The luminance signal Y and the chrominance signal C outputted by the adaptive Y/C separation circuit 902 are inputted in the inter-field conversion circuit 904 together with the luminance signal Y and the chrominance signal C outputted by the adaptive Y/C separation circuit 901 and the data obtained by delaying the luminance signal Y and the chrominance signal C outputted by the adaptive Y/C separation circuit by 1 H by means of the delay lines 916 and 915.

Figure 22:
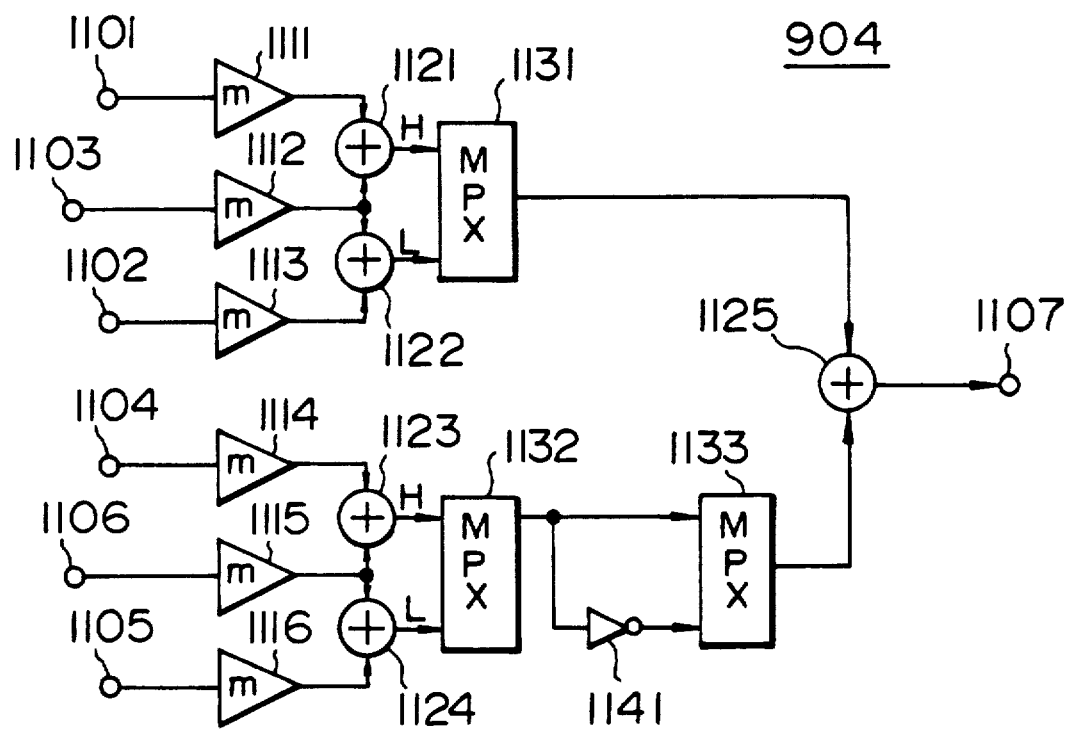
FIG. 22 is a block diagram showing the construction of another example of the inter-field conversion circuit indicated in FIG. 20.

FIG. 22 is a block diagram of the inter-field conversion circuit 904 used in the present embodiment, in which 1101 to 1103 are input terminals for the luminance signal Y; 1104 to 1106 are input terminals for the chrominance signal C; 1107 is an output terminal for the image signal after having been subjected to the inter-field converting processing; 1111 to 1116 are coefficient multipliers having a coefficient m; 1121 to 1125 are adders; 1131 and 1132 are switches, which select the H side when the field Nos. of the reproduced image signal and the output image signal are in odd or even number accordance, and select the L side when they are in odd on even number disaccordance. 1141 is a phase inversion circuit, which inverts the phase of the chrominance signal and 1133 is a switch, which selects the chrominance signal C, which has been subjected to the phase, inverting processing, and the chrominance signal Y, which has not been subjected to the phase inverting processing. The luminance signal Y outputted by the Y/C separation circuit 901, a signal obtained by delaying that signal by 1 H by means of the delay line 916, and the luminance signal Y outputted by the Y/C separation circuit 902 are inputted in the input terminals 1101 to 1103, respectively. The inputted different luminance signals are inputted in the coefficient multipliers 1111, 1113 and 1112, respectively. The outputs of the coefficient multipliers 1111 and 1112 are inputted in the adder 1121, while the outputs of the coefficient multipliers 1112 and 1113 are inputted in the adder 1122 to be subjected to an adding processing. Thereafter the output signals of the adders 1121 and 1122 are inputted in the switch 1131. The switch 1131 selects the output of the adder 1121 on the H side when the field Nos. of the reproduced image signal and the output image signal are in odd or even number accordance, and selects the output of the adder 1122 on the L side when they are in odd or even number disaccordance. Here also, of course, the frequency characteristics of the filter consisting of the coefficient multipliers 1111 and 1112 are identical to the frequency characteristics of the filter consisting of the coefficient multipliers 1112 and 1113. Therefore, even if the switch 1131 is switched-over in field unit, no flickers accompanied by variations in the vertical resolution are produced.

On the other hand, the chrominance signal C outputted by the Y/C separation circuit 901, a signal obtained by delaying that signal by 1 H by means of the delay line 915, and the chrominance signal C outputted by the Y/C separation circuit 902 are inputted in the input terminals 1104 to 1106, respectively, and subjected to virtually the same processing as the luminance signal up to the output of the switch 1132. That is, the switch 1132 selects the output of the filter on the H side consisting of the adder 1123 and the coefficient multipliers 1114 and 1115 when the field Nos. of the reproduced image signal and the output image signal are in odd or even number accordance, and selects the output of the filter on the L side consisting of the adder 1124 and the coefficient multipliers 1115 and 1116 when they are in odd or even number disaccordance, to output it. The output of the switch 1132 is inputted in the switch 1133 together with a signal, which has been subjected to the sign inverting processing by the sign inversion circuit 1141 and the chrominance signal, for which the presence or absence of the phase inverting processing is controlled so that the continuity of the subcarrier is satisfied, is outputted by the switch 1133. The luminance signal outputted by the switch 1131, which has been subjected to the field converting processing, and the chrominance signal outputted by the switch 1133, which has been subjected to the field converting processing and for which the presence or absence of the phase inverting processing is controlled, are added in the adder 1125 and outputted through the output terminal 1107 to be inputted in the switching circuit 194 in FIG. 20. The input terminals 1103 and 1106 correspond to the inter-field conversion circuit described in the second embodiment and the input terminal 214 in FIG. 17. Further, by putting the coefficients $m = \frac{1}{2}$ and $n = 0$ and removing the coefficient multipliers 221, 224, 225 and 228 as well as the input terminals 213 and 215, the inter-field conversion circuit is used for processing each of the luminance signal and the chrominance signal, and in addition, the presence or absence of the phase inverting processing is controlled in the processing of the chrominance signal.

Further, 3 kinds of signals, i.e. the output signal of the delay line 913, a signal obtained by delaying that signal further by means of the delay line 923 and a signal obtained by delaying that delayed signal further by means of the delay line 914, i.e. the 526 H delayed signal, the 788 H delayed signal and the 789 H delayed signal of the reproduced image signal inputted through the composite signal input terminal 101, are inputted in the switch 134.

The switch 134 selects the output of the delay line 913, in the case where the track jump detection circuit 107 judges that neither skipping nor repetition of field data has been effected just before the field including data, which are to be field-converted, or just before the field preceding that field by 1. On the contrary, in the case where the track jump detection circuit 107 judges that skipping or repetition of field data has been effected just before the field, which is to be field-converted, or just before the field preceding that field by 1 field, it selects the output of the delay line 923, when the field Nos. of the reproduced image signal and the output image signal are in odd or even number accordance before the track jump and they are in odd or even number disaccordance after the track jump, and the output of the delay line 914 in the reverse case. The output signal of the switch 134 is inputted in the movement detection circuit 14 together with the output signal of the delay line 911. The output signal from the switch 134 is a signal delayed by 525 H from the output of the delay line 911, i.e. the signal, which is to be field-converted, or a signal corresponding to the 525 H delayed signal, taking the skipping or the repetition into account. The output signal of the delay line 911 and the output signal of the switch 134 are inputted in the movement detection circuit 14 and the movement detection is effected by using a circuit similar to that used in the second embodiment. However, in the present embodiment, the signals inputted in the movement detection circuit 14, i.e. the output signal of the delay line 911 and the output signal of the switch 134, are composite signals and the movement detection is effected by using the signals preceding and succeeding that signal by 2 fields or signals corresponding thereto. That is, since it is effected by using only luminance signals of the reproduced image signal, an LPF for eliminating the chrominance signal is necessary just after the input terminal of the movement detection circuit 14. This LPF is unnecessary, if this movement detection circuit is driven by using signals preceding and succeeding that field by 4 fields or signals corresponding thereto.

The switching circuit 194, in which the outputs of the intra-field conversion circuit 903 and the inter-field conversion circuit 904 are inputted, selects one of them according to the output of the movement detection circuit 14. Or it adds the outputs of the intra-field conversion circuit 903 and the interfield conversion circuit 904 with an arbitrary ratio according to the output of the movement detection circuit 14 to output the sum of them. That is, the switching circuit 194 may be constructed in the same way as the switching circuit 194 described in the second embodiment and the output of the switching circuit 194 is outputted through the output terminal 102 as the field conversion data.

In the present embodiment, too, the performance of the field conversion device depends on the separation characteristics of the Y/C separation circuits 901 and 902 similar to the second embodiment and it is possible to realize a field converting processing without worsening the resolution in the diagonal direction by using three-dimensional separation circuits provided with movement detection circuits similar to the movement detection circuit 105 indicated in FIG. 20 for these Y/C separation circuits and selecting the line Y/C separation in the case where there are movements between different fields and the frame Y/C separation in the case where there are no movements between different fields, to use it.

By using the circuit construction as described in the present third embodiment, an advantage can be obtained that displacements in the vertical direction are removed not only for the luminance signal but also for the chrominance signal and the number of uses of memories can be reduced.

Further the intra-field conversion circuit 903 and the inter-field conversion circuit 904 in FIG. 20, described in the third embodiment, can be applied also to the embodiment indicated in FIG. 11. Also in this case the number of uses of memories can be reduced.

Furthermore, the intra-field conversion circuit 103 and the inter-field conversion circuit 104 in FIG. 11, described in the second embodiment, can be applied also to the circuit for the embodiment indicated in FIG. 20. In this case it is possible to prevent the lowering in the resolution in the vertical direction.

Figure 23:
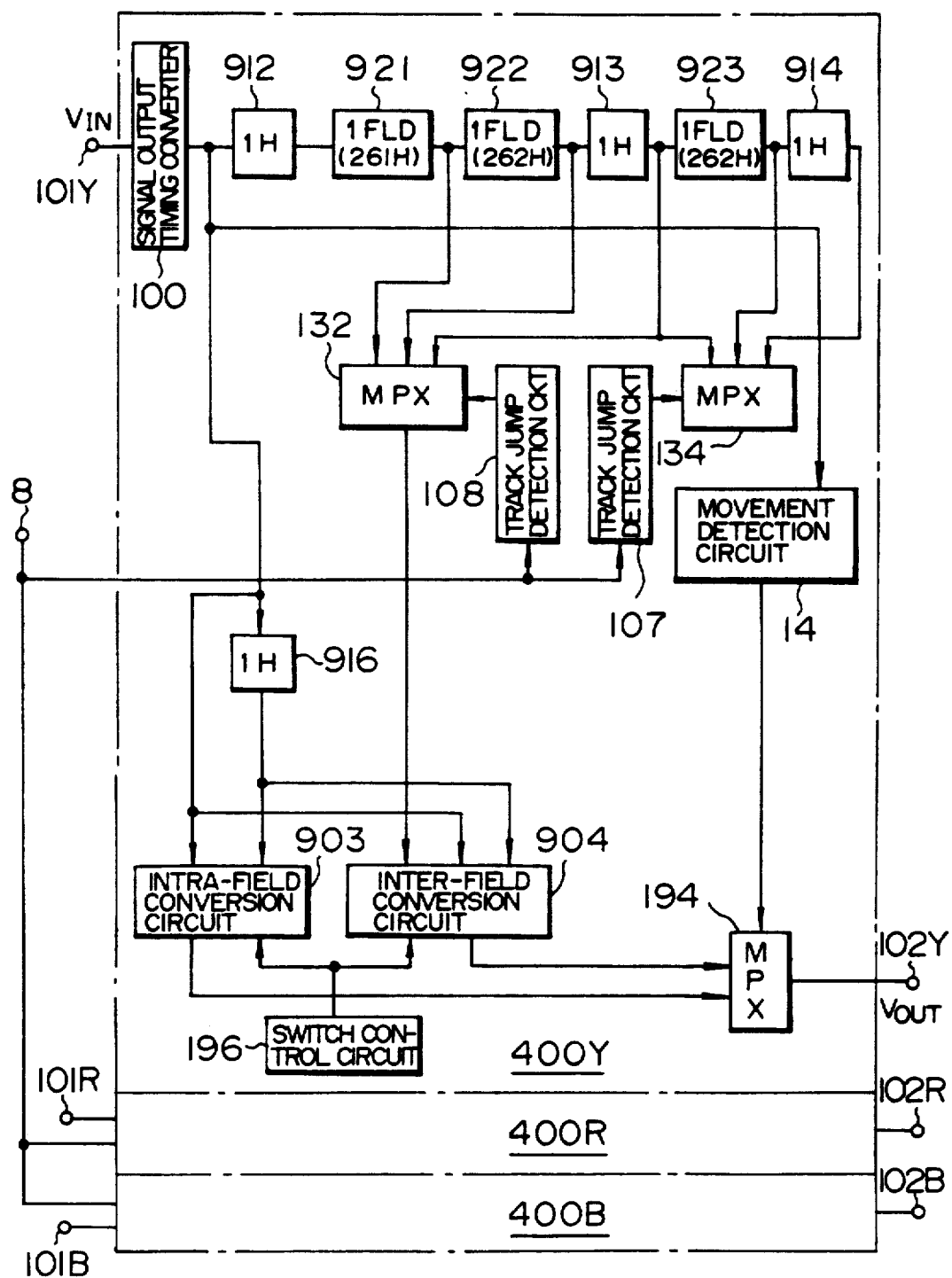
FIG. 23 is a block diagram showing the construction of a modified example of the embodiment indicated in FIG. 20.

FIG. 23 shows a modified example of the embodiment indicated in FIG. 11. The field conversion portions 400Y, 400R and 400B field-conversion-process component signals, i.e. the luminance signal, the color difference signals (R-Y) and (B-Y) of the reproduced image signal, inputted through the input terminals 101Y, 101R and 101B, respectively, and outputs them to the output terminals 102Y, 102R and 102B. The construction of the field conversion portions 400R and 400B is identical to the construction of the field conversion portion 400Y. By this modification it is possible to obtain effects similar to those obtained by the embodiment indicated in FIG. 20.

Figure 24:
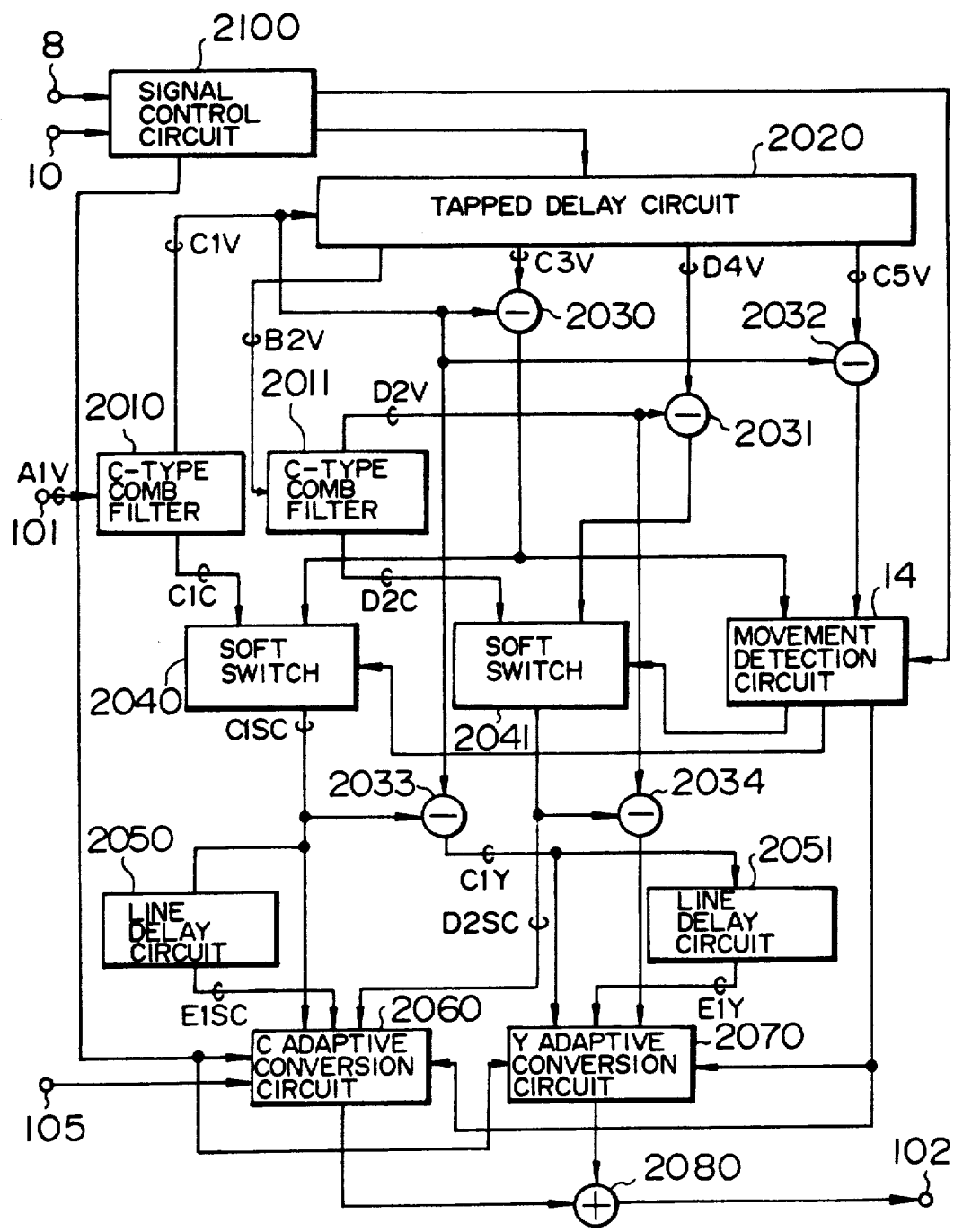
FIG. 24 is a block diagram showing the construction of a fourth embodiment of the field conversion device according to the present invention.
Figure 25:
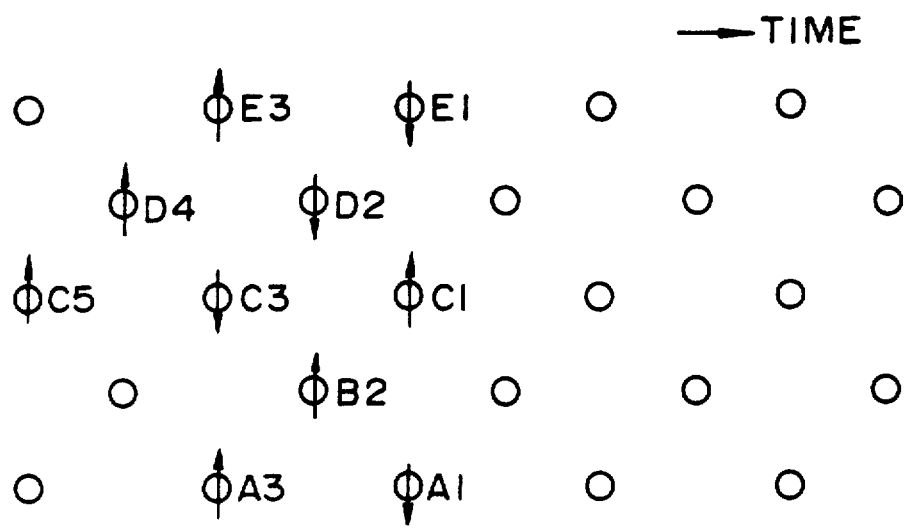
FIG. 25 is a scheme representing an image for explaining a signal processing operation of the field conversion device indicated in FIG. 24.

FIG. 24 is a block diagram showing the fourth embodiment of the present invention and FIG. 25 is a scheme for explaining the operation thereof, in which the position of scanning lines for signals in different portions are indicated and the time axis is set in the horizontal direction, i.e. now fields appear one after another in this direction. Marks A, B, C, ... in FIG. 25 indicate the position of scanning lines and suffixes represent the field number. In the case where it is necessary to indicate the kind of signals, in particular the composite image signal, the luminance signal, the carrier chrominance signal, etc. for each position of signal, A1, B2, ..., etc., marks V, Y, C, etc. are added after each of the marks. Further arrows indicate the phase of the color subcarrier in the case of the NTSC signal.

In FIG. 24, 101 is an input terminal for the composite reproduced image signal; 102 is an output terminal for the composite image signal after the field conversion; 8 is an input terminal for a signal indicating the field number of the reproduced image signal; 10 is an input terminal for a signal indicating the field number of the output image signal after the signal processing; 105 is an input terminal for a mode signal indicating the reverse playback; 2010 and 2011 are line C-type comb filter outputting the carrier chrominance signal; 2020 is a tapped delay circuit for delaying signals in field unit; 2030 to 2032 are subtracting and averaging circuits, each of which reduces the signal level to a half after subtraction; 2033 and 2034 are subtracters; 2040 and 2041 are soft switch circuits; 2050 and 2051 are line delay circuits; 2060 is a C adaptive line conversion circuit line-converting the carrier chrominance signal; 2070 is a Y adaptive line conversion circuit line-converting the luminance signal; 2080 is an adding circuit; and 2100 is a signal control circuit for controlling the delay time of the tapped delay circuit 2020, signal processing of the C adaptive control circuit 2060 and the Y adaptive control circuit 2070, etc. Here the line C-type comb filter 2010, the subtracting and averaging circuit 2030; the subtraction circuit 2033; the soft switching circuit 2040; and the movement detection circuit 14 constitute a first motion adaptive Y/C separation circuit, which separates the composite signal of the field at that time into the luminance signal and the chrominance signal. On the other hand, the line C-type comb filter 2011, the subtracting and averaging circuit 2031, the subtraction circuit 2034; the soft switch circuit 2041; and the movement detection circuit 14 are means for separating the signal of the field, which is in the interlaced relation with the signal of the field at that time, into the luminance signal and the chrominance signal and constitute a motion adaptive Y/C separation circuit.

The composite image signal A1V inputted through the terminal 101 is inputted in the line C-type comb filter 2010 and the carrier chrominance signal is separated to be outputted. Here, as an example, it is a so-called three lines adaptive C-type comb filter, which uses three lines contiguous to each other to separate and process them adaptively, depending on the pattern. The composite image signal inputted at that time through the terminal 101 is denoted in FIG. 25 by A1V. The carrier chrominance signal C1C separated by the line C-type comb filter 2010 is at a position delayed by one line with respect to the composite image signal A1V. The carrier chrominance signal C1C thus separated is inputted in the soft switch circuit 2040. Further a composite image signal C1V having a same delay time as the separated carrier chrominance signal C1C, which is at a position indicated by C1 in FIG. 25, is outputted by the filter 2010. The composite image signal C1V is inputted in the tapped delay line 2020 and the subtracting and averaging circuit 2030.

A composite image signal B2V, which is delayed by 1 field with respect to the inputted composite image signal C1V so as to be at a position indicated by B2 in FIG. 25, is outputted from the first tap of the tapped delay line 2020. The composite image signal B2V outputted from the first tap is inputted in the line C-type comb filter 2011 and a carrier chrominance signal D2C corresponding to a position indicated by D2 in FIG. 25 is outputted in the same way as indicated above. Then it is inputted in the soft switch circuit 2041. Further a composite image signal D2V having a same delay time as the separated carrier chrominance signal D2C, so as to be at the position D2 in FIG. 25, is outputted to be inputted in the subtracting and averaging circuit 2031 and the subtracting circuit 2034.

A composite image signal C3V, which is delayed by 2 fields with respect to the signal C1V inputted in the tapped delay line 2020 so as to be at a position C3 in FIG. 25, is outputted from the second tap of the tapped delay line 2020. The composite image signal C3V is inputted in the subtracting and averaging circuit 2030 to be subtracted from the composite image signal C1V and averaged. In this way a frame C-type comb filter is constructed. The carrier chrominance signal outputted from the subtracting and averaging circuit 2030 is inputted in the soft switch circuit 2040.

The soft switch circuit 2040 has a construction identical to that indicated in FIG. 18, in which the carrier chrominance signal C1C separated by the line C-type comb filter 2010 and the carrier chrominance signal separated by the frame C-type comb filter composed of the tapped delay line 2020 and the subtracting and averaging circuit 2030 are inputted. When there is no movement in the picture, the output signal of the frame C-type comb filter is selected, and in the case where movements are significant, the output signal of the line C-type comb filter is selected. The selection of this signal is controlled by a control signal k outputted by the movement detection circuit 14. That is, the two signals are mixed with a mixing ratio determined by an amount of this movement k to be outputted. Demoting the value of the output signal LC of the line C-type comb filter by LC, the value of the output signal of the frame C-type comb filter by FC and the coefficient indicating the magnitude of the amount of movements by k, the output signal SC of the soft switch circuit 2040 is given by a following formula;

$$SC = k \cdot LC + (1-k) \cdot FC$$

An output signal C1SC of the soft switch circuit 2040 at a position C1 is inputted in the C adaptive line conversion circuit 2060; the line delay circuit 2050 and the subtracting circuit 2033. A one-horizontal scanning period signal is delayed by the line delay circuit 2050 and a signal E1SC at a position of E1 in FIG. 25 is inputted in the C adaptive line conversion circuit 2060.

A composite image signal D4V, which is delayed by 3 fields with respect to the composite image signal C1V inputted in a tapped delay circuit 2020 so as to correspond to a position D4 in FIG. 25, is outputted from the third tap of the tapped delay circuit 2020 to be inputted in the subtractive and average circuit 2031. This composite image signal D4V is subtracted from the composite image signal D2V inputted in the subtractive and average circuit 2031 and averaged. In this way a frame C-type comb filter is constructed.

The output signal of the subtracting and averaging circuit 2031 is inputted in the soft switch circuit 2041. The soft switch circuit 2041 is operated in the same way as the soft switch circuit 2040 and the control signal from the movement detection circuit 14 is inputted therein. In this way the output signal D2C of the line C-type comb filter 2011 and the output signal of the frame C-type comb filter are mixed and added, depending on the amount of movements, to be outputted. The output signal D2SC corresponding to the position D2 of the soft switch circuit 2041 is inputted in the C adaptive line conversion circuit 2060 and the subtracting circuit 2034.

On the other hand, the composite image signal C1V inputted in the tapped delay circuit 2020 is inputted in the subtracting circuit 2033. The carrier chrominance signal C1SC outputted by the soft switch circuit 2040 is also inputted in the subtracting circuit 2033 to be subtracted from the composite image signal C1V. The luminance signal C1Y corresponding to the position C1 in FIG. 25 is outputted from the subtracting circuit 2033 and inputted in the line delay circuit 2051 and the Y adaptive line conversion circuit 2070. The one horizontal scanning period luminance signal C1Y is delayed by the line delay circuit 2051, which outputs the luminance signal E1Y corresponding to the position E1 in FIG. 25. Further the composite image signal D2V and the carrier chrominance signal D2SC corresponding to the position D2 in FIG. 25 are inputted in the subtracting circuit 2334, which outputs the luminance signal D2Y, which is inputted in the Y adaptive line conversion circuit 2070.

This means that the luminance signals corresponding to the positions C1, D2 and E1 indicated in FIG. 25 are inputted in the Y adaptive line conversion circuit 2070. The control signal from the movement detection circuit 14 is inputted in the Y adaptive line conversion circuit 2070. The field conversion is effected by using interfield signals when there are no movements, and interline signals when there are movements. In the case where the field conversion is effected from an odd number field to an even number field or in the reverse direction, the scanning line conversion is effected so as to have a signal between the positions C1 and D2 in FIG. 25. Denoting the value of that signal in the case where there are no movements, a following equation is valid;

$$Y3S = m \cdot D2Y + (1-m) \cdot E1Y,$$

where D2Y and E1Y represent values of the amplitude of the luminance signals at the positions D2 and E1, respectively (this being valid for the other marks), and m is a coefficient determining characteristics of the scanning line conversion filter and taken values from 0 to 1. Denoting the value of that signal in the case where there are significant movements by Y3M, $$Y3M = (C1Y + 3 \cdot E1Y)/4$$

is obtained/ 10 Denoting the coefficient indicating the magnitude of the amount of movements by k and supposing that the value of the signal is Y3, $$Y3 = k \cdot Y3M + (1-k) \cdot Y3S$$

is obtained.

In the case where the conversion is effected from an odd number field to an odd number field on from an even number field to an even number field, the scanning line conversion is effected so as to have a signal between the positions C1 and D2 in FIG. 25. Denoting the values of that signal in the case where there are no movements by Y1S, $$Y1S = m \cdot C1Y + (1-m) \cdot D2Y$$

is valid. Denoting the values of that signal in the case where there are significant movements $$Y1M = (3 \cdot C1Y + E1Y)/4$$

is obtained. Denoting the coefficient indicating the magnitude of the amount of movements by k and supposing that the value of the signal is Y1, $$Y1 = k \cdot Y1M + (1-k) \cdot Y1S$$

is obtained.

This means that the carrier chrominance signal corresponding to the positions C1, D2 and E1 indicated in FIG. 25 are inputted in the C adaptive line conversion circuit 2060. The control signal from the movement detection circuit 14 is inputted in the C adaptive line conversion circuit 2060. The field conversion is effected by using inter-field signals for a still picture, where there are no movements, and inter-line signals for a moving picture, where there are movements. The C adaptive line conversion circuit 2060 is operated in the same way as the Y adaptive line conversion circuit 2070. In the case of the NTSC signal, since the frequency of the color subcarrier is a half of an odd number times as high as the frequency of the horizontal scanning, the phase of the color subcarrier is inverted at the position C1 as well as the positions D2 and E1. Consequently the conversion can be effected by the same processing as the Y adaptive line conversion circuit 2070 by inverting the phase of the signal at the positions D2 and E1 with respect to the signal at the position C1.

A phase inversion circuit and a control circuit therefor are necessary further after the scanning line conversion in the C adaptive line conversion circuit 2060. In the case of the NTSC signal, since the frequency of the color subcarrier is selected so as to be a half of an odd number times as high as the frequency of the horizontal scanning, as described above, the phase of the carrier chrominance signal is inverted between lines in a part, where the hue is not varied. Based on this relation, the control is effected to invert the phase of the carrier chrominance signal or to interrupt the inversion so that the phase thereof is in accordance with the phase of the color subcarrier of the converted field.

These controls are effected on the basis of the control signal from the signal control circuit 2100. The field No. of the reproduced image signal inputted through the terminal 8 is compared with the field No. of the output image signal inputted through the terminal 10 and the conversion control is effected on the basis of this relation. FIG. 26 shows a table, in which this control is summarized.

In FIG. 26, ¼ represents a scanning line conversion to a same scanning line and ¾ indicates a scanning line conversion to a different scanning line.

The luminance signal and the carrier chrominance signal converted as described above are inputted in the adding circuit 2080 to be added there to form a field-converted composite image signal, which is outputted through the terminal 102.

Further the output of the subtracting and averaging circuit 2030 is inputted in the movement detection circuit 14. For a signal, where there are no movements, contrarily to the fact that the phase of the carrier chrominance signal is inverted between frames, the amplitude of the luminance signal is not varied. Therefore the luminance signal is removed by subtraction so that only the carrier chrominance signal is outputted. Consequently, by removing carrier chrominance signal components from the output of the frame C-type comb filter, it is possible to detect movements in the luminance signal. Concretely speaking, it is possible to obtain movement signals in the luminance signal by making the output of the frame comb filter pass through a low pass filter.

Further the composite image signal C1V is inputted in the subtracting and averaging circuit 2032. Another composite image signal C5V delayed by 4 fields with respect to the composite image signal C1V and corresponding to the position C5 in FIG. 25 is outputted from the fourth tap of the tapped delay circuit 2020 and inputted in the subtracting and averaging circuit 2032. A difference signal between the composite image signals C1V and C5V inputted in the subtracting and averaging circuit 2032 is outputted therefrom and inputted in the movement detection circuit 14. For a signal, in which there are no movements, since carrier chrominance signals are in accordance in the phase between different two frames and luminance signals are in accordance with each other in the amplitude, it is possible to detect the movements by forming the difference.

According to the present embodiment, since the field converting processing is effected by using inter-field signals for a part of a still picture, there are no variations of the center of gravity both in the case of a conversion from an odd number field to an even number field or a conversion of reverse direction and in the case of a conversion from an odd number field to an odd number field or from an even number field to an even number field, the field converting processing can be visually stabilized.

On the other hand, since contrary to the fact that the level of signal remains unchanged for different frames in a luminance signal, where there are no movements, the phase of a carrier chrominance signal, where there are no movements is inverted between different frames, it is possible to separate the carrier chrominance signal from a composite signal by forming the average of signal differences between different frames. In this way, it is not necessary to restrict the band, which should have comb-shaped filter characteristics. Therefore it is possible to separate the luminance signal and the carrier chrominance signal without worsening in the resolution in the diagonal direction as produced by a line Y/C separation comb-shaped filter.

Furthermore, by using a frame comb-shaped filter, since it is not necessary to restrict the band having comb-shaped characteristics, it is possible to separate surely the luminance signal and the carrier chrominance signal even at a horizontal transient part of the chrominance signal. In addition, since no carrier chrominance signal components remain in the luminance signal, it is possible to eliminate color flicker.

Figure 27:
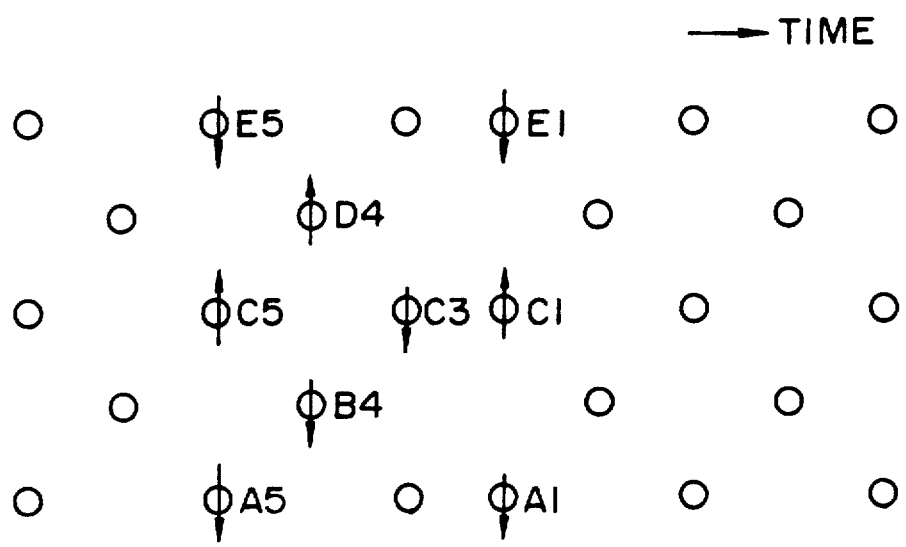
FIG. 27 is a scheme representing an image for explaining the signal processing, in the case where fields are skipped, in the field conversion device indicated in FIG. 24.

Next, the signal processing in the case where one field is skipped for several fields in order to shorten the playback time will be explained. FIG. 27 is a scheme indicating the position of signals for explaining the operation in this case.

In FIG. 27, it is supposed that the number of the field, which is reproduced at present, is designated by 1, that the playback is effected by skipping field 2, and that at least fields 3, 4 and 5 preceding them are reproduced successively. In this case, since the playback is effected, skipping field 2, the Y/C separating processing by means of a frame comb-shaped filter using field 2 and field 4. In this case, the inteline Y/C separating processing using only field 4 is not possible. Further, similarly, it is not possible also to detect movements by using field 2 and field 4. In this case, the signal processing is effected, supposing that there are no movements between field 2 and field 4. Or the processing is effected, using a signal obtained by multiplying a movement signal of the preceding field by a coefficient for a signal representing movements in this field.

Concretely speaking, the signal processing is effected as described below. A composite image signal B4V at a position B4 in FIG. 27 delayed by 2 fields (since the playback is effected by skipping originally field 2, this corresponds to a delay of substantially 3 fields) with respect to the inputted image signal C1V, which are in the interlaced relation with each other, is outputted from the first tap of the tapped delay line 2020 in FIG. 24. Similarly to the case indicated in FIG. 25, a composite image signal C3V at a position C3, a composite image signal D4V at a position D4 and a composite image signal C5V at a position C5 are outputted from the second, the third and the fourth tap, respectively. In this way a carrier chrominance signal D4C at the position D4 is outputted from the line C-type comb filter 2011. The continuity of the reproduced field number inputted through the terminal 8 is examined in the signal control circuit 2100 and for the field immediately after the field jump the movement detection circuit 14 controls the soft switch circuit 2041 so as to be forcedly turned-over to the movement mode. Further, since the signal D4V is inputted in the two input terminals of the subtracting and averaging circuit 2031 constituting the frame comb-shaped filter, the processing is effected, supposing that there are movements. Since the control signal from the signal control circuit 2100 is inputted in the movement detection circuit 14, the control may be effected so that the signal from the subtracting and averaging circuit 2032 is forcibly set at 0. In this case the output signal from the third tap of the tapped delay line 2020 is indifferent.

Figure 28:
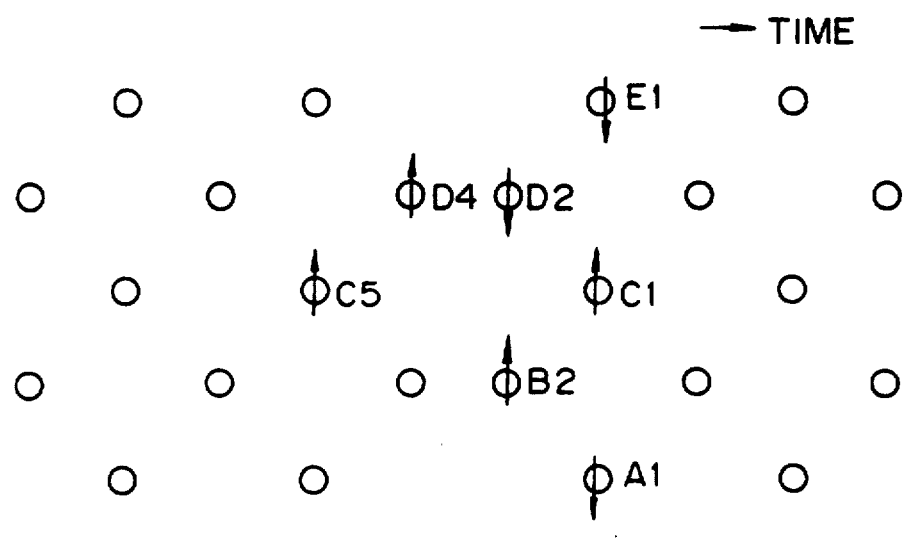
FIGS. 28 to 30 are schemes representing different images for explaining the signal processing operation of the field conversion device indicated in FIG. 24.

FIG. 28 is a scheme indicating the signal processing for the case succeeding the field indicated in FIG. 27 by 1 field. This means that the playback is effected, skipping the signal preceding the field at that time by two fields. In this case, since there is no signal of field 3, the signal processing effected by using signals of field 1 and field 3 is not possible. The Y/C separating processing is effected between different times by using only the signal of field 1. The movement detection is effected by using field 1 and field 5. The signal processing is effected, supposing that there are no movements between field 1 and field 3.

Concretely speaking, the signal processing is effected, as described below. Similar to the case indicated in FIG. 25, signals B2V, D4V and C5V are outputted from the first, the third and the fourth tap of the tapped delay line 2020 in FIG. 24, respectively, responding to the inputted image signal C1V. The movement detection circuit 14 controls the soft switch circuit 2040 so as to be turned-over forcedly to the movement mode, on the basis of the control signal from. the signal control circuit 2100. The output signal of the subtractive and average circuit 2030 is controlled by the movement detection circuit 14 so as to be forcibly set at 0.

Figure 29:
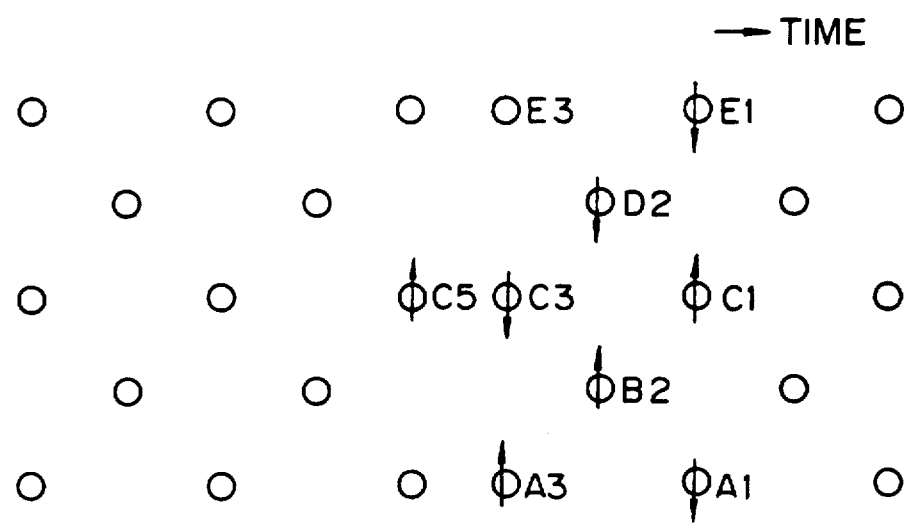

FIG. 29 is a scheme indicating the signal processing for the case succeeding the field indicated in FIG. 28 further by 1 field. This means that the playback is effected, skipping the signal preceding the field at that time by three fields. In this case, since there is no signal of field 4, the signal processing effected by using signals of field 2 and field 4 is not possible. The Y/C separating processing is effected between different lines by using only the signal of field 2.

Concretely speaking, the signal processing is effected, as described below. Similar to the case indicated in FIG. 25, signals B2V, C3V and C5V are outputted from the first, the second and the fourth tap of the tapped delay line 2020 in FIG. 24, respectively, responding to the inputted image signal C1V. The movement detection circuit 14 controls the soft switch circuit 2041 so as to be turned-over forcedly to the movement mode, on the basis of the control signal from the signal control circuit 2100. The output signal of the subtracting and averaging circuit 2031 is controlled by the movement detection circuit 14 so as to be set forcedly at 0.

Figure 30:
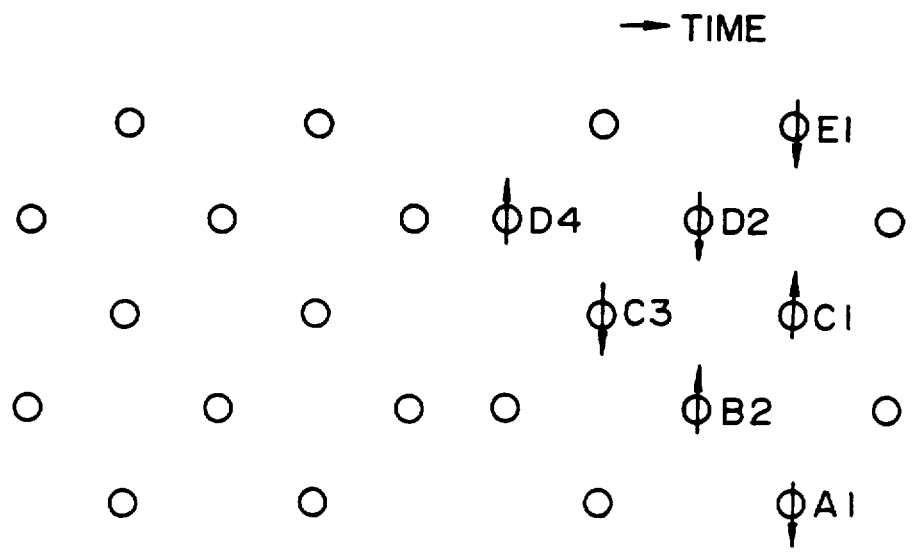

FIG. 30 is a scheme indicating the signal processing for the case succeeding the field indicated in FIG. 29 further by 1 field. This means that the playback is effected, skipping the signal preceding the field at that time by four fields. In this case, since there is no signal of field 5, the signal processing effected by using signals of field 1 and field 5 is not possible. The signal processing is effected, supposing that there are no movements between two frames.

Concretely speaking, the signal processing is effected, as described below. Similarly to the case indicated in FIG. 25, signals B2V, C3V and D4V are outputted from the first, the second and the third tap of the tapped delay line 2020 in FIG. 24, respectively, responding to the inputted image signal C1V. The movement detection circuit 14 controls the output signal of the subtracting and averaging circuit 2032 so as to be set forcedly at 0, on the basis of the control signal from the signal control circuit 2100.

If succeeding fields are successively reproduced, the playback returns to the normal state indicated in FIG. 25. In the case where the immediately succeeding field is skipped, the state indicated in FIG. 27 takes place and the signal processing described above is repeated. If the skipping (jumping) of fields is less frequent than once for every 5 fields, the signal processing described above can be effected.

FIG. 31 is a table, in which the signal processing described above is summarized.

FIG. 32 is a table indicating the output signals from the different taps of the tapped delay line.

Figure 33:
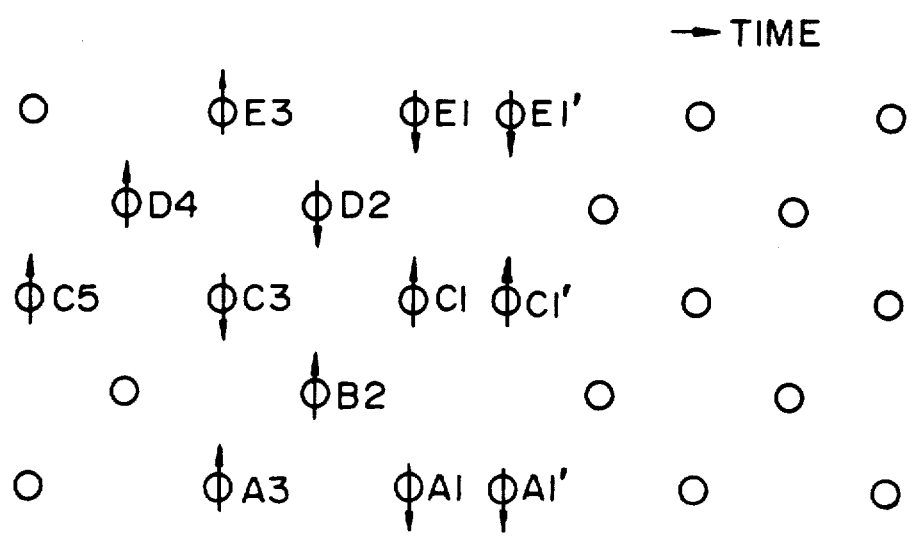
FIG. 33 is a scheme representing an image for explaining the signal processing in the case of slow playback in the field conversion device indicated in FIG. 24.

Next the signal processing for the slow playback, in which same fields are repeated, will be explained. FIG. 33 is a scheme for explaining this signal processing, in which one field is repeatedly reproduced.

In FIG. 33, signals A1 and A1', C1 and C1', and E1 and E1' are signals belonging to different same lines in a same field, respectively. In this case, signals B2V, C3V, D4V and C5V are outputted from the first, the second, the third and the fourth tap of the tapped delay line 2020 indicated in FIG. 24, respectively. At this time, the signal A1', etc. of the field, which is being reproduced at that time, are not written in the tapped delay line 2020 and the signals, which have been already written-in (signals of fields 1 to 5), are maintained, as they are.

After one field, in the case where the signal of a same field is reproduced again, the signal processing is effected in the same way as explained, referring to FIG. 33. As far as the same field is repeated, the same signal processing is effected. That is, also in the case of the signal processing of a freeze mode, the same signal processing can be effected.

When the succeeding field is reproduced, similarly to the case indicated in FIG. 25, the usual signal processing is effected. That is, a slow playback is realized. In particular, in the case of a slow playback, since signals of a new field are produced by using signals of two fields, which are in the interlaced relation with each other, not only there are no displacements of the center of gravity of images, but also there is no worsening in the vertical resolution. For example, any inclined line is never stepwise, which improves remarkably the image quality.

Now the case of the reverse playback will be explained. In the case of the reverse playback the phase of the color subcarrier in the carrier chrominance signal is different from that for the usual playback. In FIG. 24, the phase of the color subcarrier in the signal D2SC outputted by the soft switch 2041 is inverted. In FIG. 24, a mode signal is taken-in through the terminal 105 from a system controller, etc. and at the reverse playback the signal processing is effected by inverting the phase of the signal D2SC. The signal processing other than the phase inversion of the signal D2SC is identical to that used for the usual playback.

Figure 34:
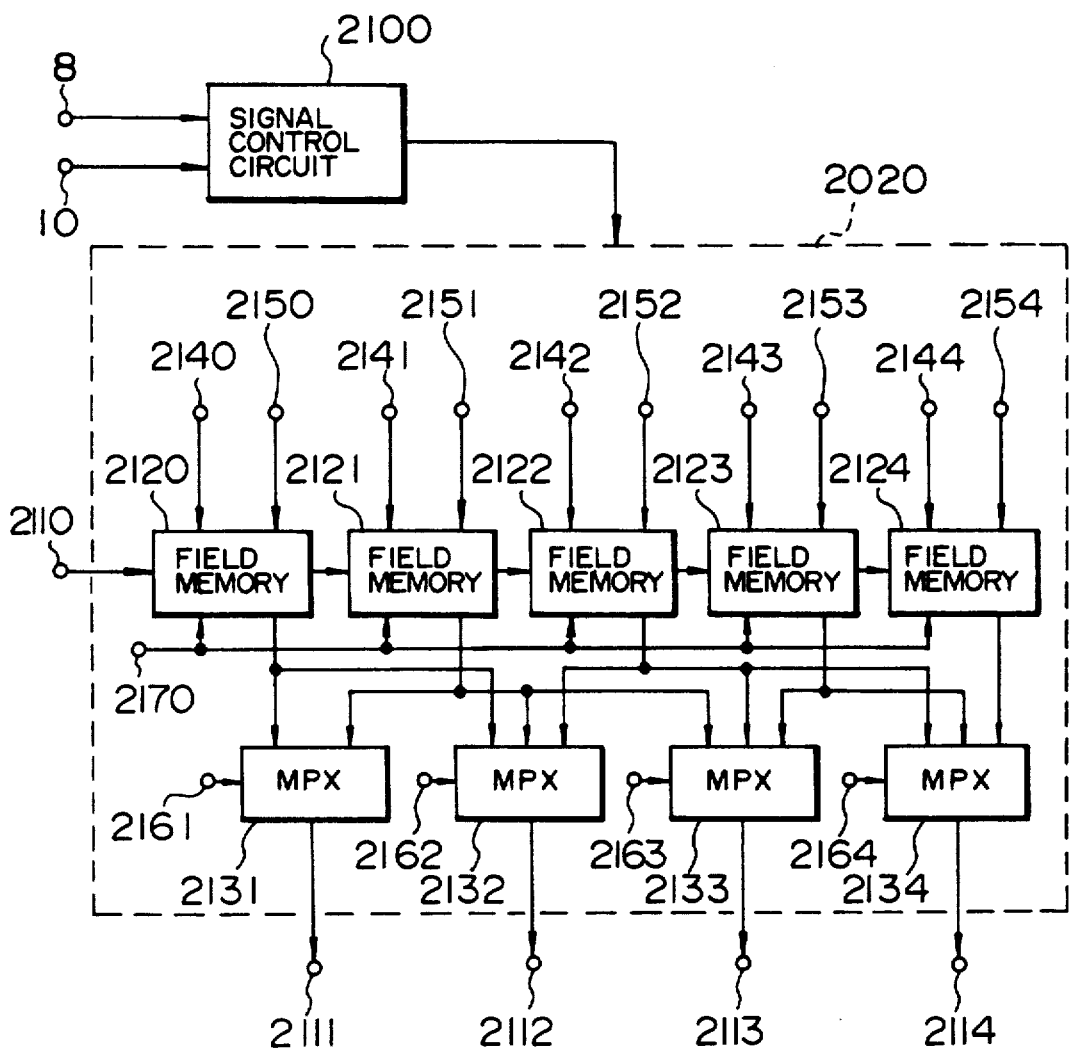
FIG. 34 is a scheme showing the construction of an example of a tapped delay circuit indicated in FIG. 24.

FIG. 34 is a block diagram showing an example of the tapped delay circuit 2020. In FIG. 34, parts identical to those indicated in FIG. 24 are denoted by same reference numerals and explanation thereof will be omitted. 2110 is an image signal input terminal of the tapped delay circuit 2020; 2111 to 2114 are output terminals from the first to the fourth tap; 2120 to 2124 are field memories; 2131 to 2134 are switching circuits; 2140 to 2144 are input terminals for write control signals for controlling the timing to write signals in the field memories 2120 to 2124, respectively; 2150 to 2154 are similarly input terminals for read control signals for controlling to read-out data therefrom; 2161 to 2164 are input terminals for switching control signals for controlling the switching circuits 2131 to 2134, respectively, to switch-over them; and 2170 is a control signal input terminal for controlling the field memories 2120 to 2124 to interrupt writing image signals therein.

The continuity of the field number of the reproduced image signal inputted through the terminal 8 is examined. At a point where the field number becomes discontinuous, a delay control signal for controlling the device so as to output the signals indicated in FIG. 32 through the different taps is outputted. This control signal is inputted in the terminals 2140 to 2144 as a write-in control signal, in the terminals 2150 to 2154 as a read-out control signal, and in the terminals 2161 to 2164 as a switch-over control signal.

The field memory has a memory capacity of about 1 field. For example, for the case where the image signal B4V outputted from the first tap 2111, delayed by 2 fields, can be obtained from the first tap 2111 by selecting the signal inputted from the field memory 2121 in the switching circuit 2131 by means of the switching circuit 2131 to output it.

Applying the same procedure correspondingly to the following, it is possible to output the image signals indicated in FIG. 32 through the respective taps by controlling the switching circuits 2131 to 2134.

Next, a case where a field in consecutive image signals is repeatedly reproduced at least two times in order to adjust the playback time or to effect a slow playback will be explained.

In the case where field 1 is reproduced successively twice, it is recognized by the signal control circuit 2100 indicated in FIG. 24 that a same field is inputted successively twice by using reproduced field numbers inputted through the terminal 8. A control signal from the signal control circuit 2100 is inputted in the tapped delay line 202) and then inputted in the terminal 2170 indicated in FIG. 34. In this way it is interrupted to write signals in the field memories 2120 to 2124.

At this time, as explained above, referring to FIG. 33, the switching circuit 2131 to 2134 select the signals B2V, C3V, D4V and C5V to output them.

The procedure remains same also in the case where a same field is reproduced over more than 2 fields. The signal processing is possible by interrupting to write signals in the field memories 2120 to 2124 as far as a same field continues.

Although, in the embodiment indicated in FIG. 24, the case where the composite image signal is reproduced is indicated, the separation into the luminance signal and the carrier chrominance signal is unnecessary, in the case where component signals such as the luminance signal, the chrominance signal, etc. are reproduced. Furthermore, for the output, it is sufficient to output the luminance signal and the color difference signal and the adding circuit is also no more necessary. Also in this case, it is obvious that it is possible to use the scanning line conversion circuit according to the present invention.

According to the present embodiment, since the inter-field converting processing is effected for a still picture portion of the reproduced image signal, also at a part, where the field skipping has been effected or in the case where a same field is successively reproduced, it is possible to remove displacements of the center of gravity by the field converting processing. Further, for a still picture portion of the reproduced image signal, since the inter-frame Y/C separating processing can be effected, it is possible to remove worsening in the resolution in the diagonal direction by the field converting processing. Furthermore, it is not necessary to restrict the separation band of the luminance signal and the carrier chrominance signal for the inter-frame Y/C separation, the carrier chrominance signal never remains in the luminance signal and color flicker, which was produced heretofore by color signals remaining in the luminance signal, can be eliminated. Although the procedure is identical to that used heretofore for a moving picture portion, since the resolution is lowered originally by residual images, etc., lowering in the resolution for the luminance signal, etc. give rise to almost no problem. Further, horizontal transient portions of the chrominance signal are not abrupt owing to the effects of the residual images and chrominance signals remaining in the luminance signal are almost perfectly eliminated. Consequently almost no color flickers take place.

Owing to the effects described above, it is possible to improve the image quality at the variable speed playback.

Figure 35:
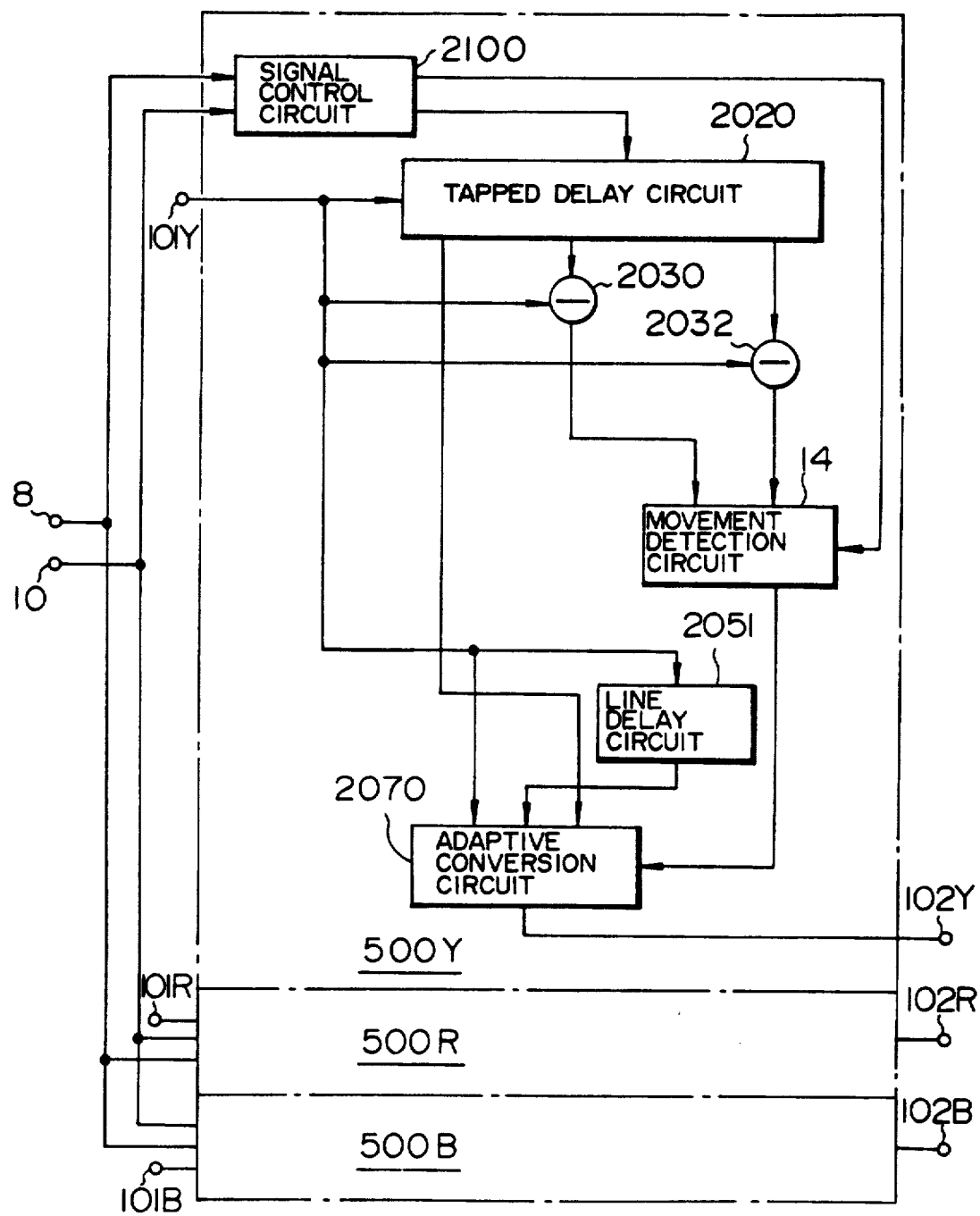
FIG. 35 is a block diagram showing a modified example of the field conversion device indicated in FIG. 24.

FIG. 35 shows a modified example of the embodiment indicated in FIG. 24. Field conversion portions 500Y, 500R and 500B field-conversion-process component signals, i.e. the luminance signal, and the color difference signals (R-Y) and (B-Y), inputted in input terminals 101Y, 101R and 101B, respectively, and output them to output terminals 102Y, 102R and 102B. The construction of the field conversion portions 500R and 500B is identical to the construction of the field conversion portion 500Y. Also in the present embodiment, effects similar to those obtained in the embodiment indicated in FIG. 24 can be obtained.

We claim:

1. A field conversion device forming data of a new field from data of an arbitrary field of an interlaced television signal, said field conversion device comprising:

means for forming data of a first field, using data of a field which is to be field-converted, and data of a field having an interlaced relation therewith;

means for forming data of a second field, using data of a plurality of lines of said field which is to be field-converted;

movement detection means for detecting movement in said data of said field which is to be field-converted; and means for selectively outputting data of said first field and data of said second field, according to a detection result of said movement detection means.

2. A field conversion device according to claim 1, wherein said output means includes adding means, which adds said data of said first field and said data of said second field with said ratio according to a detection result of said movement detection means to output data obtained by this addition to comprise data of said new field.

3. A field conversion device according to claim 2, wherein said adding means includes means for adding said data of said first field and said data of said second field with a ratio according to a degree of movement in an image detected by said movement detection means.

4. A field conversion device according to claim 1, wherein said means for forming data of the first field comprises:

first coefficient multiplier means for multiplying data at a predetermined point within said field of a reproduced television signal which is to be field-converted, by m (m: a positive number);

second coefficient multiplier means for multiplying said data at said predetermined point n (n: a positive number);

third coefficient multiplier means for multiplying data at a point preceding said predetermined point by a horizontal scanning period (1 H) by m, fourth coefficient multiplier means for multiplying the data at said point preceding said predetermined point by 1 H by n;

fifth coefficient multiplier means for multiplying data at a point preceding said predetermined pint by 262 H, or a data equivalent thereto, by n;

sixth coefficient multiplier means for multiplying data at a point preceding said predetermined point by 263 H, or a data equivalent thereto, by m;

seventh coefficient multiplier means for multiplying data at a point preceding said predetermined point by 264 H, or a data equivalent thereto, by n;

first adding means for adding outputs of said first, fourth, fifth and sixth coefficient multiplier means;

second adding means for adding outputs of said second, third, sixth and seventh coefficient multiplier means;

means for judging whether both a field number of said reproduced television signal, which is to be field-converted, and a field number of an output television signal of said field conversion device are odd or even; and means for selectively outputting an output of said first adding means and said second adding means, according to a judgment result of said judgment means;

wherein said output means outputs said output of said first adding means when said judgment means judges that both the field numbers are odd or even, and said outputs output of said second adding means when said judgment means judges that one of said field numbers is odd and other thereof is even.

5. A field conversion device forming data of a new field from data of an arbitrary field of an interlaced television signal, said field conversion device comprising:

means for forming data for a new first field such that a center of gravity of an image thereof is disposed between adjacent scanning lines of said new first field and said arbitrary field, by using data of a field which is to be field-converted, and data of a field which is in an interlaced relation therewith;

means for forming data of a new second field such that the center of gravity of an image thereof is disposed between two scanning lines adjacent to each other, by using data of a plurality of lines of said field which is to be field-converted;

movement detection means for detecting movements in the data of said field which is to be field-converted; and means for selectively outputting the data of said new first field and the data of said new second field, according to a detection result of said movement detection means.

6. A field conversion device according to claim 5, wherein said selective outputting means comprises adding means for adding said data of said new first field and said data of said new second field, with a ratio according to a detection result of said movement detection means, to output data obtained by said addition as data of said new field.

7. A field conversion device forming data of a new field from data of an arbitrary field of an interlaced television signal, said field conversion device comprising:

means for separating, at a certain time, a composite signal of a first field into a luminance signal and a chrominance signal;

means for obtaining a luminance signal of a second field, which is in an interlaced relation with said signal of said first field at said certain time, starting from said composite signal;

means for obtaining a new first luminance signal of said new field, using said luminance signal of said first field separated at said certain time by said separation means and said obtained luminance signal of said second field which is in an interlaced relation therewith;

means for obtaining a new second luminance signal of said new field, using luminance signals of a plurality of lines in said first field at said certain time;

movement detection means for detecting movements in an image of said inputted composite signal;

means for selectively outputting said new first luminance signal and said new second luminance signal according to a detection result of said movement detection means;

means for obtaining a new chrominance signal of said new field using the chrominance signal of said first field separated by said separation means at said certain time; and means for adding said selectively outputted luminance signal and said obtained new chrominance signal to output a signal obtained by said addition as a signal for said new field.

8. A field conversion device according to claim 7, wherein said means for selectively outputting said new first luminance signal and said new second luminance signal comprises means for adding data of said new first luminance signal and said new second luminance signal with a ratio according to a detection result of said movement detection means to give said adding means a signal obtained by said addition.

9. A field conversion device according to claim 7, wherein said means for obtaining said new first luminance signal comprises means for obtaining a new first luminance signal of said new field having a field number contiguous to a field number of said luminance signal separated by said separation means, at said certain time, from said composite signal outputted by said field conversion device, and said luminance signal thus obtained from said second field which is in a interlaced relation therewith;

said means for obtaining said new second luminance signal comprises means for obtaining a new second luminance signal of said new field having a field number contiguous to a field number of said luminance signals of said plurality of lines from said composite signal outputted by said field conversion device at said certain time; and said means for obtaining said new chrominance signal includes means for obtaining a new chrominance signal of said new field having a field number contiguous to a field number of said chrominance signal separated by said separation means, at said certain time, from said composite signal outputted by said field conversion device.

10. A field conversion device according to claim 7, wherein said means for obtaining said new chrominance signal comprises:

means for obtaining a chrominance signal of said second field, which is in on interlaced relation with said first field at said certain time;

means for obtaining a new first chrominance signal of said new field, using said chrominance signal separated by said separation means, at said certain time, from said composite signal, and said chrominance signal thus obtained from said second field, which is in the interlaced relation with said first at said certain time;

means for obtaining a new second chrominance signal of said new field, using chrominance signals of a plurality of lines in said field at said certain time; and switching means for selectively outputting said new first chrominance signal and said new second chrominance signal according to a detection result obtained by said movement detection means.

11. A field conversion device according to claim 10, wherein said switching means comprises means for adding said new first chrominance signal and said new second chrominance signal with a ratio according to a detection result of said movement detection means to give said adding means a chrominance signal obtained by said addition.

12. A field conversion device according to claim 10, wherein said means for obtaining said new first chrominance signal comprises means for obtaining a new first chrominance signal of said new field having a field number contiguous to a field number of said chrominance signal separated by said separation means, at said certain time, from said composite signal outputted by said field conversion device, and the chrominance signal thus obtained from said second field, which is in the interlaced relation therewith; and said means for obtaining said new second chrominance signal comprises means for obtaining a new second chrominance signal of said new field having a field number contiguous to a field number of said chrominance signal of said plurality of lines of said composite signal outputted by said field conversion device at said certain time.

13. A field conversion device forming data of a new field from data of an arbitrary field of an interlaced television signal, said field conversion device comprising:

means for separating an inputted composite signal of a first field at a certain time into a separate luminance signal and a separate chrominance signal;

means for obtaining another luminance signal and another chrominance signal of a second field, which is an interlaced relation with said signal of said first field at said certain time, starting from said inputted composite signal;

means for obtaining a new first luminance signal of said new field, using said separate luminance signal separated from said composite field by said separation means at said certain time and said another luminance signal of said second field, which is in an interlaced relation therewith;

means for obtaining a new second luminance signal of the new field, using luminance signals of a plurality of lines in said first field at said certain time;

means for obtaining a new first chrominance signal of said new field, using said separate chrominance signal separated from said composite field by said separation means of said certain time, and said another chrominance signal thus obtained of said second field, which is in the interlaced relation with the signal;

means for obtaining a new second chrominance signal of the new field, using chrominance signal of a plurality of lines in said first field at said certain time;

movement detection means for detecting movements in an image of said inputted composite signal;

first switching means for selectively inputting said new first luminance signal and said new second luminance signal according to a detection result of said movement detection means;

second switching means for selectively outputting said new first chrominance signal and said new second chrominance signal according to said detection result of said movement detection means; and means for adding said selectively outputted luminance signal and said selectively outputted chrominance signal to output a signal obtained by this addition as a signal for said new field.

14. A field conversion device according to claim 13, wherein said means for obtaining said new first luminance signal comprises means for obtaining a new first luminance signal of said new field having a field number contiguous to a field number of said luminance signal separated by said separation means, at said certain time, from said composite signal outputted by said field conversion device, and said another luminance signal thus obtained from said second field, which is in the interlaced relation therewith;

said means for obtaining said new second luminance signal includes means for obtaining a new second luminance signal of said new field having a field number contiguous to a field number of said luminance signal of said plurality of lines in said composite signal outputted by said field conversion device at said certain time;

said means for obtaining said new first chrominance signal includes means for obtaining a new first chrominance signal of said new field having a field number contiguous to a field number of said chrominance signal separated by said separation means, at said certain time, from said composite signal outputted by said field conversion device, and said another chrominance signal thus obtained from said second field, which is in the interlaced relation therewith; and said means for obtaining said new second chrominance signal includes means for obtaining a new second chrominance signal of said new field having a field number contiguous to a field number of said chrominance signal of said plurality of lines in said composite signal outputted by said field conversion device at said certain time.

15. A field conversion device forming data of a new field from data of an arbitrary field of an interlaced television signal, said field conversion device comprising:

means for detecting at least a repetition or a jump in the field number of the inputted television signal;

means for forming data or a first field, using at least one of a data set of the field, which is to be field-converted, and a data set of a field, which is in a interlaced relation therewith;

means for forming data of a second field, using data of a plurality of lines in said field, which is to be field-converted; and detection means for detecting movements in an image represented by the data of said first field; and means for selectively outputting the data of said first field and the data of said second field as data of said new field;

wherein said means for forming data of the first field includes means for forming the data of the first field for fields in the neighborhood of the field, where a discontinuity has been found, responding to a fact that the discontinuity in the field number has been detected.

16. A field converting method for forming data of a new field from data to an arbitrary field of an interlaced television signal, said method comprising the steps of:

forming data of a first field, using data of a field which is to be field-converted and data of a field which is in an interlaced relation therewith;

forming data of a second field, using data of a plurality of lines of said field which is to be field-converted;

detecting movements in said data of said field which is to be field-converted; and selectively outputting said data of said first field and said data of said second field, according to a detection result of said movement detection means.

17. A field converting method according to claim 16, wherein said output means comprises adding means, which adds said data of said first field and said data of said second field with a ratio according to said detection result of said movement detection signals to output data obtained by said addition as data of said new field.

18. A field converting method according to claim 17, wherein in said data of said first field and said data of said second field are added to a ratio according to a degree of movements in an image detected in said movement detecting step.

19. A field converting method for forming data of a new field from data of an arbitrary field of an interlaced television signal, said method comprising the steps of:

forming data of a new first field such that a center of gravity of an image thereof is between two adjacent scanning lines, using data of a field is to be field-converted, and data of a field which is in an interlaced relation therewith;

forming data of a new second field such that said center of gravity of said image is between two adjacent scanning lines, using data of a plurality of lines of said field which is to be field-converted;

detecting movements in said data of said field which is to be field-converted; and selectively outputting said data of said first field and said data of said second field, according to a detection result obtained in said movement detecting step.

20. A field converting method according to claim 19, wherein said outputting step comprises a step of adding said data of said first field and said data of said second field with a ratio according to a detection result obtained in said movement detecting step to, thereby, output data obtained by said addition as data of said new field.

21. A field converting method for forming data of a new field from data of an arbitrary field of an interlaced television signal, said method comprising the steps of:

separating an inputted composite signal of a first field at a certain time into a separate luminance signal and a separate chrominance signal;

obtaining another luminance signal of a field which is in an interlaced relation with said signal of said first field at said certain time, starting from said inputted composite signal;

obtaining a new first luminance signal of said new field, using said separate luminance signal of said first field and said obtained another luminance signal of said field which is in an interlaced relation therewith;

obtaining a new second luminance signal of said new field, using luminance signals of a plurality of lines in said first field at said certain time;

detecting movements in an image of said inputted composite signal;

selectively outputting said new first luminance signal and said new second luminance signal, according to a detection result obtained in said movement detecting step;

obtaining a new chrominance signal of said new field, using said separate chrominance signal of said first; and adding said selectively outputted luminance signal and said obtained new chrominance signal to output a signal obtained by said addition as a signal for said new field.

22. A field converting method according to claim 21, wherein said step of selectively outputting said new first luminance signal and said new second luminance signal comprises a step of adding said data of said new first luminance signal and said new second luminance signal with a ratio according to said detection result obtained in said movement detecting step to give said adding means a signal obtained by said addition.

23. A field converting method according to claim 21, wherein said step of obtaining said new first luminance signal includes a step of obtaining a new first luminance signal of said new field having a field number contiguous to a field number of said new field signal, and using said separate luminance signal of said first field at said certain time, and said another luminance signal thus obtained of said field which is in the interlaced relation therewith;

said step of obtaining said new second luminance signal includes a step of obtaining a new second luminance signal of said new field having a field number contiguous to a field number of said new field signal, and using said luminance signals of a plurality of lines in the field at said certain time; and said step of obtaining said new chrominance signal includes a step of obtaining a chrominance signal of said new field having a field number contiguous to a field number of said new field signal, and using said separate chrominance signal of said first field at said certain time.

24. A field converting method according to claim 21, wherein said step of obtaining said chrominance signal comprises:

obtaining a chrominance signal of said field which is in the interlaced relation with said signal at said certain time, starting from the inputted composite signal;

obtaining said new first chrominance signal of said new field, using said separate chrominance signal of said first field and said another chrominance signal thus obtained from said field which is in the interlaced relation with said signal at said certain time, starting from the inputted composite signal;

obtaining said second chrominance signal of said new field, using said chrominance signals of a plurality of lines in the field at said certain time; and selectively outputting said new first chrominance signal and said new second chrominance signal according to said detection result obtained in said movement detecting step.

25. A field converting method according to claim 24, wherein said step of selectively outputting said chrominance signal comprises a step of adding said new first chrominance signal and said new second chrominance signal with a ratio according to said detection result obtained in said movement detecting step to give said adding means a signal obtained by said addition.

26. A field converting method according to claim 24, wherein obtaining said new first chrominance signal comprises a step of obtaining said new first chrominance signal of said new field having a field number contiguous to a field number of said new field signal of said first field separated in said separating step at said certain time, and said another chrominance signal thus obtained from said second field which is in the interlaced relation therewith; and obtaining said new second chrominance signal comprises a step of obtaining a second chrominance signal of said new field having a field number contiguous to a field number of said new field signal, using chrominance signals of a plurality of lines in said field at said certain time.

27. A field converting method for forming data of a new field from data of an arbitrary field of an interlaced television signal, said method comprising the steps of:

separating an inputted composite signal of a first field at a certain time into a separate luminance signal and a separate chrominance signal;

obtaining another luminance signal and another chrominance signal of a second field which is in an interlaced relation with said signal of said first field at said certain time, starting from said inputted composite signal;

obtaining a new first luminance signal of a new field, using said separate luminance signal of said first field at said certain time and said obtained another luminance signal of said second field which is in an interlaced relation therewith;

obtaining a new second luminance signal of a new field, using said separate luminance signal of said first field at said certain time and said obtained another luminance signal of said second field which is in an interlaced relation therewith;

obtaining a new second luminance signal of said new field, using luminance signal of a plurality of lines in said first field at said certain time;

obtaining a new first chrominance signal of said new field, using said separate chrominance signal of said first field at said certain time and said another chrominance signal thus obtained from said second field which is in the interlaced relation with said signal at that time;

obtaining a new second chrominance signal of said new field, using chrominance signals of a plurality of lines in said first field at said certain time; and detecting movements in an image of said inputted composite signal;

selectively outputting said new first luminance signal and said new second luminance signal, according to a detection result thus obtained;

selectively outputting said new first chrominance signal and said new second chrominance signal according to said detection result thus obtained; and adding said selectively outputted luminance signal and said selectively outputted chrominance signal to output a signal obtained by said addition as a signal for said new field.

28. A field converting method according to claim 27, wherein said step of obtaining said first luminance signal includes a step of obtaining a first luminance signal of said new field having a field number contiguous to a field number of the field signal newly formed, using the luminance signal of the field at that time, separated in said separation step, and the luminance signal thus obtained of the field, which is in the interlaced therewith;

said step of obtaining said second luminance signal includes a step of obtaining a second luminance signal of said new field having a field number contiguous to a field number of the field signal newly formed, using luminance signals of a plurality of lines in the field at that time;

said step of obtaining said first chrominance signal includes a step of obtaining a first chrominance signal of said new field having a field number contiguous to a field number of the field signal newly formed, using the chrominance signal of the field at that time separated in said separating step, and the chrominance signal thus obtained of the field, which is in the interlaced relation therewith; and said step of obtaining said second chrominance signal includes a step of obtaining a second chrominance signal of said new field having a field number contiguous to a field number of the field signal newly formed, using chrominance signals of a plurality of lines in the field of that time.

29. A field converting method for forming data of a new field from data of an arbitrary field of an interlaced television signal, comprising the steps of:

detecting at least a repetition or a jump in the field number of the inputted television signal;

forming data of a first field, using at least one of a data set of the field, which is to be field-converted, and a data set of a field, which is in an interlaced relation therewith;

forming data of a second field, using data of a plurality of lines in said field, which is to be field-converted;

detecting movements in an image represented by the data of said first field; and outputting selectively the data of said first field and the data of said second field as data of said new field;

wherein said step of forming data of the first field includes a step of forming the data of the first field for fields in a neighborhood of the field, where a discontinuity has been found, responding to a fact that the discontinuity in the field number has been detected.

30. A field conversion device forming data of a new field from data of an arbitrary field of an interlaced television signal, comprising:

means for separating an inputted composite signal of a field at a certain time into a luminance signal and a chrominance signal;

means for obtaining a luminance signal and a chrominance signal of a field, which is in an interlaced relation with said signal of the field at that time, starting from said inputted composite signal;

means for obtaining a first luminance signal of a new field, using the luminance signal of the field at that time separated by said separation means and said obtained luminance signal of the field, which is in an interlaced relation therewith;

means for obtaining a second luminance signal of the new field, using luminance signals of a plurality of lines in the field at that time;

means for obtaining a first chrominance signal of a new field, using the chrominance signal of the field at that time separated by said separation means and the chrominance signal thus obtained of the field, which is in the interlaced relation with the signal at that time;

means for obtaining a second chrominance signal of the new field, using chrominance signals of a plurality of lines in the field at that time;

movement detection means for detecting movements in an image of said inputted composite signal;

first switching means for outputting selectively said first luminance signal and said second luminance signal according to the detection result of said movement detection means;

second switching means for outputting selectively said first chrominance signal and said second chrominance signal according to the detection result of said movement detection means; and means for adding said luminance signal selectively outputted and said chrominance signal to output a signal obtained by this addition as a signal for said new field, wherein said means for separating said inputted composite signal of said first field at said certain time comprises a first three-dimensional separation circuit and said means for obtaining said another luminance signal and said another chrominance signal of said second field, which is in the interlaced relation with said first field at said certain time, starting from said inputted composite signal.

31. A field conversion device according to claim 30, further comprising means for detecting skipping of fields in said inputted composite signal; wherein, said first three-dimensional separation circuit effects the separation for the first field succeeding said composite signal, for which said skip detection means has detected that fields have been skipped, using signals in the field at that time; and said second three-dimensional separation circuit effects said separation for the field immediately after the field of said composite signal, for which said skip detection means has detected that fields have been skipped, using signals in the field preceding it by three fields and for the second field after the field of the composite signal, for which said skip detection means has detected that fields have been skipped, using signals in the field preceding it by one field.

32. A field converting method for forming data of a new field from data of an arbitrary field of an interlaced television signal, said method comprising the steps of:

separating an inputted composite signal of a field at a certain time into a luminance signal and a chrominance signal;

obtaining a luminance signal and a chrominance signal of a field, which is in an interlaced relation with said signal of the field at that time, starting from said inputted composite signal;

obtaining a first luminance signal of a new field, using the luminance signal of the field at that time thus separated and said obtained luminance signal of the field, which is in an interlaced relation therewith;

obtaining a second luminance signal of the new field, using luminance signals of a plurality of lines in the field at that time;

obtaining a first chrominance signal of a new field, using the chrominance signal of the field at that time thus separated and the chrominance signal thus obtained of the field, which is in the interlaced relation with the signal at that time;

obtaining a second chrominance signal of the new field, using chrominance signals of a plurality of lines in the field at that time; and detecting movements in an image of said inputted composite signal;

outputting selectively said first luminance signal and said second luminance signal, according to a detection result thus obtained;

outputting selectively said first chrominance signal and said second chrominance signal according to the detection result thus obtained;

adding said luminance signal selectively outputted and said chrominance signal to output a signal obtained by this addition as signal for said new field;

detecting skipping of fields in said inputted composite signal, wherein said separating step comprises:

effecting the separation for the first field succeeding the composite signal, for which it has been detected in said skip detecting step that fields have been skipped, using signals in the field at that time; and effecting the separation for the field immediately after the field of the composite signal, for which said skip detection means has detected that fields have been skipped, using signals in the field preceding it by three fields and for the second field after the field of the composite signal, for which it has been detected in said skip detecting step that fields have been skipped, using signals in the field preceding it by one field.

* * * * *